INVENTORS
WILLIAM R. STRINGFELLOW
VAUGHN D. WINKLER
STEPHEN W. DUNWELL
CLARENCE E. STEPHENS
BY
SUGHRUE, ROTHWELL, MION AND ZINN
ATTORNEYS

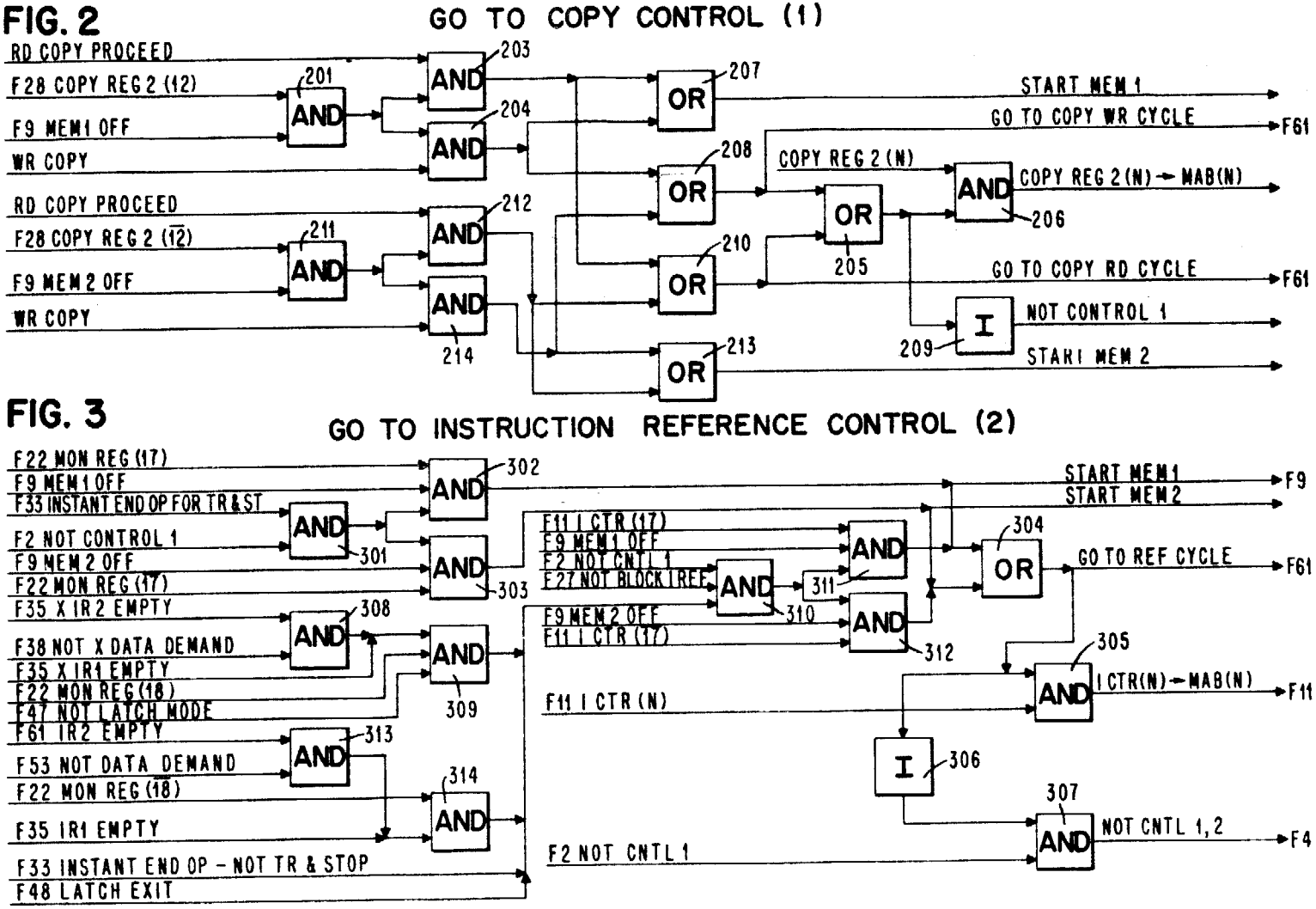
FIG. 2
GO TO COPY CONTROL (1)
RD COPY PROCEED
F28 COPY REG 2 (12)
F9 MEM1 OFF
WR COPY
RD COPY PROCEED
F28 COPY REG 2 (12)
F9 MEM2 OFF
WR COPY
START MEM 1
GO TO COPY WR CYCLE
COPY REG 2 (N)
COPY REG 2 (N) → MAB(N)
GO TO COPY RD CYCLE
NOT CONTROL 1
START MEM 2
AND
OR
I
F61
FIG. 3
GO TO INSTRUCTION REFERENCE CONTROL (2)
F22 MON REG (17)
F9 MEM1 OFF
F33 INSTANT END OP FOR TR&ST
F2 NOT CONTROL 1
F9 MEM2 OFF
F22 MON REG (17)
F35 X IR2 EMPTY
F38 NOT X DATA DEMAND
F35 X IR1 EMPTY
F22 MON REG (18)
F47 NOT LATCH MODE
F61 IR2 EMPTY
F53 NOT DATA DEMAND
F22 MON REG (18)
F35 IR1 EMPTY
F33 INSTANT END OP - NOT TR & STOP
F48 LATCH EXIT
START MEM1
START MEM2
GO TO REF CYCLE
F11 I CTR (17)
F9 MEM1 OFF
F2 NOT CNTL 1
F27 NOT BLOCK REF
F9 MEM2 OFF
F11 I CTR (17)
F11 I CTR (N)
I CTR(N) → MAB(N)
F2 NOT CNTL 1
NOT CNTL 1,2
F9
F11
F4

FIG. 4 GO TO STORE CONTROL (X) (3)
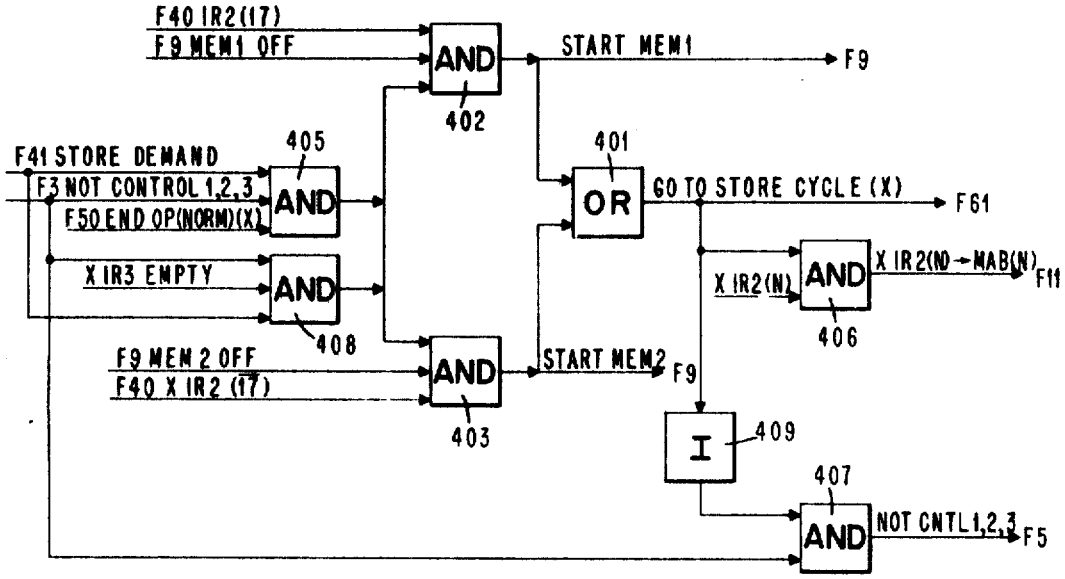
FIG. 5 GO TO STORE CONTROL (4)
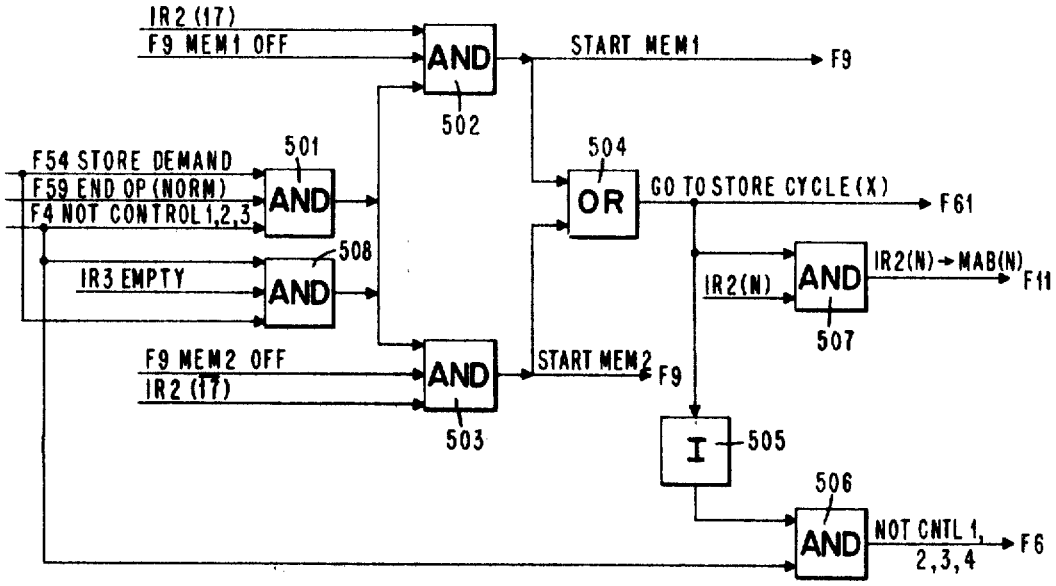

MEMORY 1 CLOCK AND CONTROLS

CONTROL FOR MEMORY OR 2 TO MEM REG A OR B OR TO X MEM REG A OR B

SAMPLING OF MEM BUSES TO MR A & B OR X MR A OR B

CONTROL TO INDICATE MEMORY REGISTER A OR X MEMORY REGISTER A EMPTY

CONTROLS FOR SELECTING THE PROPER MEMORY REGISTER FOR READING INTO ADDER OR MQ

CONTROLS FOR SELECTING THE PROPER X MEMORY REGISTER FOR READING INTO X ADDER OR X MQ

LOADING MEMORY READ IN BUFFERS

FIG. 20 CONTROL FOR MEMORY 1 OR 2 TO I/O REGISTER FOR WRITE COPY
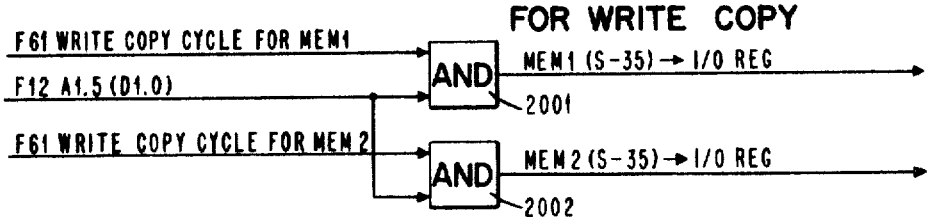
FIG. 22 MONITOR REGISTER
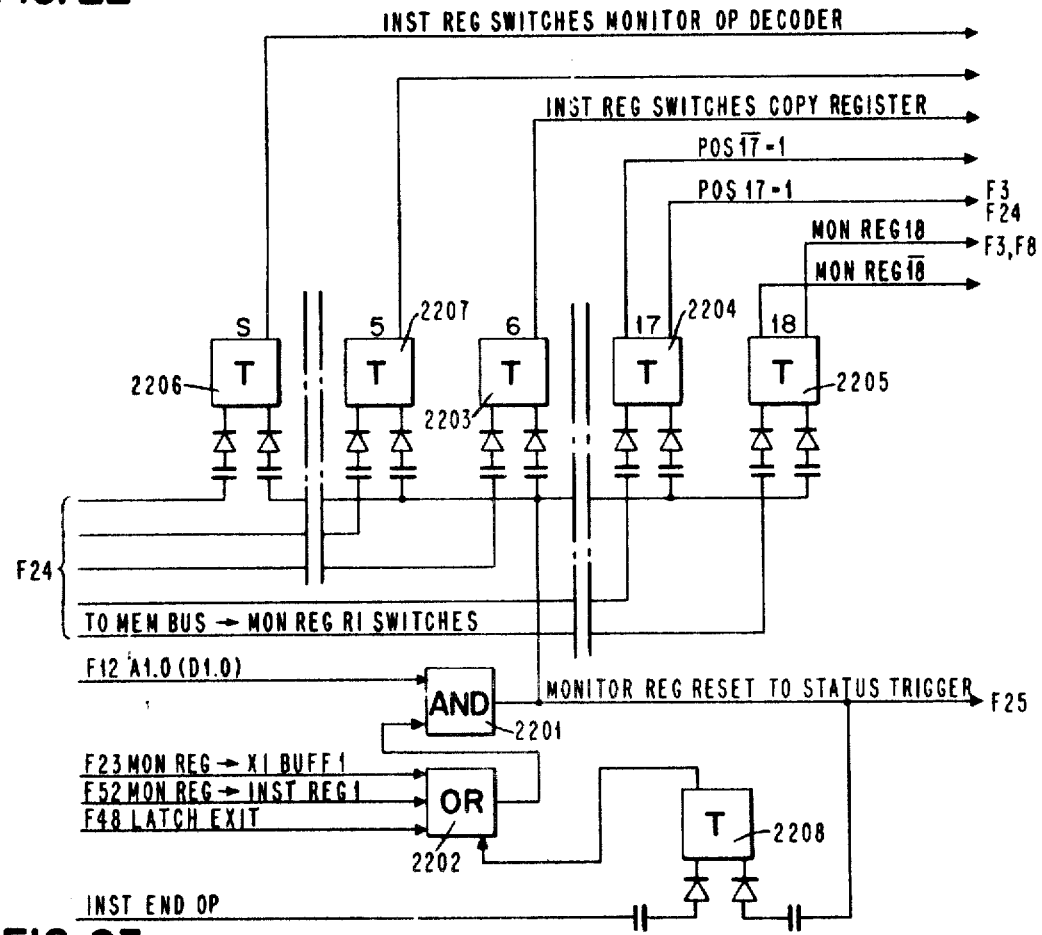
FIG. 23 MONITOR REGISTER TO X. I. B. R. 1
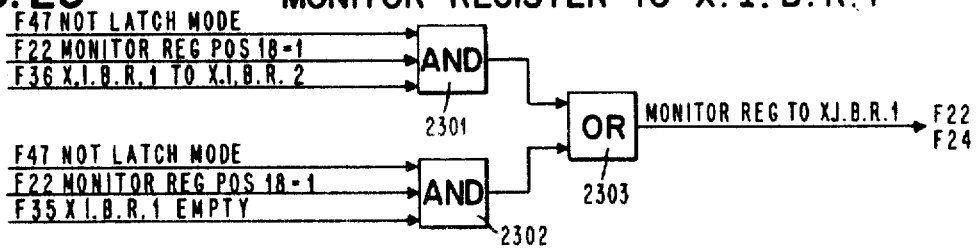

MEMORY CYCLE SIGNAL GENERATOR

FIG. 24 CONTROLS FOR MEMORY 1 OR 2 TO MONITOR REG
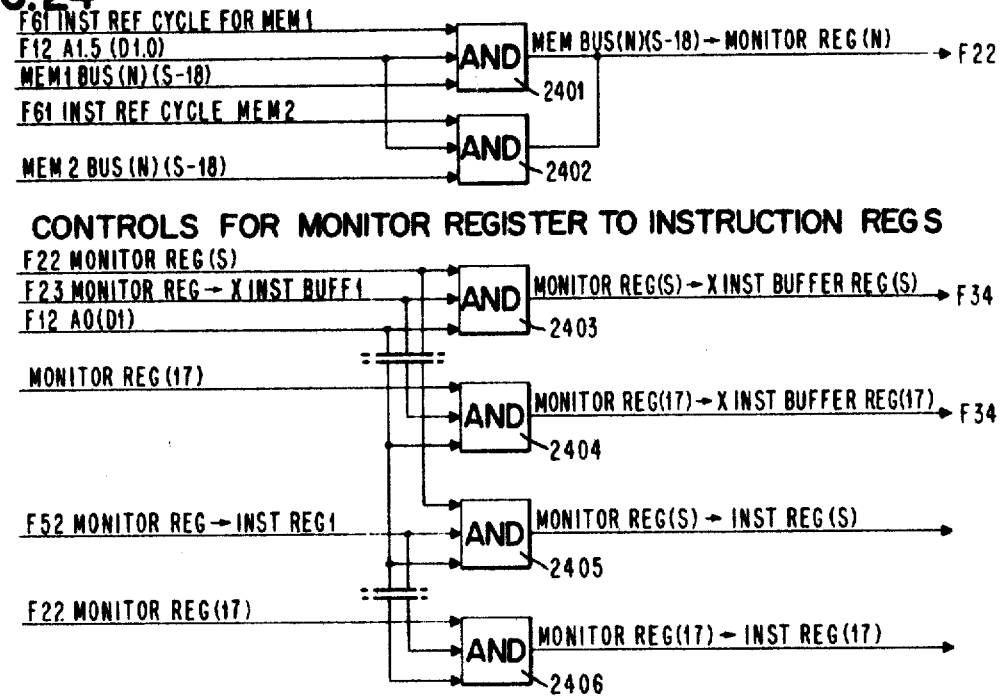
FIG. 25 MONITOR REGISTER STATUS TRIGGER
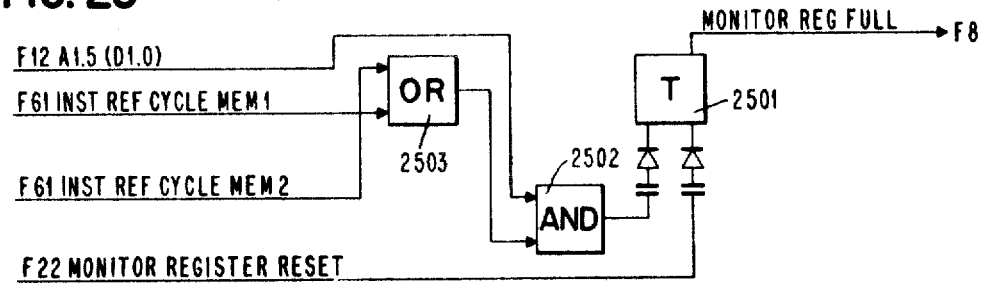
FIG. 26
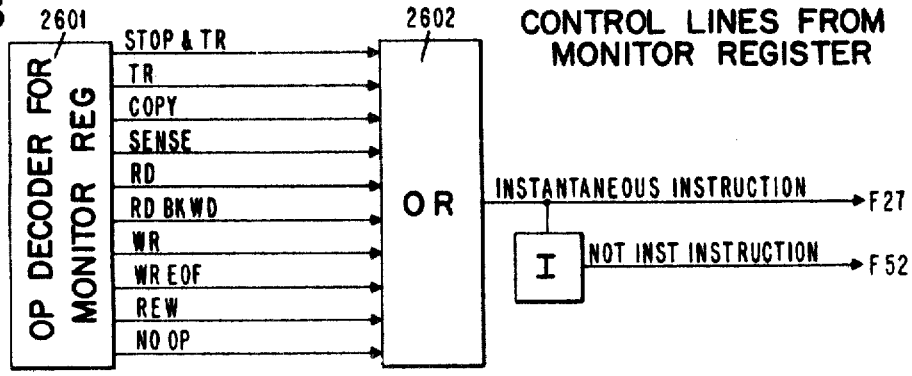

FIG.27 BLOCK INSTRUCTION REFERENCE CYCLES
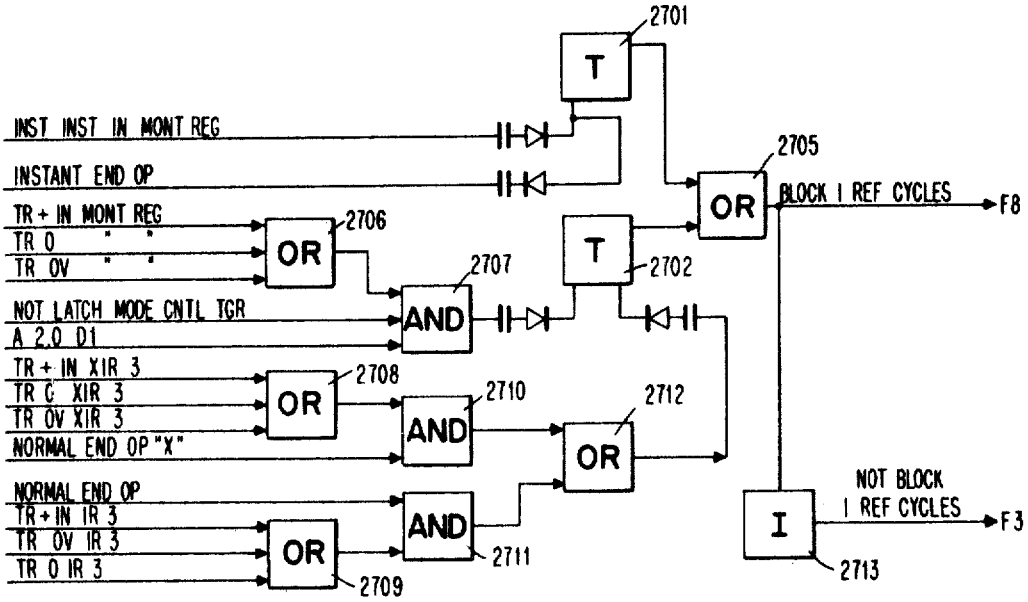
FIG. 29
COPY REGISTER 1 STATUS
TRIGGER
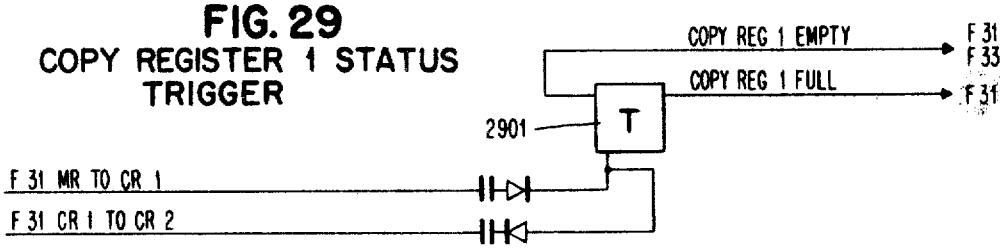
FIG. 30
COPY REGISTER 2 STATUS
TRIGGER
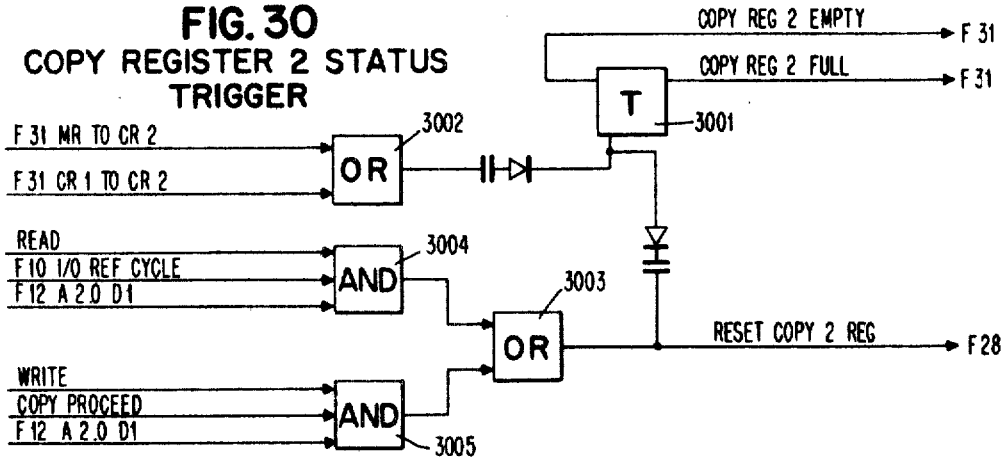

FIG. 32 STOP TRIGGER
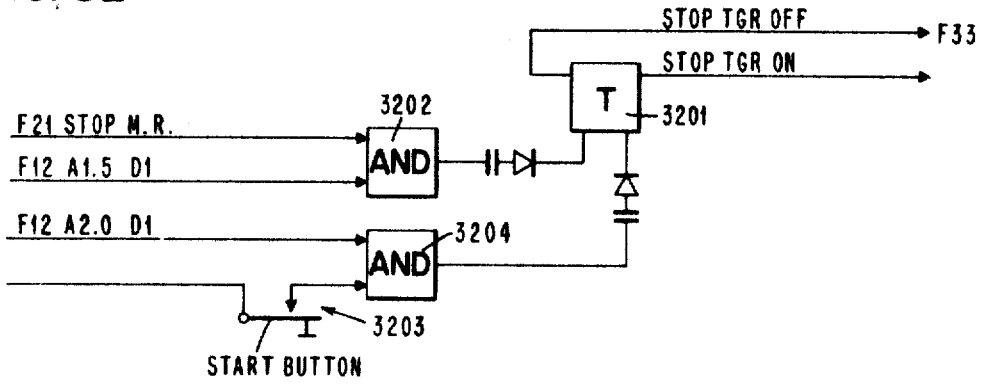
FIG. 33 INSTANTANEOUS END OPERATION
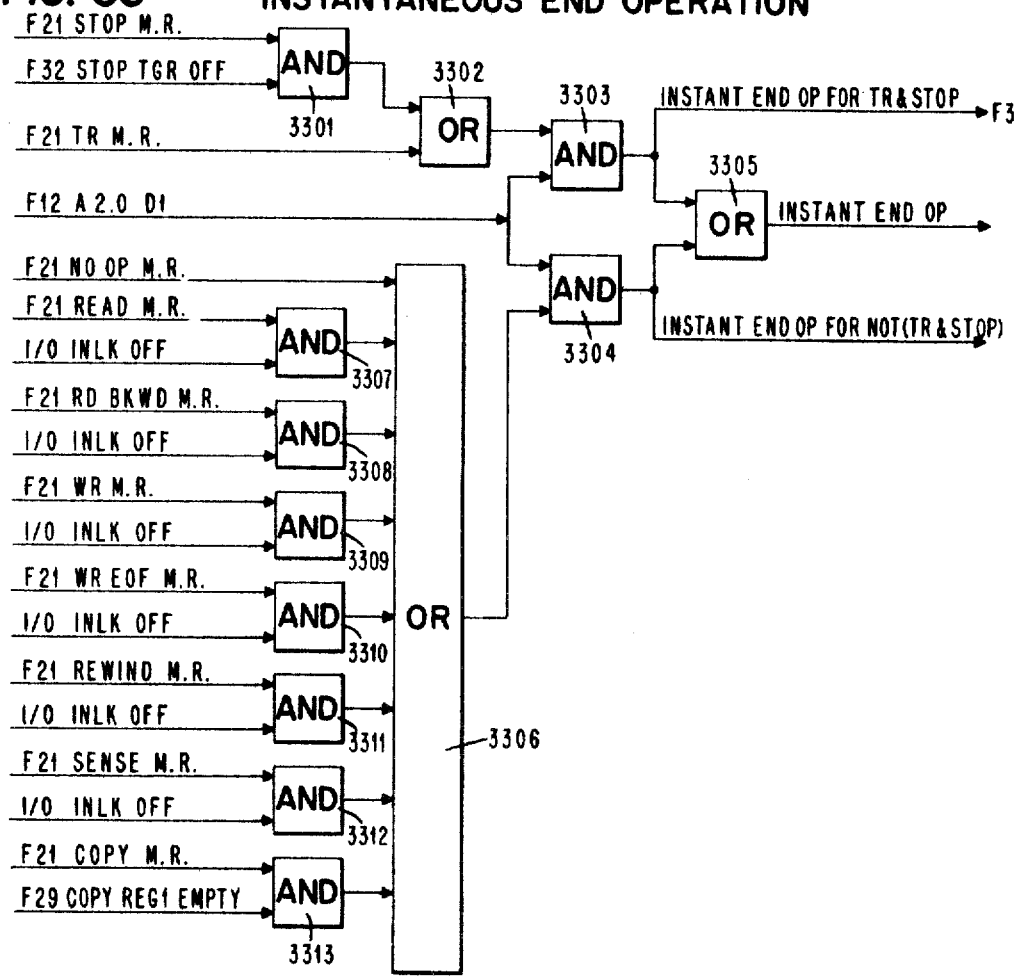

INHIBIT SAMPLE GENERATOR

STATUS INDICATOR

BUFFER REGISTER GATES

FIG. 38 "X" DATA DEMAND AND NOT "X" DATA DEMAND
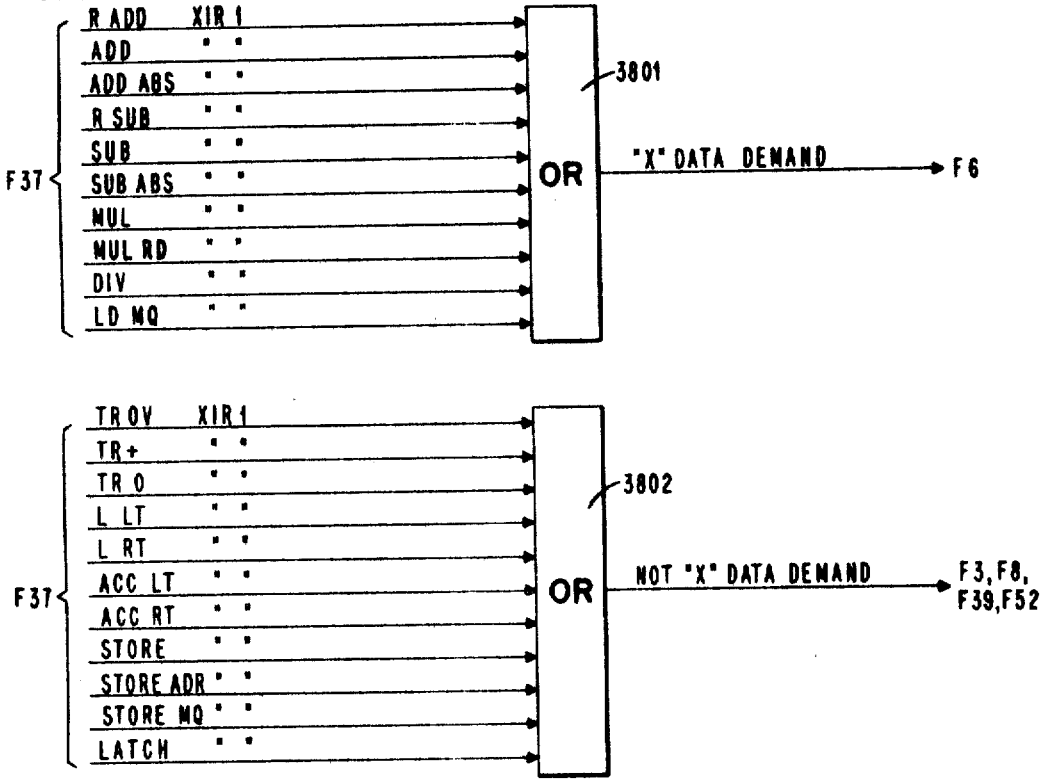
FIG. 39 XIR 1 TO XIR 2
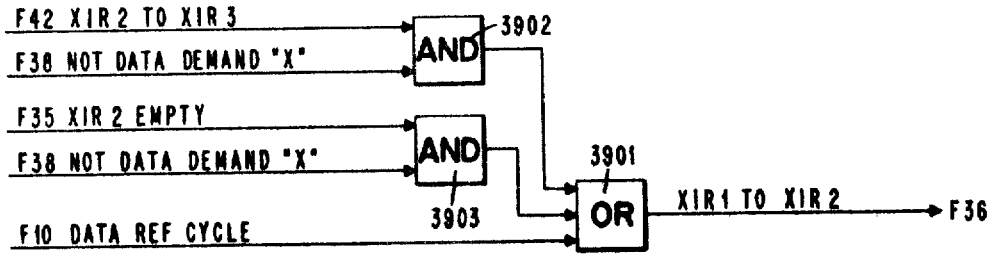
FIG. 42 XIR 2 TO XIR 3
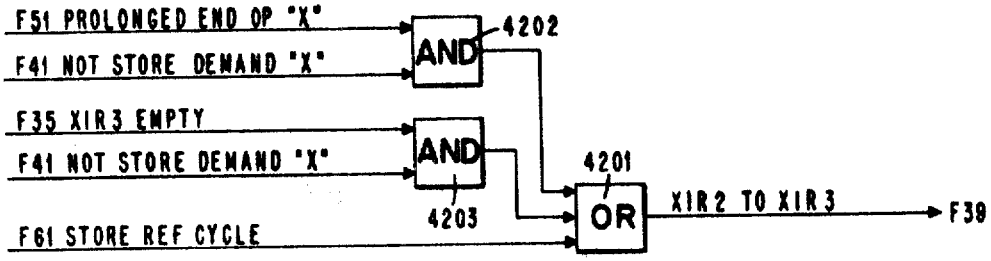

INSTRUCTION REGISTER GATING

FIG. 43 "X" INSTRUCTION REGISTER 3 (XIR 3) (ALSO IR 3)
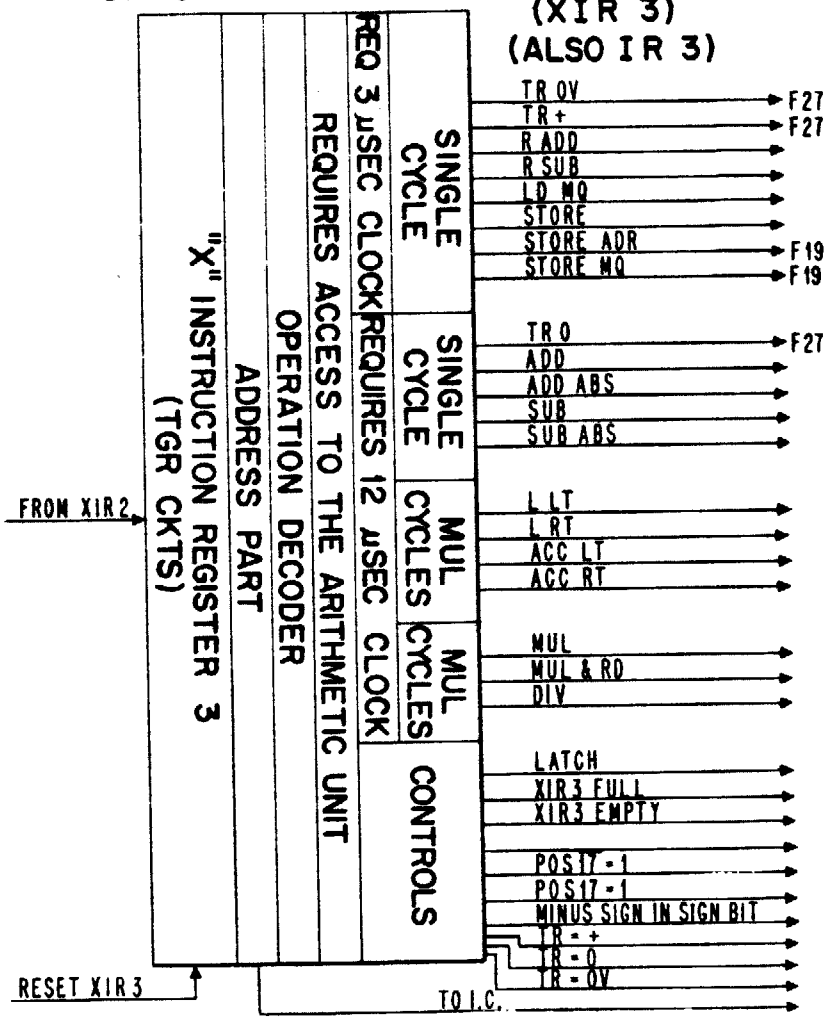
FIG. 41 "X" STORE DEMAND, NOT "X" STORE DEMAND, "X" ARITHMETIC CLOCK START
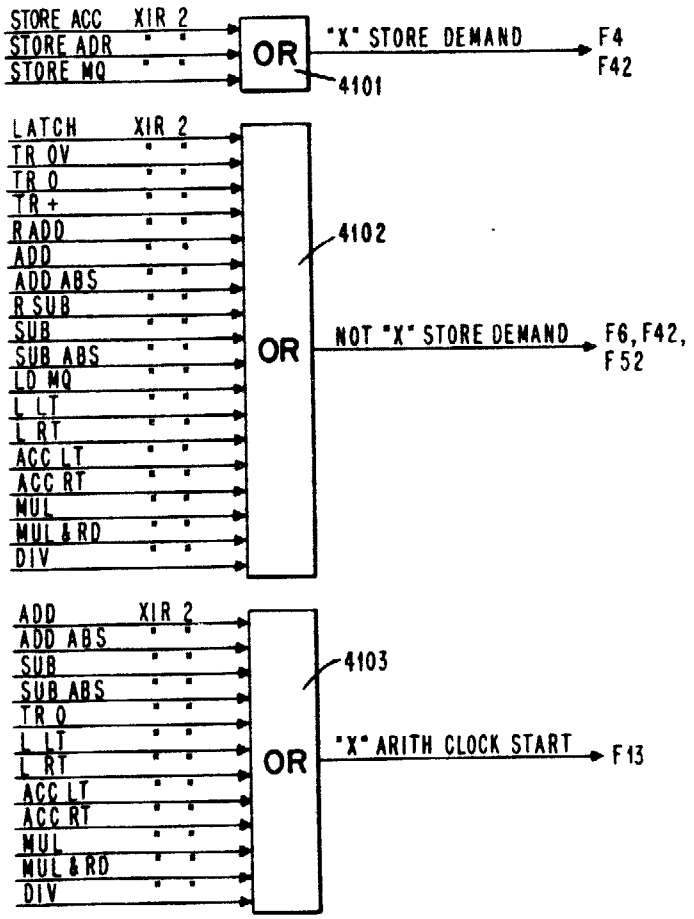

FIG. 44 EXECUTE CONTROLS FOR X INSTRUCTION REGISTER 3 (3 μSEC)
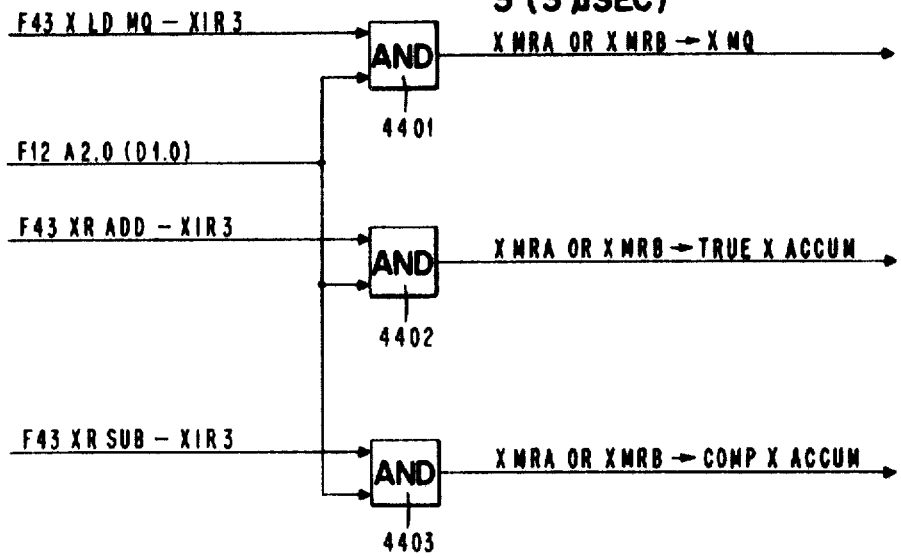
FIG. 45 EXECUTE CONTROLS FOR X INSTRUCTION REGISTER 3 CONDITION TR
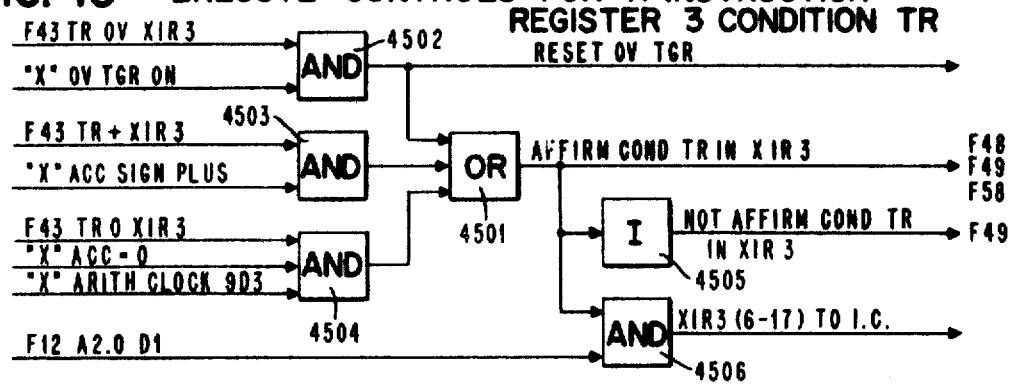
FIG. 46 COUNTER PORTION OF X INSTRUCTION REG 3
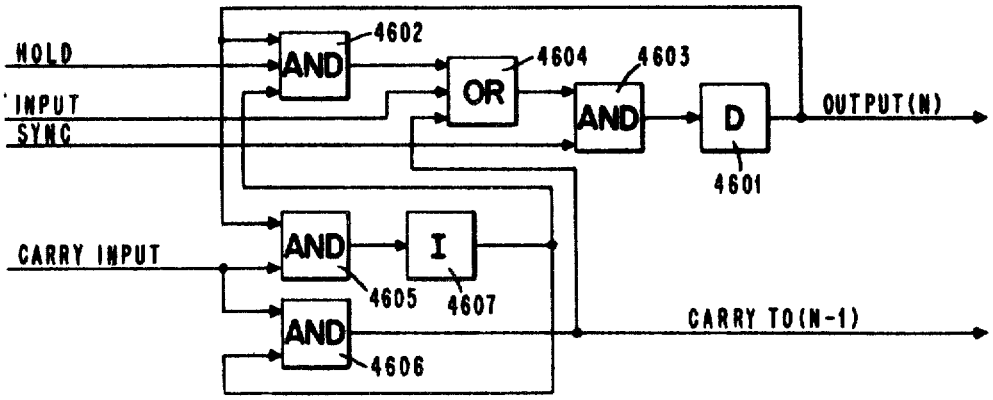

FIG. 47 LATCH MODE CONTROL TRIGGERS
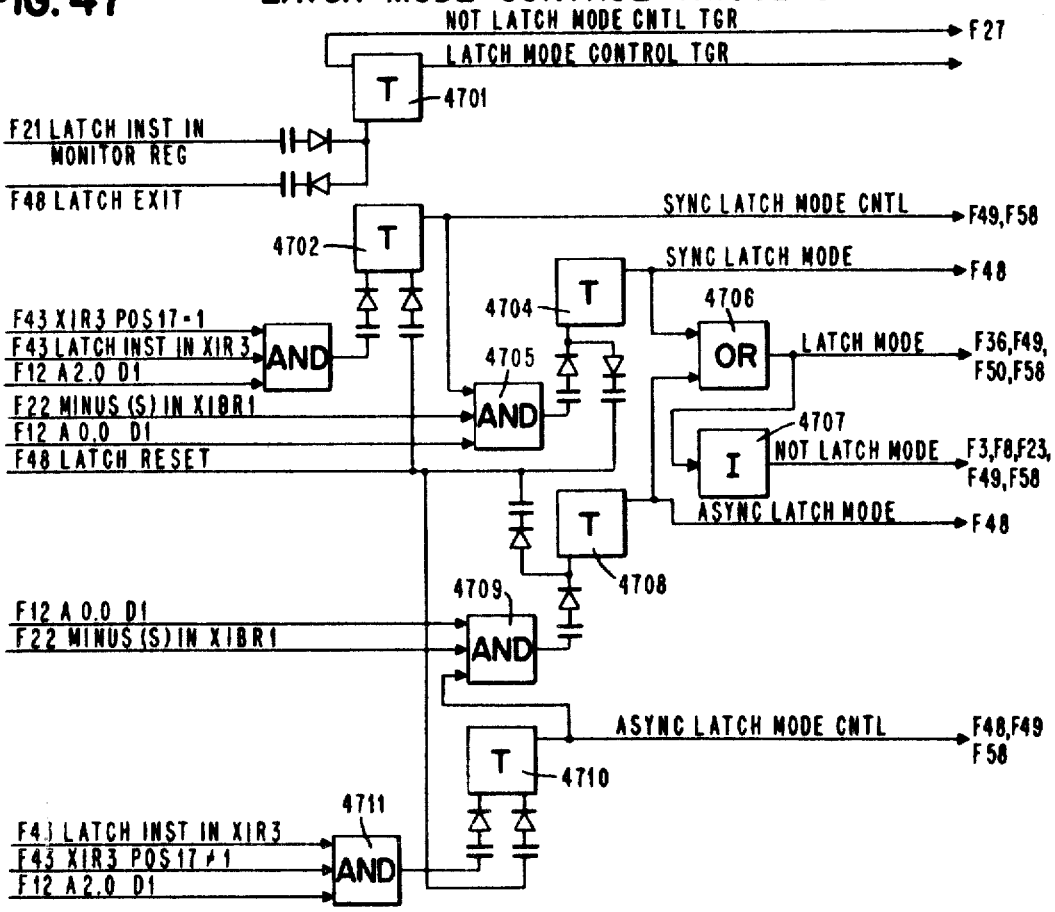
FIG. 48 LATCH EXIT TRIGGER
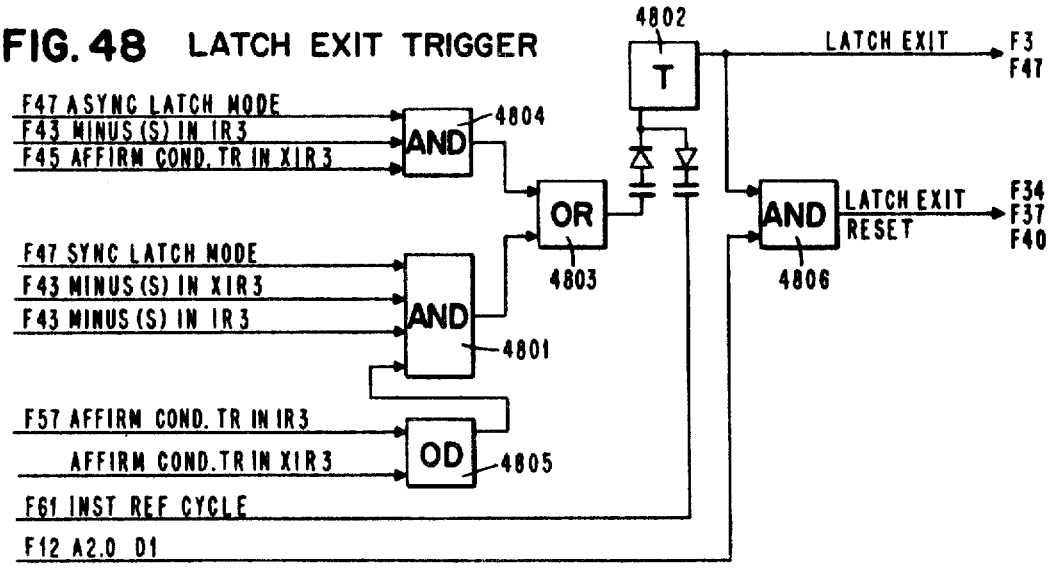

NORMAL END OPERATION "X" SAMPLE

NORMAL "X" END OPERATION

FIG. 51 PROLONGED END OPERATION "X"
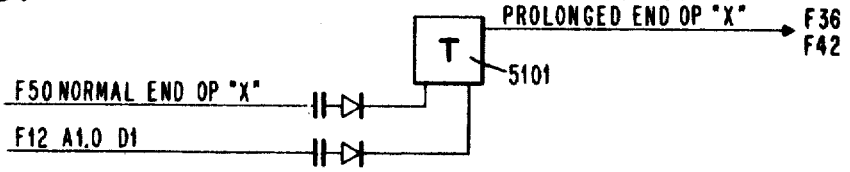
FIG. 52 INSTRUCTION REGISTER SWITCHING
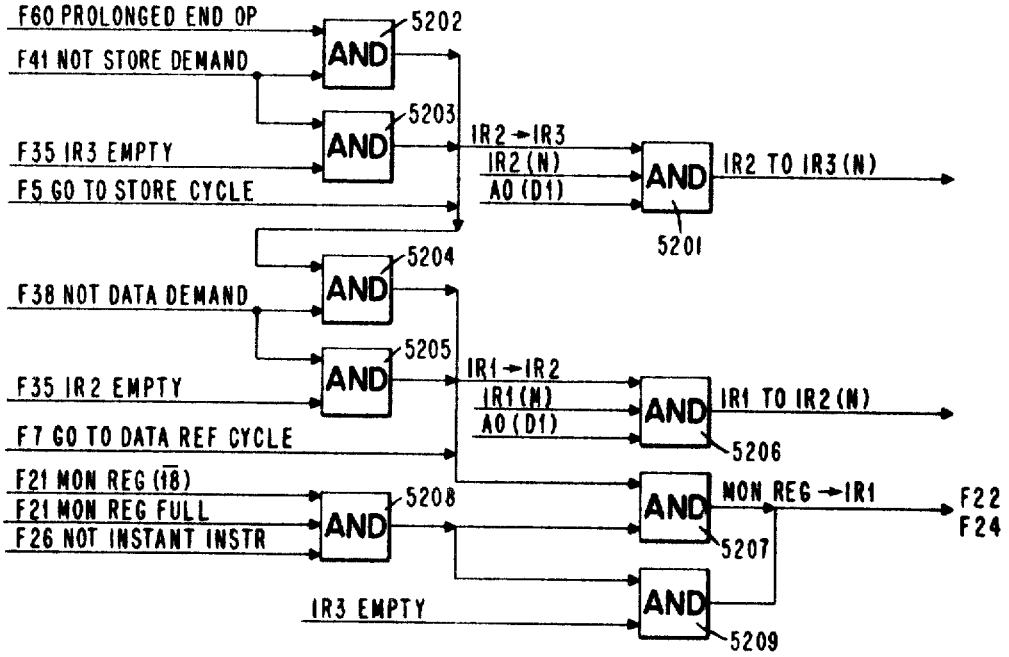
FIG. 53 DATA DEMAND, NOT DATA DEMAND
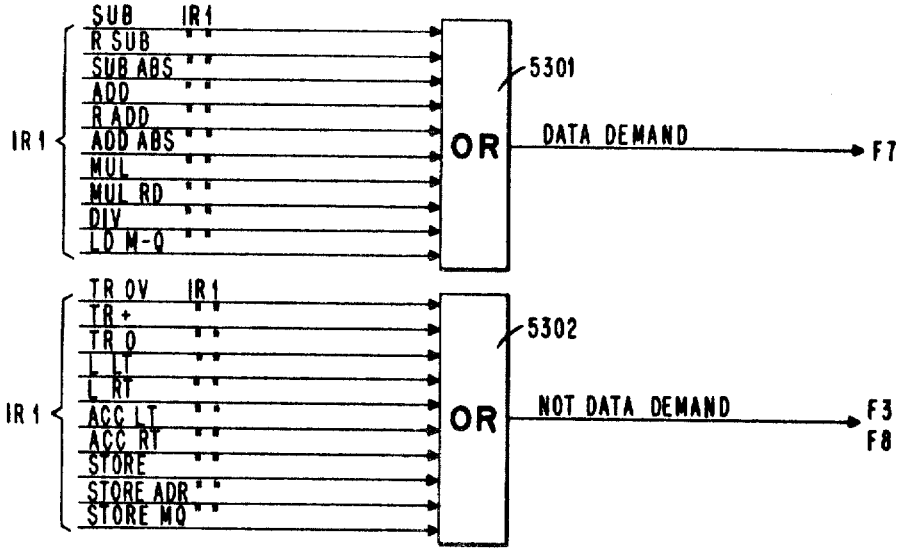

FIG. 54 IR 2 DECODER
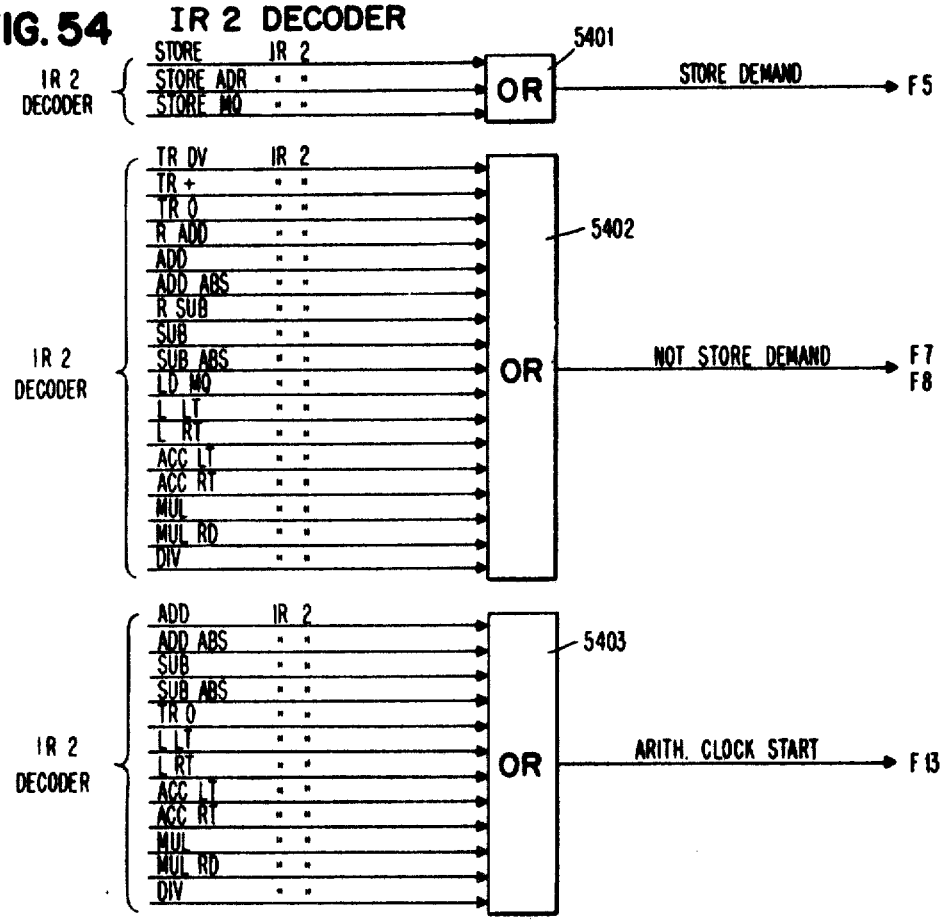
FIG. 55 COUNTER PORTION OF IR 3
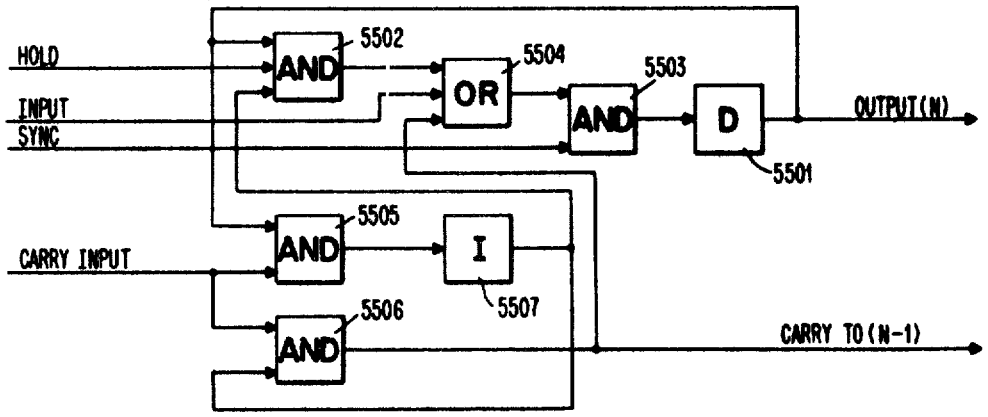

FIG. 56 EXECUTE CONTROLS FOR INSTRUCTION REGISTER 3 (3 μSEC)
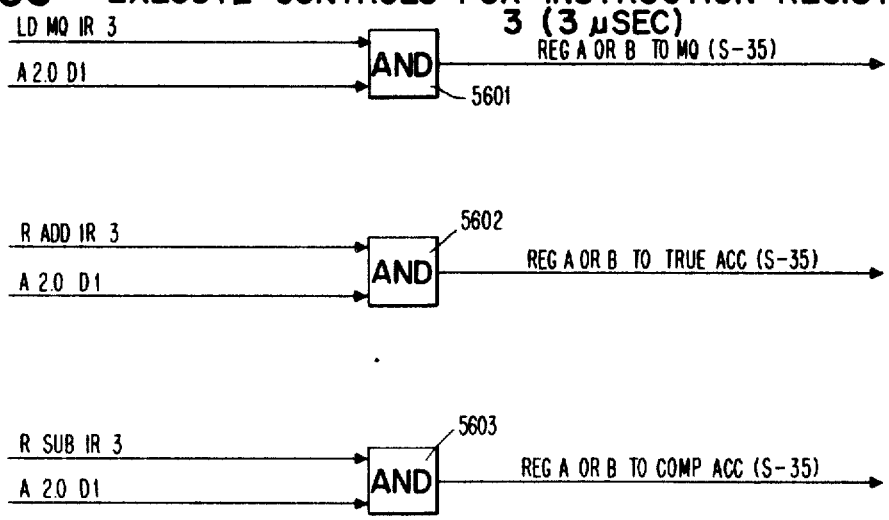
FIG. 57 EXECUTE CONTROLS FOR IR 3 CONDITION TR
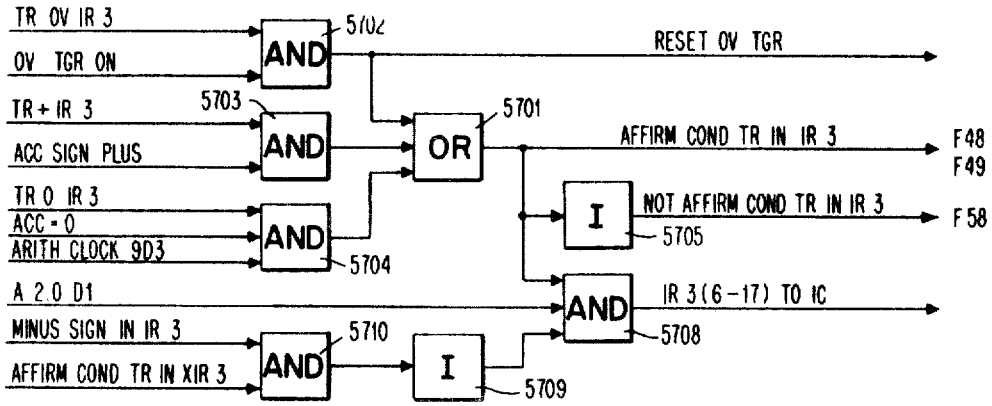
FIG. 58 NORMAL END OPERATION SAMPLE
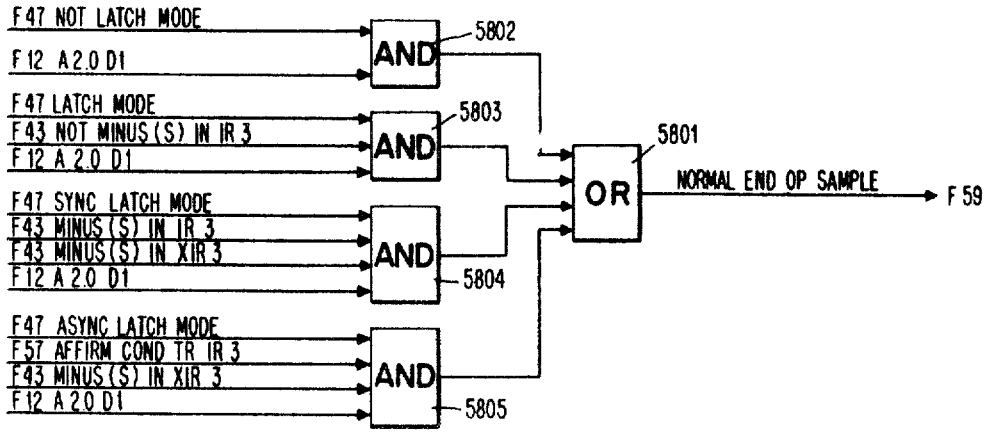

FIG. 59 NORMAL END OPERATION
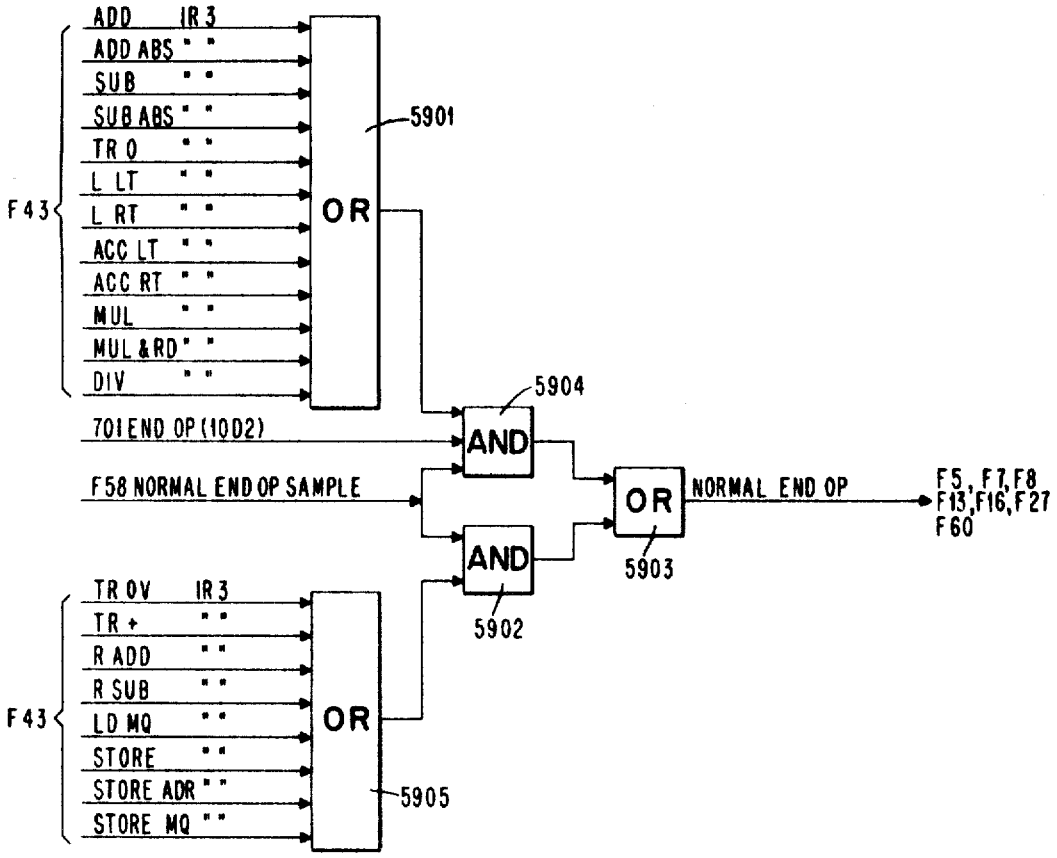
FIG. 60 PROLONGED END OPERATION
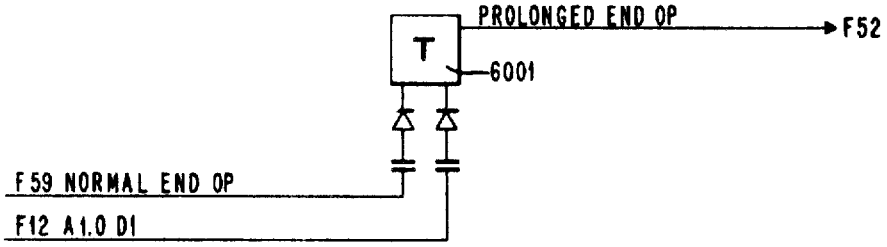

FIG. 62

| CYCLE NO. | KIND OF MEMORY REF. CYCLE | A.0 | A0.5 | A1.0 | A1.5 | A2.0 | A2.5 | A.0 |
|---|---|---|---|---|---|---|---|---|
| 0 | — | IC 17 = 1<br>MEM 1 OFF = 1 | | | | | IC TO MAB | |
| 1 | IST | IC 17 = 1<br>MEM 2 OFF = 1<br>MAB TO MAR 1 | | | MEM 1 TO MR<br>MR = IST 1 | | IC TO MAB | |
| 2 | IST | IC 17 = 1<br>MEM 1 OFF = 1<br>MAB TO MAR 2<br>MR = IST 1<br>MR TO IR1<br>IR 1 = IST 1 | | MR = EMPTY | MEM 2 TO MR<br>MR = IST 2 | MR TO CR 2<br>CR 2 = IST 2 | | |
| 3 | NONE | IC 17 = 1<br>MEM 1 OFF = 1<br>MR = IST 2<br>IR1 TO IR 2<br>IR 2 = IST 1<br>CR 2 = IST 2 | | MR = EMPTY | | | IC TO MAB | |
| 4 | IST | IC 17 = 1<br>MEM 2 OFF = 1<br>MAB TO MAR 1<br>MR = EMPTY<br>IR 2 = IST 1<br>CR2 = IST 2 | | | MEM 1 TO MR<br>MR = IST 3 | | IC TO MAB | |
| 5 | IST | IC 17 = 1<br>MEM 2 OFF = 1<br>MAB TO MAR 2 | | | MEM 2 TO MR | IC 17 = 1<br>MR TO IC | | |

SAMPLE PROGRAM

SAMPLE PROGRAM

FIG. 64

| CYCLE NO | KIND OF MEMORY REF CYCLE | A.0 | A0.5 | A1.0 | A1.5 | A2.0 | A2.5 | A.0 |
|---|---|---|---|---|---|---|---|---|
| 9 | COPY | X IB1 = IST 6<br>X IR1 = IST 3<br>IR1 = IST 5<br>IR2 = IST 1 | | | | | | |
| 10 | NONE | IC $\overline{17}$ = 1<br>MEM 2 OFF = 1<br>MR = EMPTY<br>X IB1 TO X IB2<br>X IB2 = IST 6<br>X IR1 = IST 3<br>IR1 = IST 5<br>IR2 = IST 1 | | | | | IR2 TO MAB | |
| 11 | STORE | IC 17 = 1<br>MEM 1 OFF = 1<br>MAB TO MAR 2<br>MR = EMPTY<br>X IB2 TO X IB3<br>IRC TO IR3<br>X IB3 = IST 6<br>X IR1 = IST 3<br>IR1 = IST 5<br>IR3 = IST 1 | | | MQ TO MEM2 RIB | | IR1 TO MAB | |
| 12 | DATA | IC $\overline{17}$ = 1<br>MEM 2 OFF = 1<br>MAB TO MAR 1<br>MR = EMPTY<br>IR1 TO IR2<br>X IB3 = IST 6<br>X IR1 = IST 3<br>IR2 = IST 5 | | | MEM 1 TO MRA<br>MRA = DATA | | IC TO MAB | |
| 13 | IST | IC 17 = 1<br>MEM 1 OFF = 1<br>MAB TO MAR 2<br>MR = EMPTY<br>IR2 TO IR3 | | MRA TO MQ | MEM 2 TO MR<br>MR = IST 7 | | | |

SAMPLE PROGRAM

SAMPLE PROGRAM

LEGEND

| |
|---|
| IST 1 = STORE MQ INTO MEM 2 |
| IST 2 = READ COPY INTO MEM 2 |
| IST 3 = LOAD XMQ FROM MEM 2 |
| IST 4 = TRANSFER MEM 2 ADR TO I C |
| IST 5 = LOAD MQ FROM MEM 1 |
| IST 6 = STORE XMQ INTO MEM 1 |
| IST 7 = STORE X ACC INTO MEM 1 |

United States Patent Office

Re. 26,087
Reissued Sept. 20, 1966

26,087

MULTI-COMPUTER SYSTEM INCLUDING MULTIPLEXED MEMORIES, LOOKAHEAD, AND ADDRESS INTERLEAVING FEATURES

Stephen W. Dunwell and Clarence Ernest Stephens, Poughkeepsie, William R. Stringfellow, Wappingers Falls, and Vaughn D. Winkler, Poughkeepsie, N.Y., assignors to International Business Machines Corporation, New York, N.Y., a corporation of New York Original No. 3,202,969, dated Aug. 24, 1965, Ser. No. 862,967, Dec. 30, 1959. Application for reissue Nov. 26, 1965, Ser. No. 526,638
29 Claims. (Cl. 340—172.5)

Matter enclosed in heavy brackets [ ] appears in the original patent but forms no part of this reissue specification; matter printed in italics indicates the additions made by reissue.

This invention relates to a calculator for performing binary calculations on data derived from memory and more particularly to a parallel-type calculator for performing these calculations.

In high speed calculators it is of prime importance that instructions be executed in a manner to obtain the highest time efficiency possible. In the usual case, however, much time may be lost due to the fact that the arithmetic unit may be performing an arithmetic operation in accordance with an instruction pulled out of memory and the next instruction may not be pulled out of memory until said operation is complete, although said next instruction may not involve an arithmetic operation. For instance, if the arithmetic unit is performing the addition of an operand pulled out of memory to the sum stored in an accumulator, memory stands idle while this addition takes place. If the next instruction were, for instance, a copy instruction in which data from an input-output unit is to be stored in memory and consequently not involving the arithmetic unit, time could be saved if this copy instruction could be withdrawn from memory and its execution initiated while said arithmetic operation is going on. This would increase the time efficiency of the calculator. A transfer instruction might also be withdrawn and executed during an arithmetic operation. To achieve this type of time efficiency, the calculator of this invention provides a look-ahead feature. In accordance with this look-ahead feature, a plurality of registers are provided to store instructions read out of memory and a priority control is employed to select an instruction for execution according to a predetermined allocation of priority to the different types of instructions handled by the calculator. In this manner the status of the calculator is periodically surveyed and instructions executed depending upon certain criteria to achieve the time efficiency.

Still further time efficiency is achieved by the calculator of this invention when an iterative program is involved. Broadly speaking, such a program involves the repetition of a series of instructions until certain conditions in the calculator are achieved. Normally, each instruction would have to be pulled out of memory and executed as many times as the iterative program is to be performed. To reduce the necessity for repeated access to memory so as to free memory for other operations, the present invention pulls out of memory only once each instruction of the iterative program and stores these instructions in a loop of registers and recycles the instructions. This recycling is continued until the iterative program is completed. The calculator is said to be at this time in a latch mode type of operation.

Further time saving is achieved in accordance with the present invention by employing two memories and multiplexing these memories. By so doing, the effective memory cycle of the calculator is, in fact, one half of the memory cycle of either of the memories.

It is therefore an object of this invention to provide a calculator in which time efficiency is achieved by virtue of the look-ahead feature.

It is another object of this invention to provide a calculator which achieves further time efficiency in the event of an iterative program by looping the instructions in the iterative program in a plurality of registers to place the caculator in a latch mode type of operation.

It is a further object of this invention to provide a calculator which achieves further time efficiency by employing two memories and multiplexing the memories whereby the effective memory cycle of the calculator is one half that of either of the memories.

It is another object of this invention to provide a calculator employing two computers, each having its own arithmetic unit and associated registers and two memories, together with means for addressing either of the memories and withdrawing instructions or data for either of the computers.

Other objects of the invention will be pointed out in the following description and claims and illustrated in the accompanying drawings, which disclose, by way of example, the principle of the invention and the best mode, which has been contemplated, of applying that principle.

In the drawings:

FIGURES 1A and 1B are diagrammatic views of the over-all system constructed in accordance with the present invention;

FIGURES 2 through 8, inclusive, are diagrammatic views of the various memory cycle controls employed in accordance with this invention;

FIGURE 20 is a diagrammatic view showing the controls for memory 1 or 2 to the input-output register for write-copy;

FIGURE 22 is a diagrammatic view of the monitor register employed in accordance with this invention;

FIGURE 23 is a diagrammatic view of a gating from the monitor register to the first instruction register in the main computer;

FIGURE 24 is a diagrammatic view of the controls for either one of the memories to the monitor register;

FIGURE 25 is a diagrammatic view of the monitor register status trigger;

FIGURE 26 is a diagrammatic view of the control lines from the monitor register;

FIGURE 27 is a diagrammatic view of the controls for generating the BLOCK INSTRUCTION REFERENCE CYCLES and NOT BLOCK INSTRUCTION REFERENCE CYCLES signals;

FIGURE 29 is a diagrammatic view of the copy register No. 1 status trigger;

FIGURE 30 is a diagrammatic view of copy register No. 2 status trigger;

FIGURE 32 is a diagrammatic view of the stop trigger;

FIGURE 33 is a diagrammatic view of the generation of various end of operation signals;

FIGURE 38 is a diagrammatic view of the decoder output from one of the registers in the main computer;

FIGURES 39 and 42 are diagrammatic views of the generation of control signals for intra-register transfers in the main computer;

FIGURE 41 is a diagrammatic view of the decoder output associated with one of the instruction registers in the main computer;

FIGURE 43 is a diagrammatic illustration of one of the registers in either the main or the control computer;

FIGURE 44 is a diagrammatic illustration of the generation of further control signals;

FIGURE 45 is a diagrammatic view of the external controls for one of the registers in the main computer for a conditional transfer operation;

FIGURE 46 is a diagrammatic illustration of the counter portion of one of the instruction registers in the main computer;

FIGURE 47 is a digrammatic illustration of the latch mode control triggers;

FIGURE 48 is a diagrammatic view of the latch exit trigger;

FIGURE 51 is a diagrammatic illustration of the generation of a PROLONGED END OPERATION X signal;

FIGURE 52 is a diagrammatic view of the generation of control signals for instruction register switching;

FIGURE 53 is a diagrammatic illustration of the decoder output of one of the instruction registers in the control computer;

FIGURE 54 is a diagrammatic view of the output of the decoder associated with one of the instruction registers in the control computer;

FIGURE 55 is a diagrammatic illustration of the counter portion of one of the instruction registers in the control computer;

FIGURE 56 is a diagrammatic illustration of the generation of further control signals for one of the instruction registers in the control computer;

FIGURE 57 is a diagrammatic illustration of the execution controls for conditional transfer for one of the instruction registers in the control computer;

FIGURE 58 is a diagrammatic view of the generation of a NORMAL END OPERATION SAMPLE signal;

FIGURE 59 is a diagrammatic view of the generation of a NORMAL END OPERATION signal;

FIGURE 60 is a diagrammatic view of the generation of a PROLONGED END OPERATION signal;

Figure 1A:
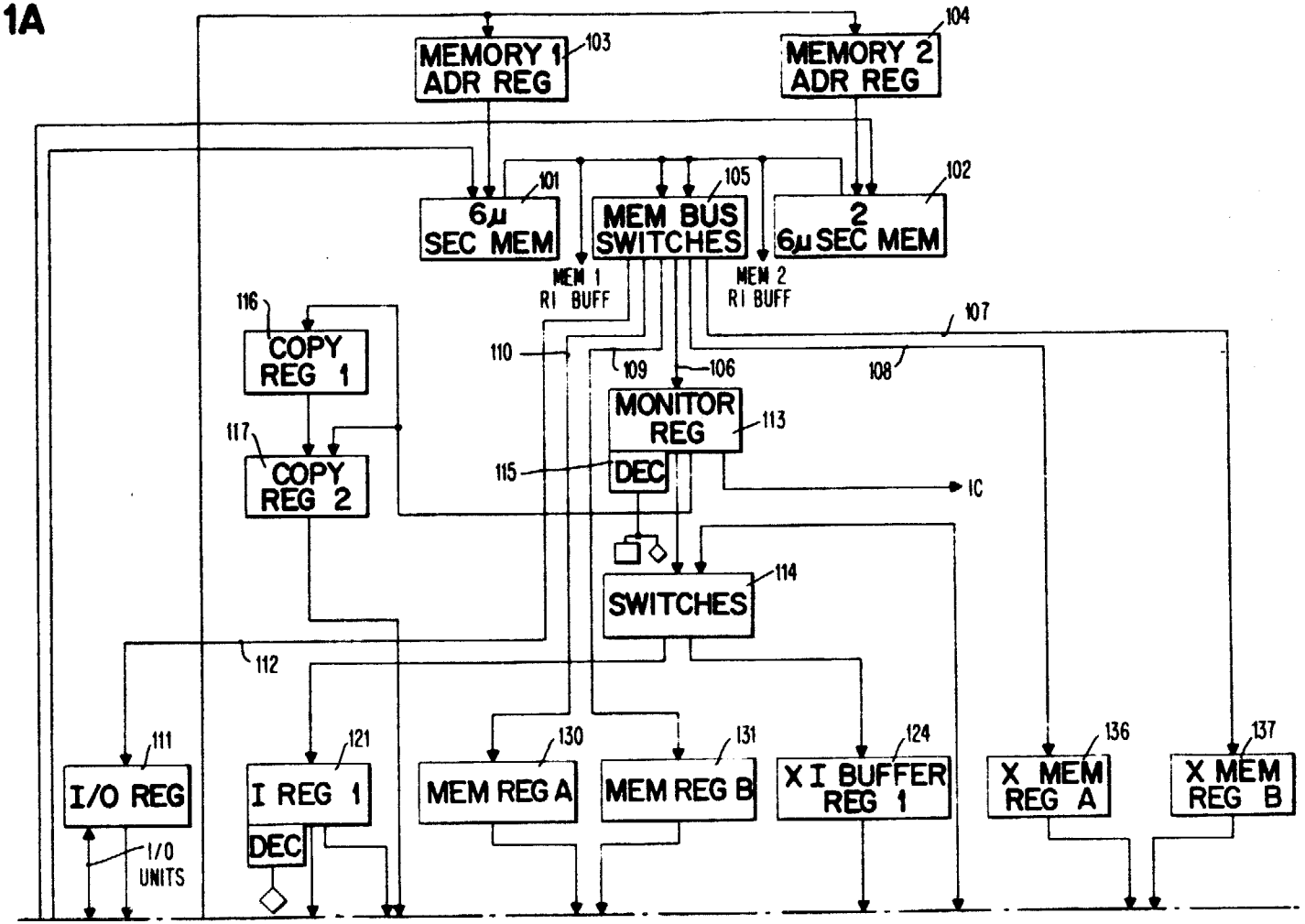

FIGURES 62 through 66 charts showing a sample operation and also including a legend associated herewith.

The parallel-type calculator of this invention may employ two high speed memories. A memory particularly suited for this calculator, as modified in a manner subsequently to be described, is described and claimed in U.S. application Serial No. 570,199, now Patent 2,914,248, entitled, "Program Control for a Data Processing Machine," by Harold D. Ross et al. This memory is a core memory and, in the present invention, has a six-microsecond memory cycle, three microseconds for read-in and three microseconds for read-out. By appropriate interleaving of two such memories, an effective three-microsecond memory cycle can be obtained for the calculator. Hereinafter a cycle shall refer to this effective three-microsecond memory cycle.

The calculator of this invention may employ two computers, a main computer and a control computer. Both include an associated arithmetic unit and instruction registers. An instruction counter, normally incremented by 1 each cycle, may address either memory and pull out an instruction for either computer. Under normal operation the memories are addressed alternately. The instructions are broadly divided into two groups:

(1) Instantaneous instructions.
(2) Not instantaneous instructions.

The instantaneous instructions include the following:

(1) Stop and transfer.
(2) Transfer.
(3) Copy.
(4) Sense.
(5) Read.
(6) Read backward.
(7) Write.
(8) WR EOF.
(9) REW.
(10) No operation.

Of these instantaneous instructions only a copy instruction requires a memory cycle. A priority control associated with the system allocates to a copy instruction the highest priority relative to access to memory and this is termed a copy cycle. If the instruction is not a copy instruction then the priority control allocates the next level of priority to withdrawing another instruction from memory as determined by the instruction counter and this is called an instruction reference cycle. If priority control determines that neither a copy cycle nor an instruction reference cycle can be executed, it allocates to the next level of priority a store cycle. If priority control determines that neither of the above three can be executed, then the next level is a data reference cycle. If neither of these four can be executed, then the next level according to the priority control is a special instruction reference cycle. Between the two computers the main computer receives priority over the control computer.

To implement this priority the calculator includes the priority control which surveys once each cycle the status of the calculator and determines the type of memory cycle to be performed during the next memory cycle.

As is well known, some instructions require more than the single memory cycle for execution. For example, a store instruction may be executed in one memory cycle while a copy instruction may take a plurality of cycles for execution. It can be appreciated in connection with a copy instruction that an input-output unit such as a tape must be properly oriented as determined by the Op code portion of the copy instruction before it can receive data from memory or feed data to memory. It is apparent that time may be lost if the computers were required to complete the execution of each instruction before proceeding to the next instruction. In the example cited, a number of store cycles could possibly be executed while awaiting the execution of the copy cycle To achieve time saving, this calculator provides means associated with each computer to store a plurality of instructions and this means functions in cooperation with priority control to achieve time efficiency. Priority control is able to survey the status of the calculator once each memory cycle and to choose a particular one of the plurality of instructions available to it for execution in a manner to achieve this time efficiency. This is called the look-ahead feature.

In many instances the program of instructions may require an iterative operation. In the usual case the first instruction is pulled out of memory, executed, then the next instruction is pulled out of memory and executed. This process is repeated involving a number of instructions determined by the iterative program. Then the program may be repeated to accomplish the iterative operation. Each repeat, then, requires access to memory for each instruction forming the iterative program. To eliminate the repeated access to memory for such a program this calculator provides a latch mode operation. In such a mode the instructions for the iterative program are pulled out of memory once and stored in the registers of the main computer and looped to achieve repetition of the instructions in accordance with the iterative program. No instruction reference cycles for the main computer are required between loops for this type of program. Therefore it can be seen that during the execution of a latch mode operation memories may be used to perform memory cycles in the control computer and other than instruction reference cycles in the main computer.

Memory functions to store information in the form of data and instructions words. A full data word contains a sign bit and 35 information bits or in the case of a half word a sign bit and 17 information bits. An instruction word contains a sign bit in the zero bit position, an Op code in the 1-to-5 positions, an address in positions 6 to 17 and a computer bit in position 18. The instruction counter is a 12-bit counter and under normal conditions of incrementing, addresses first one memory and then the other memory. If priority control permits an instruction reference cycle, an instruction at the address designated by instruction counter is read out. This instruction may be an instantaneous instruction or a "not" instantaneous instruction. If the former and a copy instruction, then a memory cycle is involved—that is, memory either stores information from a selected input-output or information from memory is read out to a selected input-output unit. If the instruction is a "not" instantaneous instruction and a memory cycle is involved, it may require a store cycle or a data cycle. In a store cycle information from a selected unit in the arithmetic section of either of the computers is stored in a selected address in memory. There are three such store instructions as follows:

(1) STORE ACCUMULATOR in which the 36 bits of the accumulator are stored in memory.

(2) STORE ADDRESS in which the bits 6 to 17 of the accumulator are stored in memory.

(3) STORE MQ in which the 36 bits in the multiplier quotient register (MQ) are stored in memory.

If a data cycle is involved, information at a selected address in memory is read out into a selected unit in the arithmetic section of either computer. There are ten such data instructions:

(1) Reset and Add.
(2) Add.
(3) Add absolute.
(4) Reset and Subtract.
(5) Subtract.
(6) Subtract absolute.
(7) Multiply.
(8) Multiply round.
(9) Divide.
(10) Load MQ.

The instantaneous instructions which do not require a memory cycle are:

(1) Stop and transfer.
(2) Transfer.
(3) Sense.
(4) Read.
(5) Read backwards.
(6) Write.
(7) Write EOF.
(8) REW.
(9) No operation.

The "not" instantaneous instructions not requiring a memory cycle are:

(1) Transfer on overflow.
(2) Transfer on plus.
(3) Transfer on zero.
(4) L. left.
(5) L. right.
(6) Accumulator right.
(7) Accumulator left.
(8) Latch.

Figure 1B:
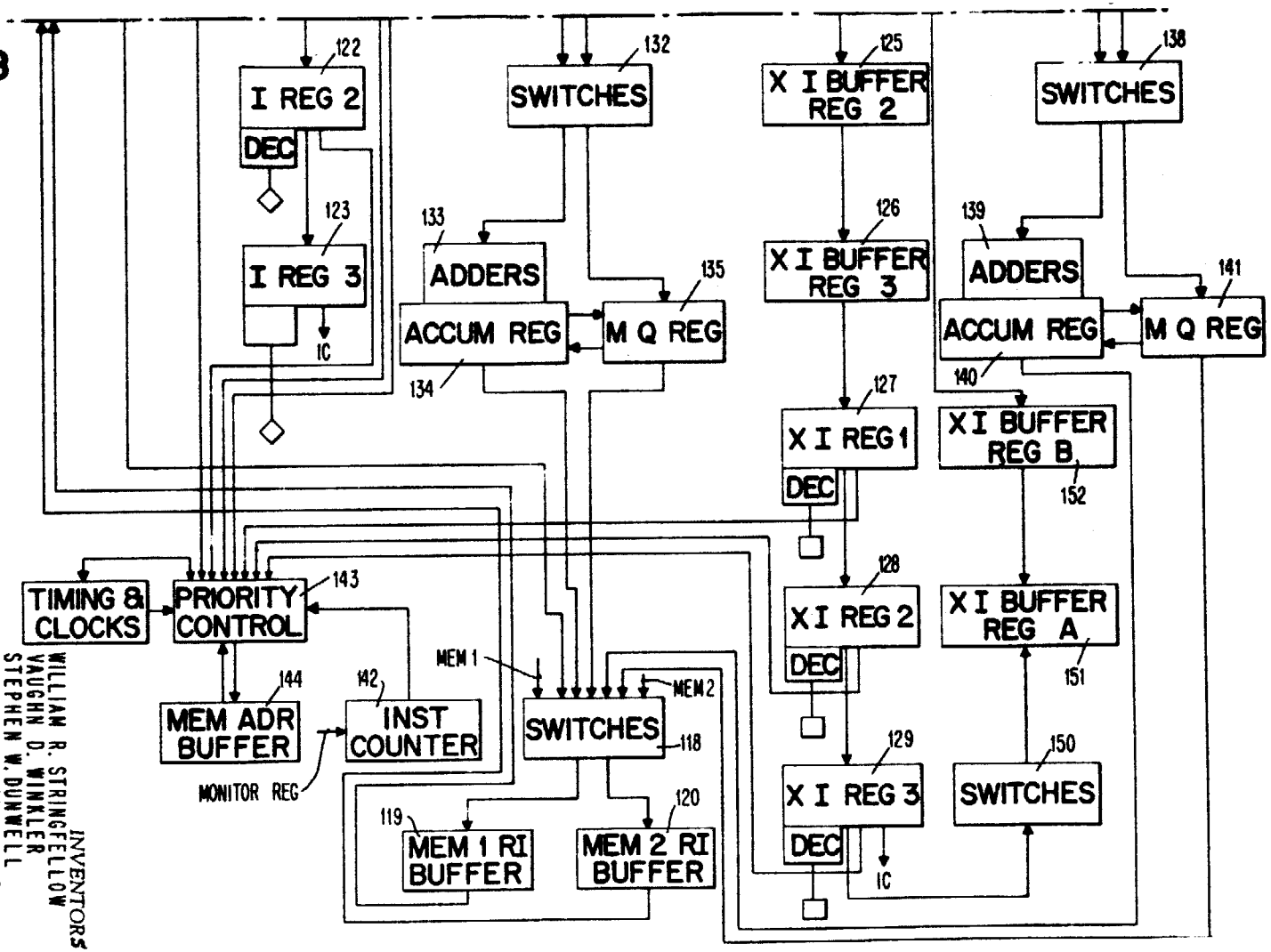

Referring now to FIGURES 1A and 1B, there is shown a general system flow sheet of the calculator constructed in accordance with this invention. As can be seen from this figure, two memories are employed and identified as 101 and 102. These are high speed memories of the type previously referred to. The memory cycle for these memories is six microseconds. The first three microseconds are allotted for reading information out of memory and the second three-microsecond period is allotted for writing information into memory. The memory described in the above-identified application to Ross et al. actually utilizes a 7.5-microsecond cycle. However, for purposes of the present invention and in order to obtain a six-microsecond cycle, the MEMORY PULSE DISTRIBUTOR of the above-identified application has been replaced with the MEMORY PULSE DISTRIBUTOR shown in FIGURE 21 of the instant application, subsequently to be described. Furthemore, in the instant application, information is read directly from the sampling gates of a memory to the registers of the control and main computers without first being sent to a memory buffer register such as is the case in the previously mentioned application to Ross et al. Also, the word bit capacity of the memories in the instant case must be increased over that of the reference application in order to accommodate a 36-bit word. Associated with each of the memories is its memory address register. Memory address register 103 functions in connection with memory 101 and memory address register 104 functions in connection with memory 102. These memory address registers perform the same function as the memory address register shown and described in the above-identified application to Ross et al. The memory but switches generally indicated at 105 function to route the information read out of the memories to the monitor register 113 via line 106, the main computer via lines 107 and 108, the control computer via lines 109 and 110, and the input-output register 111 via line 112. Information read from memory 101 is also always sent to buffer 119, while that from memory 102 is always sent to buffer 120. Monitor register 113 stores instructions read out of memory. It is a 19-order register of the static type such as shown and described in application Serial Number 419,642, now Patent No. 2,974,866, of J. A. Haddard et al. hereinafter referred to as IBM 701. Because of the employment in the instant system of two computers, the instruction word read out of memory contains an additional bit position, namely bit position 18. This may be called the computer bit. It determines to which computer the instruction is to be routed. Consequently monitor register 113 differs from the memory register in the IBM 701 only by the provision of this additional bit. This eighteenth bit position controls the switches indicated at 114 to perform the function of routing the instruction to either the main or control computer.

Associated with the Op code portion of the instruction in the monitor register 113 is a decoder 115. This decoder decodes the Op code portion of the instruction word, bit positions 1 to 5, inclusive.

If the decoder detects a copy instruction, the address thereof from the address portion is substantially immediately sent to either copy register 1 or copy register 2 provided either one of said registers is empty. Copy register 1 is indicated at 116 and copy register 2 at 117. If it is assumed that both of these registers are empty, then the copy address is sent to copy register 2. If, however, copy register 2 is full, that is, containing a previous copy address, then the copy address from the monitor register is sent to copy register 1. At the same time the decoder functions to initiate the operation of the selected input-output unit which is to perform the copy function, either to read information into a selected memory or to read information out of a selected memory to the input-output unit. If it is assumed that the copy instruction is to copy information from, for instance, a tape into memory as soon as the selected information from the tape is stored in the input-output register 111 indication is given to the system that the copy instruction is ready to be executed. Assuming the execution of the instruction, the information in register 111 is fed to the switches 118 where it is directed to either the memory 1 buffer register 119 or the memory 2 buffer register 120. From these registers it is sent to the appropriate memory to be read thereinto. If it is assumed that the copy instruction calls for reading out of memory to a selected input-output unit, then the information is read out of the selected memory through the memory bus switches 105 and stored in the input-output register 111 where it is fed to the selected input-output unit as soon as said unit is ready to receive this information. This information from the selected memory is also sent to its associated buffer 119 or 120 to be used for rewriting back into the memory so that it is not lost, since destructive readout from memory is employed.

If we now assume that the monitor register stores an instruction which is not an instantaneous instruction, then at the appropriate time this information is fed through switches 114 to the designated computer, either the main or control computer. As shown in this drawing, the control computer is the one to the left and the main computer the one to the right. The associated circuitry in the main computer is designated with a prefix X. If it now is assumed that the instruction word is to be fed through the switches 114 to the control computer, this instruction is fed to the IR–1 register 121. This register receives the instruction word parallel by bit. It is serially connected for information flow with registers IR–2 indicated as 122 and IR–3 indicated as 123. Associated with each of the registers IR–1, IR–2 and IR–3, which are 17-bit registers, is a decoder for functional operation with the Op code portion of the instruction word. For reasons which will be apparent later, IR–1 recognizes data instructions, IR–2 store instructions and IR–3 functions similarly to the instruction register of IBM 701. It contains a countdown counter to count the number of certain steps during, for example, multiply, divide or shift operations. Before a data reference or store instruction can be executed it must be flushed down through the serial chain of registers to IR–3. The decoder functioning in connection with IR–3 sets up the necessary switches to perform the instruction contained in this register. The decoders in connection with registers IR–1 and IR–2 function in connection with the priority control for reasons which will become apparent later.

If it is assumed that the instruction in the memory register is to be routed to the main computer, the switches 114 are set up to route the instruction to the XIB–1 register 124. XIB–1 register 124, XIB–2 register 125, and XIB–3 register 126 function in connection with the main computer. They are serially connected for information flow and each is a 17-bit register. The XIR–1 register 127, XIR–2 register 128, and XIR–3 register 129 are further connected in series with registers XIB–1, XIB–2, and XIB–3 for serial flow of information and are also 17-bit registers. The decoders functioning in connection with registers XIR–1 and XIR–2 recognize respectively data instructions and store instructions. The decoder in connection with register XIR–3 functions similarly to the decoder associated with register IR–3 in the control computer. The arithmetic units of the two computers are identical. They include two memory registers connecting through switches with adders, accumulator register and multiplier quotient register. In the control computer memory register A is indicated at 130, memory register B at 131, the switches at 132, the adders 133, the accumulator 134 and the multiplier quotient register or MQ register at 135. In the main computer the X memory register A is indicated at 136, the X memory register B at 137, the switches 138, the adders 139, the X accumulator 140 and the XMQ register 141. The arithmetic units of the control and main computers are identical to the computer in the IBM 701 with the single exception that in the instant system two memory registers are associated with each computer rather than a single memory register. Each memory register in the instant system is identical to the memory register in the IBM 701 as are the switches, adders, accumulator register and MQ register. All arithmetic operations accomplished by the control and main computer are accomplished in the same fashion as in the IBM 701 and in accordance with the same timing.

The instruction counter 142 is identical to the instruction counter in the IBM 701. It is under normal operation incremented by 1 each three-microsecond interval. It contains a 12-bit memory address either for memory 1 or memory 2. If we assume that an instruction reference cycle is permissible, the address in instruction counter 142 is by virtue of the functioning of the priority control 143 fed to the 12-bit memory address buffer 144. The address in memory address buffer 144, through priority control 143, is sent to the selected address register 103 or 104 depending upon the memory to be addressed. The inruction at the selected address is read out through the memory bus switches 105 to the monitor register 113 via path 106, and it is also sent to the associated buffer 119 or 120. As previously stated, this is a parallel type operation. If the priority control determines that the instruction in the monitor register can be flushed to its designated register in the selected computer, this is done during the next three-microsecond period. If we assume that the instruction is a data instruction and is to be sent to the control computer, the instruction is then consequently sent to IR–1.

If priority control permits a data reference cycle the address portion of the data instruction in IR–1 is transferred to the memory address buffer and the entire instruction is flushed to IR–2. The address is gated from the memory address buffer to the memory address register for the selected memory. The information is withdrawn from the selected memory to its associated buffer 119 or 120 and through the memory buffer switches is also stored in either memory register A or memory register B. The data instruction is flushed to IR–3 and the decoder associated therewith functions to operate switches 132 to gate contents of the appropriate memory register A or B to the selected unit of the arithmetic section. Of course, if the data instruction were for the main machine similar operation occurs involving the registers in the main machine and the arithmetic unit thereof.

In the case of a store instruction, such an instruction is recognized in IR–2 or XIR–2, as the case may be. This calls for storing in the memory information from the arithmetic unit. This information is pulled out of the arithmetic unit and gated through the switches 118 to either buffer 119 or 120 depending upon the particular memory involved. With the address stored in the designated address register 103 or 104 the information from the buffer 119 or 120 is read into the selected memory. It is noted that when a READ COPY CYCLE or a STORE CYCLE for a memory is being performed, no information is obtained at the output of this memory.

In the event of LATCH MODE operation switches 150 in the main machine are closed to provide a loop of instruction registers including 124 through 129 and also 151 and 152.

Figure 10:
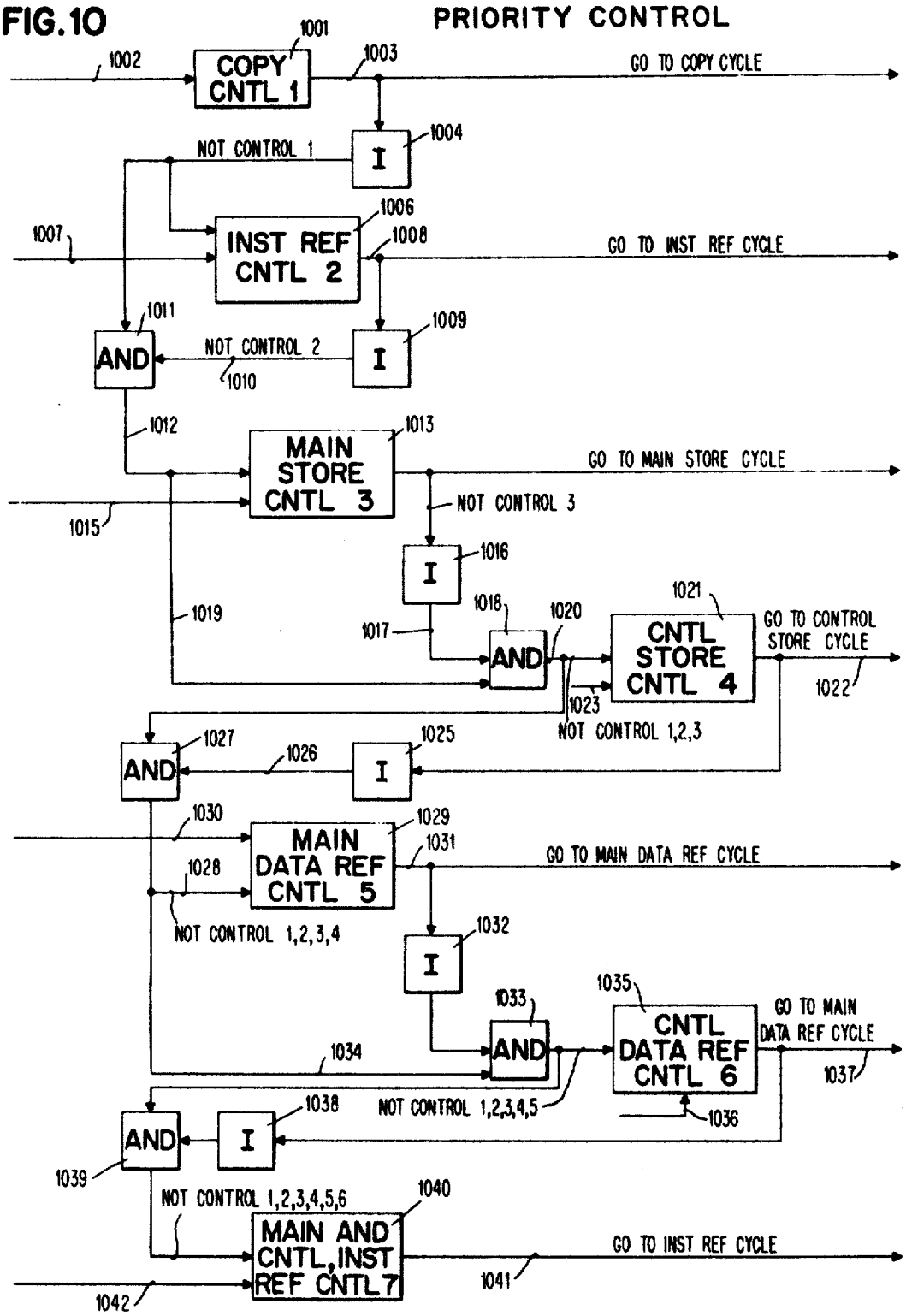
FIGURE 10 is a diagrammatic view of the priority control.

Referring now to FIGURE 10, there is shown a block diagram of the priority control 143 of FIGURE 1. The COPY CONTROL 1 circuit is indicated at 1001. Provided the necessary inputs are applied to line 1002 then a signal on 1003 is obtained indicating GO TO COPY CYCLE. With line 1003 up to provide the GO TO COPY CYCLE, the inverter 1004 applies a down level inhibit signal at its output on line 1005 and this inhibit is indicated as NOT CONTROL 1. It can be seen then, that all of the other controls identified as controls 2 to 7, inclusive, are thereby inhibited. If line 1003 does not indicate a GO TO COPY CYCLE the output of the inverter 1004 is up and conditions INSTRUCTION REFERENCE CONTROL 2 circuit 1006 to receive proper signals on its input line 1007. This will provide an output on line 1008 which goes up to provide GO TO INSTRUCTION REFERENCE CYCLE and an inhibit at the output of inverter 1009 on line 1010. AND gate 1011 mixes the NOT CONTROL 1 signal on line 1005 and the NOT CONTROL 2 signal on 1010 and will provide an inhibit at its output in the event that either of these lines is down. The output from AND gate 1011 is indicated as the NOT CONTROL 1, 2 signal. If this output line 1012 is up indicating neither a copy nor instruction reference cycle, then the MAIN STORE CONTROL 3 indicated at 1013 can provide an output therefrom at line 1014 responsive to input signals on line 1015. The output on 1014 is indicated as GO TO MAIN STORE cycle. This means that the main computer can execute a store cycle. It should be noticed at this time that the output on 1003, GO TO COPY CYCLE, can indicate a copy for either the main or control computer. An output on line 1008, GO TO INSTRUCTION REFERENCE CYCLE, can indicate an instruction reference cycle for either the main or control computer. However, an output on line 1014 indicates only a GO TO MAIN STORE CYCLE for the main computer. If line 1014 is down indicating that there is no main store cycle, in other words NOT CONTROL 3, then the output of inverter 1016 is up on line 1017 to condition AND gate 1018. If additionally there is an up level on line 1019 indicating NOT CONTROL 1, 2 this AND gate will provide a NOT CONTROL 1, 2, 3 on line 1020. This conditions the CONTROL STORE CONTROL 4 circuit 1021 to provide an output on line 1022, GO TO CONTROL STORE CYCLE, incident to proper inputs on line 1023. If line 1022 is down providing a down level input on line 1024 to inverter 1025 then line 1026 is up. AND gate 1027 mixes the conditions of lines 1012 and 1026 to provide a NOT CONTROL 1, 2, 3, 4 on line 1028 to the MAIN DATA REFERENCE CONTROL 5 indicated at 1029. This conditions 1029 so that proper input signals on line 1030 will provide a GO TO MAIN DATA REFERENCE CYCLE on line 1031. Line 1031 is connected to the input of inverter 1032 to invert the condition of line 1031 and to connect its output to AND gate 1033. Line 1034 connects the output of AND gate 1027 to AND gate 1033. If the output of AND gate 1033 is up, this indicates NOT CONTROL 1, 2, 3, 4, and 5 to condition the CONTROL DATA REFERENCE CONTROL 6 indicated at 1035. Proper inputs on line 1036 to 1035 will provide an output on 1037 which is GO TO CONTROL DATA REFERENCE CYCLE. Line 1037 is connected to inverter 1038 whose output is connected to AND gate 1039. AND gate 1039 mixes the output of inverter 1038 and AND gate 1027. If the output of AND gate 1039 is down this indicates NOT CONTROL 1, 2, 3, 4, 5, and 6. This will condition MAIN AND CONTROL INSTRUCTION REFERENCE CONTROL 7 indicated at 1040 to provide an output on line 1041 upon the application of proper signals to line 1042. This output is indicated as GO TO INSTRUCTION REFERENCE CYCLE. Control 7 is used in special cases to be identified later when none of the previous cycles can be executed.

Therefore, it can be seen, in accordance with this block diagram that highest priority is a COPY CYCLE followed by INSTRUCTION REFERENCE CYCLE followed by a MAIN STORE CYCLE, followed by a CONTROL STORE CYCLE, followed by a MAIN DATA REFERENCE CYCLE, followed by a CONTROL DATA REFERENCE CYCLE, followed by the SPECIAL INSTRUCTION REFERENCE CYCLE. The implementation of the block diagram of FIGURE 10 is contained in separate figures.

First referring to FIGURE 2, there is shown the circuitry for the COPY CONTROL 1. In FIGURE 2 the COPY CONTROL 1 circuit is available to provide the following controls: START MEMORY 1, GO TO COPY WRITE CYCLE, gate the contents of copy register 2 to the memory address buffer, GO TO COPY READ CYCLE, NOT CONTROL 1, and START MEMORY 2. Directing attention to the provision of a START MEMORY 1 signal, it can be seen that this is obtained from the output of OR gate 207. One input to OR gate 207 comes from the output of AND gate 203 and the other from the output of AND gate 204. The READ COPY PROCEED signal is applied to one of the inputs to AND gate 203. It is obtained in accordance with this invention in the same manner as shown in connection with the IBM 701. The other input to AND gate 203 comes from the output of AND gate 201. One input to AND gate 201 is from the least significant position or units position in the copy register 2 identified by numeral 117 in FIGURE 1. This is identified as (12) meaning that this line is up if there is a 1 in the units position or in the twelfth bit position in the copy register 2. A (12) indicates a copy for MEM 1 and ($\overline{12}$) for MEM 2. The other input to AND gate 201 comes from FIGURE 9 and is the MEMORY 1 OFF signal which is at an up level when memory 1 is OFF meaning that memory 1 is available at the commencement of the next three-microsecond cycle. If we assume that these three signals are up AND gate 201 is unblocked, thus unblocking AND gate 203. The up level output from AND gate 203 passes through the OR gate to provide a START MEMORY 1 signal to the clock of FIGURE 9. If instead of the READ COPY PROCEED line being up the WRITE COPY PROCEED line were up, then of course, the same result would be obtained as far as the START MEMORY 1 signal is concerned. However, assuming that we have a READ COPY PROCEED the output of AND gate 203 is also fed to OR gate 210. The output of OR gate 210 goes up to provide a GO TO COPY READ CYCLE. If we had a WRITE COPY PROCEED signal to AND gate 214 instead, then the output of OR gate 208 would go up to provide the GO TO COPY WRITE CYCLE. If the units position in the copy register 2 were at 0 or ($\overline{12}$), then it can be seen by similar logic that we would obtain a START MEMORY 2 signal in combination with either a GO TO COPY WRITE CYCLE or GO TO COPY READ CYCLE. Provided the output of OR gate 205 is down inverter 209 provides the signal as NOT CONTROL 1 in the manner set forth in FIGURE 10. AND gate 206 is one of 12 similar AND gates all functioning to gate the contents of copy register 2 into memory address buffer 144 as shown in FIGURE 1. This involves the transfer of the copy address from copy register 2 to the memory address buffer. The output of OR gate 205 goes to one input to each of these 12 AND gates and each of the 12 stages of copy register 2 has its associated AND gate 206.

Now referring to FIGURE 3 there is shown the GO TO INSTRUCTION REFERENCE CONTROL 2. The outputs obtainable from this control are START MEMORY 1, START MEMORY 2; GO TO INSTRUCTION REFERENCE CYCLE; gating of the address in the instruction counter to the memory address buffer 144 in FIGURE 1, and the signal NOT CONTROL 1, 2 as shown in connection with FIGURE 10. The latter signal is of course obtained if we have up level on the NOT CONTROL 1 signal from FIGURE 2 and the output of inverter 306 is up providing coincident up levels to AND gate 307. The inverter 306 has its input connected to the output of OR gate 304 which provides the GO TO INSTRUCTION REFERENCE CYCLE. If this line is up indicating an INSTRUCTION REFERENCE CYCLE then of course AND gate 307 is blocked, thus providing an inhibit output therefrom. Also if the output of OR gate 304 is up indicating a GO TO INSTRUCTION REFERENCE CYCLE, AND gate 305 is unblocked and the address in the instruction counter 142 of FIGURE 1 is gated to the memory address buffer 144. Again here it must be understood that the instruction counter 142 and the memory address buffer 144 are 12-bit registers, each bit having its associated AND gate 305. One input to each of the associated AND gates 305 is from the output of OR gate 304.

The seventeenth bit position from instruction counter 142 (from the twelfth stage therein) is fed to AND gate 311 and if it is a 1 (17), this line is up. To this AND gate is also fed the MEMORY 1 OFF signal from FIGURE 9. To the AND gate 310 is fed the NOT CONTROL 1 signal from FIGURE 2 and the NOT BLOCK I REFERENCE signal from FIGURE 27. Additionally, the third input to AND gate 310 is connected to the output of AND gate 307, the output of AND gate 314, the INSTANTANEOUS END OF OPERATION—NOT TRANSFER AND STOP from FIGURE 33 and the LATCH EXIT from FIGURE 48. The output of AND gate 310 is fed to AND gate 311 and AND gate 312. The output of AND gates 311 and 312 are fed to the inputs to OR gate 304. Two additional inputs to AND gate 312 are MEMORY 2 OFF from FIGURE 9 and the 17-bit position from the instruction counter which is up if said bit is a zero—($\overline{17}$). As can be seen, if the seventeenth bit position in the instruction counter is a 1 this will condition AND gate 311. If it is a zero it will condition AND gate 312. The signals from the seventeenth position of the instruction counter come from the circuitry of FIGURE 11.

Figure 9:
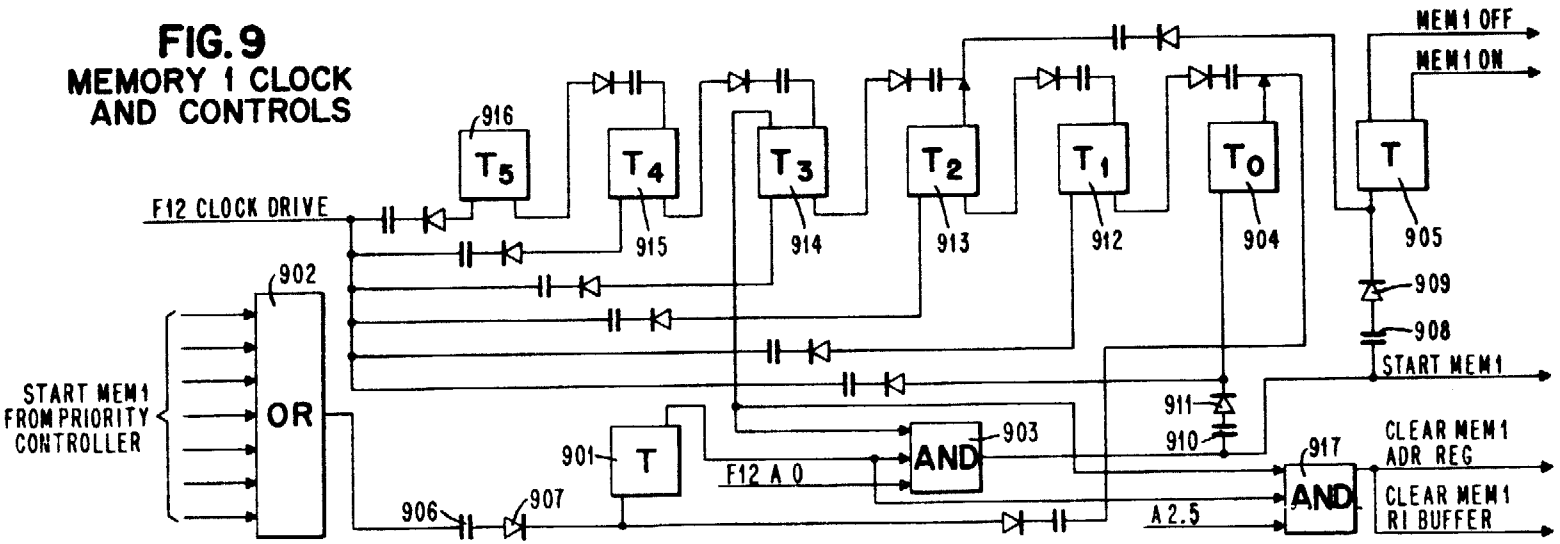
FIGURE 9 is a diagrammatic view of the memory clock and controls.

From FIGURE 22 is fed the seventeenth bit position (17) of the monitor register 113 of FIGURE 1 and the MEMORY 1 OFF signal from FIGURE 9. To AND gate 301 is fed the INSTANTANEOUS END OF OPERATION FOR TRANSFER AND STOP from FIGURE 33 and the NOT CONTROL 1 signal from FIGURE 2. The output of AND gate 301 is fed to AND gate 302 and AND gate 303. To the input to AND gate 303 is also fed the MEMORY 2 OFF signal from FIGURE 9 and the seventeenth bit position ($\overline{17}$) of the monitor register from FIGURE 22. In this connection it should be noted that if the seventeenth bit position of the monitor register is a 1 this will condition AND gate 302. If it is a zero it will condition AND gate 303. Again it should be recalled that this seventeenth bit position of the instruction (same as twelfth stage of instruction counter) determines which of the memories is to be used. If the seventeenth bit position is a 1 it indicates use of memory 1 at the beginning of the next cycle. If it is a zero it indicates the use of memory 2 at this time.

It should be noted that a transfer operation involves the transfer of the address in the monitor register to the instruction counter. This is an instantaneous instruction performed in an instruction reference cycle. The transfer instruction is read out of memory at time A1.5. The decoder associated with the Op code portion of the transfer instruction in the monitor register immediately recognizes the transfer and the transfer line goes up. At A2.0 time the transfer is accomplished. Of course, the transfer instruction is still stored in monitor register because it is not cleared until A1.0 time of the next three-microsecond cycle. Instantaneous instructions are executed from the monitor register. Therefore, assuming a transfer instruction in monitor register the monitor register bit position 17 from FIGURE 22 line is up if the 17-bit position is occupied by a 1 and AND gate 302 is unblocked provided memory 1 is off at this time and an INSTANTANEOUS END OF OPERATION FOR TRANSFER OR STOP signal is fed to AND gate 301 together with the NOT CONTROL 1 signal from FIGURE 2. AND gate 302 is unblocked to provide START MEMORY 1. If on the other hand, memory 2 is off and monitor register bit position 17 is at zero then AND gate 303 is conditioned to provide START MEMORY 2.

Figure 61:
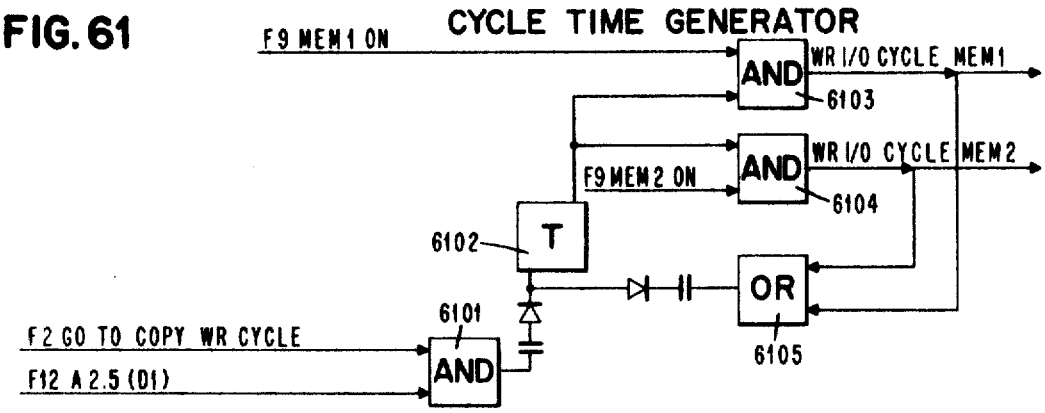
FIGURE 61 is a diagrammatic illustration of a cycle time generator.

If, however, there is no instantaneous instruction and the instruction reference cycle is to be controlled by the instruction counter, either AND gate 311 or AND gate 312 is unblocked to provide the GO TO INSTRUCTION REFERENCE CYCLE signal. These AND gates also provide the START MEMORY 1 or START MEMORY 2 signals. In this connection attention is directed to AND gate 310. To this AND gate is sent the NOT CONTROL 1 signal from FIGURE 2, the NOT BLOCK I REFERENCE from FIGURE 27 and the outputs of AND gates 307 and 314. Additionally there is fed the INSTANTANEOUS END OF OPERATION (NOT TRANSFER AND STOP) and the LATCH EXIT signal. To permit an instruction cycle it must be recalled that the monitor register must be emptied in order to receive the instruction withdrawn from memory. The monitor register flushes its address, in a not instantaneous instruction operation, to either IR–1 register of XIB–1 register. Ultimately the instructions in XIB–1 register will be flushed down through the registers to XIR–3. XIR–1 recognizes data instructions and XIR–2 recognizes store instructions. If the computer control bit 18 in monitor register is a zero this indicates that (1) the monitor register is empty or (2) its instruction will go to the control computer. If IR–1 is empty then AND gate 314 is unblocked since both inputs are up. This provides an up level to AND gate 310. If, however, IR–1 is full containing other than a data instruction, such as a store instruction, then the NOT DATA DEMAND line from FIGURE 53 is up. If IR–2 is empty indicating that the instruction in IR–1 can be flushed to IR–2, then IR–2 EMPTY line from FIGURE 61 is up thus unblocking AND gate 313. This together with the zero in the eighteenth bit position of the monitor register unblocks AND gate 314 to provide an up level to AND gate 310. If, however, the computer control bit in the eighteenth position of monitor register is a 1, this indicates that its instruction will go to the main computer. If XIR–1 register 127 is empty and there is no latch mode, then AND gate 307 is unblocked to provide an up level to AND gate 310. If XIR–1 is full but XIR–2 is empty and no data instruction in XIR–1 (NO X DATA DEMAND), then AND gate 308 is unblocked. With this unblocked and no latch mode called for then AND gate 307 is unblocked to provide an up level to AND gate 310.

The instantaneous instructions can be divided into two groups. These are (1) transfer or stop and (2) instantaneous instructions, not transfer or stop. We have previously considered the effect of the GO TO INSTRUCTION REFERENCE CYCLE of the transfer instruction involving AND gate 301. A stop instruction effects this AND gate similarly. This will be explained later in connection with FIGURE 33. Both transfer and stop instructions involve gating the address portion of the monitor register to the instruction counter at A2.0 time. The condition of the registers in the control or main computer is of no consequence for such instructions. However, both do involve the monitor register. This is only because at sampling time the address transferred from the monitor register to the instruction counter under transfer or stop is considered to be unstable. The type (2) instantaneous instructions referred to above do not involve monitor register at sampling time. An illustration of such an instruction is copy. The address portion of a copy instruction is transferred from the monitor register to the copy register at A2.0 time. At this time the line identified as INSTANT END OF OPERATION (NOT TRANSFER AND STOP) goes up. This line comes from FIGURE 33. Consequently, at sampling time A2.5 the priority control knows that the monitor register will be empty by A1.5 time of the next cycle so that a GO TO INSTRUCTION REFERENCE CYCLE may be accomplished. Therefore this line will unblock AND gate 310 to provide the GO TO INSTRUCTION REFERENCE CYCLE. As will be explained later in connection with the latch mode of operation, the signal entitled LATCH EXIT from FIGURE 48 will bring the LATCH EXIT line up to unblock AND gate 310 and provide a GO TO INSTRUCTION REFERENCE CYCLE on the next cycle.

As will be seen in connection with FIGURE 27, instruction reference cycles may be permitted as long as the signal not block I reference cycles are obtained. Further, under certain circumstances this signal line to AND gate 310 is down. Referring to FIGURE 27 for a moment, it can be seen that with an instantaneous instruction in monitor register, the trigger 2701 is turned ON to provide the signal block I reference cycles and through the inverter 2713 the signal not block I reference cycles go down. Consequently, AND gate 310 in FIGURE 3 is blocked thereby. Another condition which will bring the line not block I reference cycles down is the appearance of a conditional transfer in the monitor register when the system is not in latch mode operation. This will turn ON trigger 2702 at A2.0 time. Instruction reference cycles will thereby be blocked until the conditional transfer has been flushed to XIR–3 or IR–3 and said instruction has been executed as evidenced by the generation of the normal end Op signal or normal end Op X signal.

The next control is the GO TO STORE CONTROL (X) (3). For the functioning of this control reference is now made to FIGURE 4.

Figure 49:
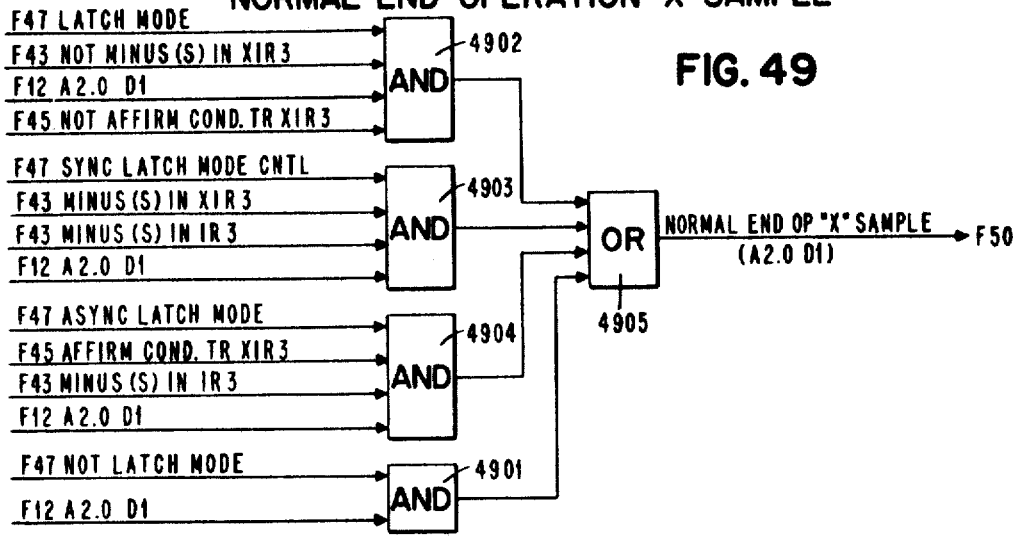
FIGURE 49 is a diagrammatic illustration of the generation of a NORMAL END OPERATION SAMPLE signal.
Figure 50:
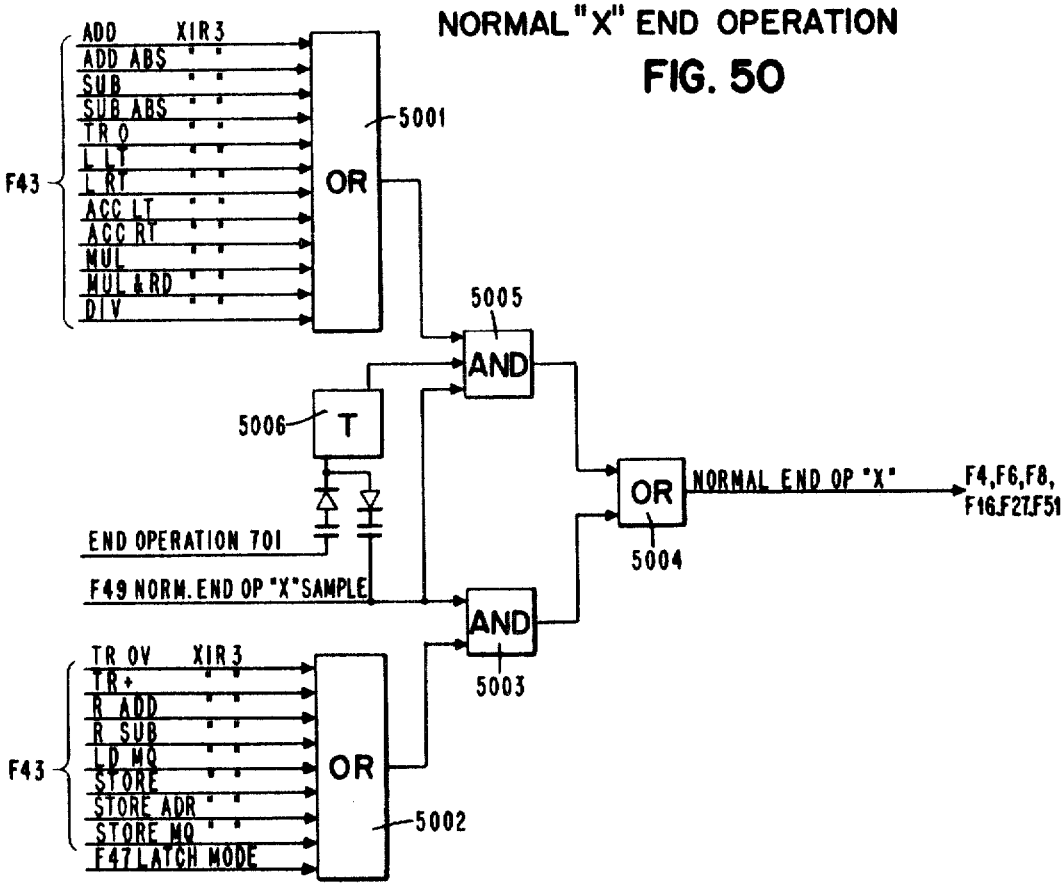
FIGURE 50 is a diagrammatic view of the generation of a NORMAL X END OPERATION signal.
Figure 63:
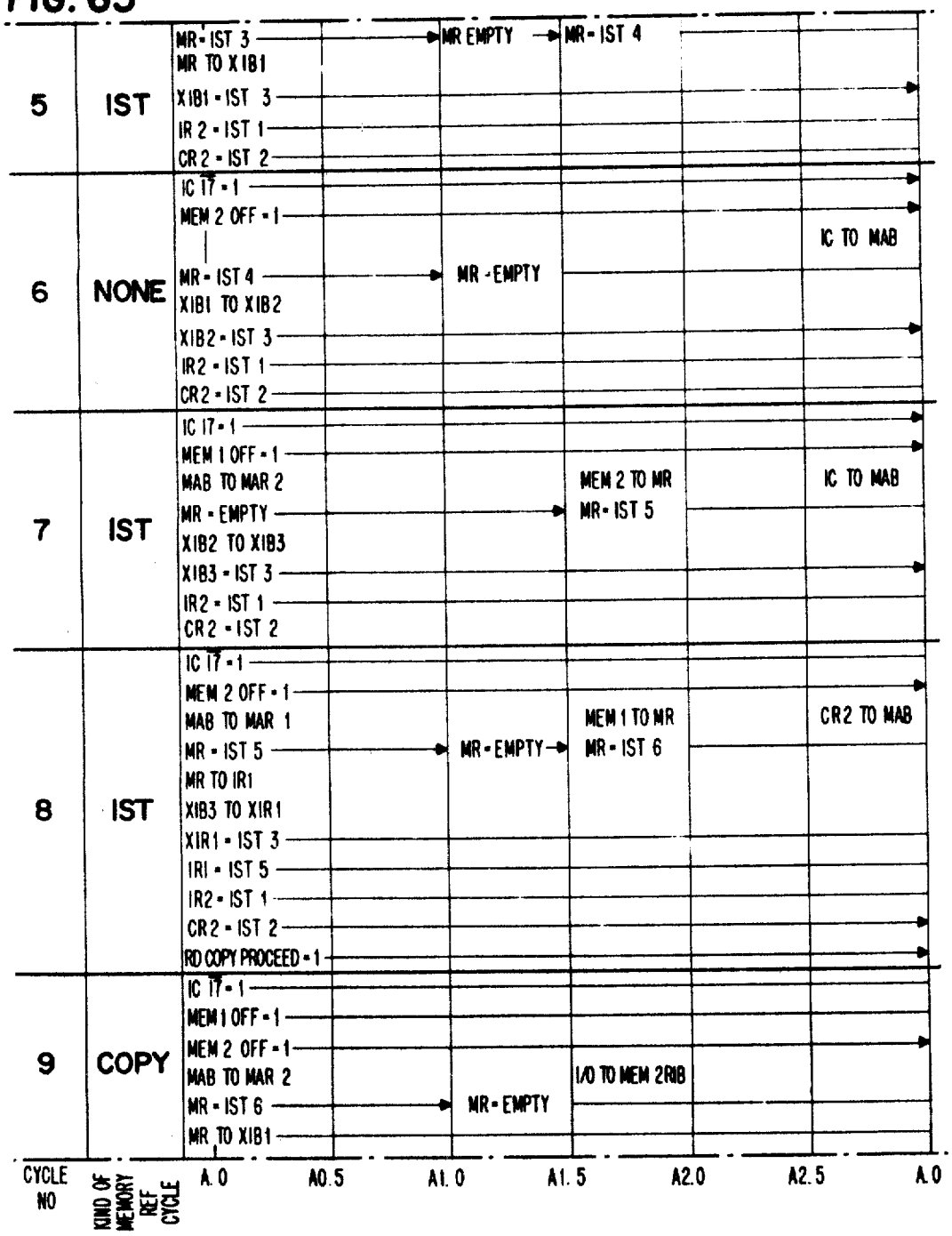
Figures 65, 66:
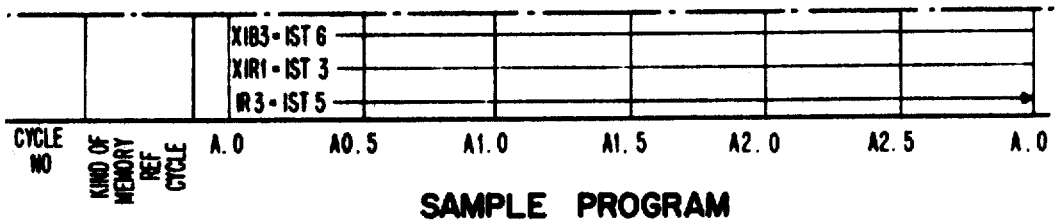

OR gate 401 has an output which when at an up level provides the GO TO STORE CYCLE (X). This output is up when either of the outputs from AND gates 402 or 403 are up. It should be recalled that this store cycle involves storing data from the main computer into a selected address in a designated memory. In the main computer the address for store is contained in XIR–2. A START MEMORY 1 signal is obtained at the output of AND gate 402 provided all of the inputs thereto are up. The first input is the seventeenth bit position of the store instruction in XIR–2. If it is a 1 then this line is up. If at this time memory 1 is OFF as indicated from FIGURE 9, then the MEMORY 1 OFF line is up. To AND gate 405 is fed X STORE DEMAND line from FIGURE 41. In accordance with this invention there are three possible store instructions. The first (STORE) is to store the 36 bits in the accumulator at the selected address of memory. The second (STORE ADR) is to store only bit positions 6 to 17 from accumulator at the selected address in memory, and the third (STORE MQ) is to store all 36 bits in MQ register into the selected address in memory. Provided a store instruction is stored in XIR–2, there is provided an up level on the X STORE DEMAND line to AND gate 405 in FIGURE 4. In order to get the GO TO STORE CONTROL (X) we must of course have an up level on the NOT CONTROL 1, 2 line from FIGURE 3 indicating neither a copy nor an instruction reference cycle. Recalling now that the instructions contained in XIR–3 of FIGURE 1 are those which will be executed in the main computer, these instructions fall broadly into two classes. The first are those which are accomplished in either 12 microseconds or multiples thereof. The second are those which will be accomplished in three microseconds. These two groups of instructions are shown in FIGURE 50. OR gate 5001 handles the 12-microsecond instructions and OR gate 5002 the 3-microsecond instructions. Turning to FIGURE 49 for a moment, if we assume no latch mode operation, then the NOT LATCH MODE line from FIGURE 47 will be at an up level to AND gate 4901. At A2.0 time AND gate 4901 is unblocked to provide an up level to the input to OR gate 4905. The output thereof is up at this time to give a NORMAL END OF OPERATION X SAMPLE signal. This signal is fed to the input to AND gate 5003 in FIGURE 50. If at this time XIR–3 register has decoded a 3-microsecond instruction, then AND gate 5003 is unblocked to provide an up level to OR gate 5004. The output thereof is then up at A2.0 time. This signal is sent to AND gate 405 in FIGURE 4 on the END OP (NORM) (X) line. Assuming then that there is an X STORE DEMAND from FIGURE 41 which is detected by the decoder associated with XIR–2, and a NOT CONTROL 1, 2 signal from FIGURE 3 indicating no copy cycle or instruction reference cycle and in addition a NORMAL END OPERATION X signal, then AND gate 405 will be unblocked to provide an up level to AND gates 402 and 403. If the position 17 in XIR–2 is a 1 and memory 1 is OFF, then we obtain a START MEMORY 1 signal to the circuit of FIGURE 9. If memory 2 is OFF and the seventeeth bit of XIR–2 is a zero, then AND gate 403 is unblocked to provide a START MEMORY 2 signal to the circuit of FIGURE 9. In either event the output of OR gate 401 goes up to give a GO TO STORE CYCLE (X) signal. Additionally, when this latter line goes up the address portion of the instruction in XIR–2 is gated to the memory address buffer at A2.5 time. It should again here be noted that each of the 12 stages in the address portion of XIR–2 are provided with individual AND gates 406. These AND gates control the flushing of this address portion in XIR–2 to the 12 stages in memory address buffer. If the output of OR gate 401 is down, the inverter 409 will provide an up level to AND gate 407 where it is combined with the up level provided by the NOT CONTROL 1, 2 signal from FIGURE 3. This provides the NOT CONTROL 1, 2, 3 signal at the output of AND gate 407. This of course means that there is no copy cycle, no instruction reference cycle and no store cycle for the main computer.

The AND gate 408 is unblocked by an X store demand together with the signal not control 1, 2 provided XIR–3 is empty.

The next control is the GO TO STORE CONTROL (4) for the control computer as shown in FIGURE 5. Here the logic is the same as that referred to in connection with FIGURE 4 only here we are referring to the control computer rather than the main computer. Therefore, reference is first made to FIGURE 54. Here again we see the OR gate 5401 which provides an up level on the STORE DEMAND output thereof if the decoder associated with IR–2 indicates STORE meaning store the 36 bits in the accumulator in the selected address of memory, STORE ADDRESS meaning store bit positions 6 to 17 of the accumulator in the selected address of memory, or STORE MQ meaning store the contents of the MQ register at the selected address of memory. Provided there are one of these three Op codes present, the STORE DEMAND line to AND gate 501 of FIGURE 5 is up. Assuming that the NOT CONTROL 1, 2, 3 line is up to AND gate 501 and the END OPERATION (NORMAL) line is up, then AND gate 501 is unblocked. In order to provide an up level on the END OPERATION (NORMAL) line, reference is made to FIGURE 59. In FIGURE 59 there is again shown the two types of normal operation possible. OR gate 5901 handles those operations which can be performed in twelve microseconds or multiples thereof and OR gate 5905 those which are accomplished in three microseconds. If we assume an up level output from OR gate 5905, AND gate 5902 will be unblocked by the NORMAL END OPERATION SAMPLE signal from FIGURE 58 which is similarly obtained as that sample pulse shown in connection with FIGURE 49. Consequently, OR gate 5903 will provide at its output an up level indicating NORMAL END OF OPERATION. This signal is sent to AND gate 501 in FIGURE 5 to provide an up level output therefrom to AND gates 502 and 503. Depending upon the condition of the seventeenth bit in IR–2 and which memory is OFF, the output of either AND gate 502 or 503 will provide either a START MEMORY 1 signal or a START MEMORY 2 signal and through OR gate 504 will provide a GO TO STORE CYCLE for the control computer. If the output of OR gate 504 is down, an up level is provided by inverter 505 to AND gate 506 which mixes the NOT CONTROL 1, 2, 3 signal to provide at the output thereof a NOT CONTROL 1, 2, 3, 4 signal. Provided there is a GO TO STORE CYCLE for the control computer, AND gates 507 will gate the address portion of IR–2 to the memory address buffer. Again here there are twelve separate AND gates 507, one for each stage in the memory address buffer.

AND gate 508 is unblocked by a store demand together with the signal not control 1, 2, 3, provided IR–3 is empty.

Figures 6, 7:
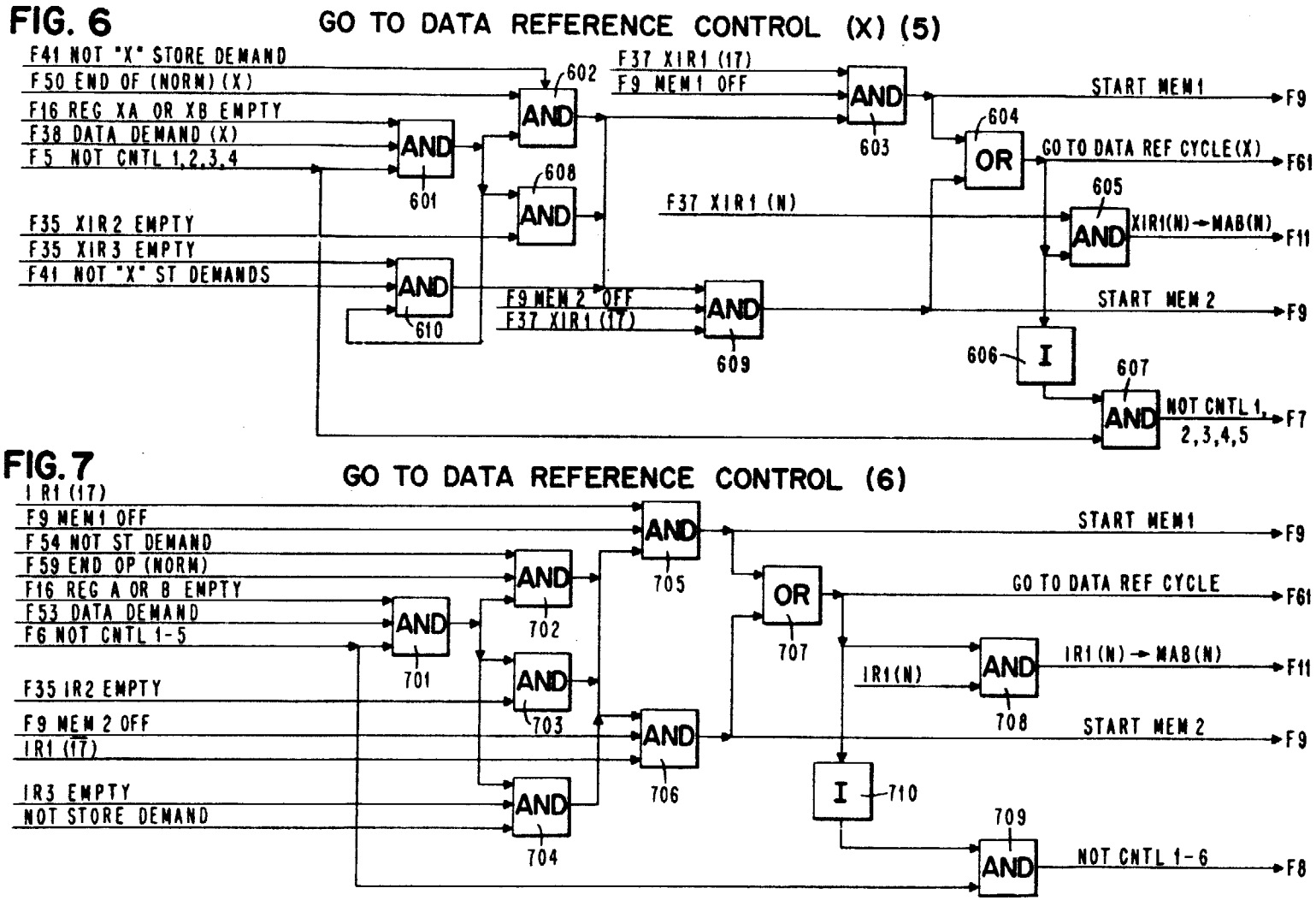
Figure 37:
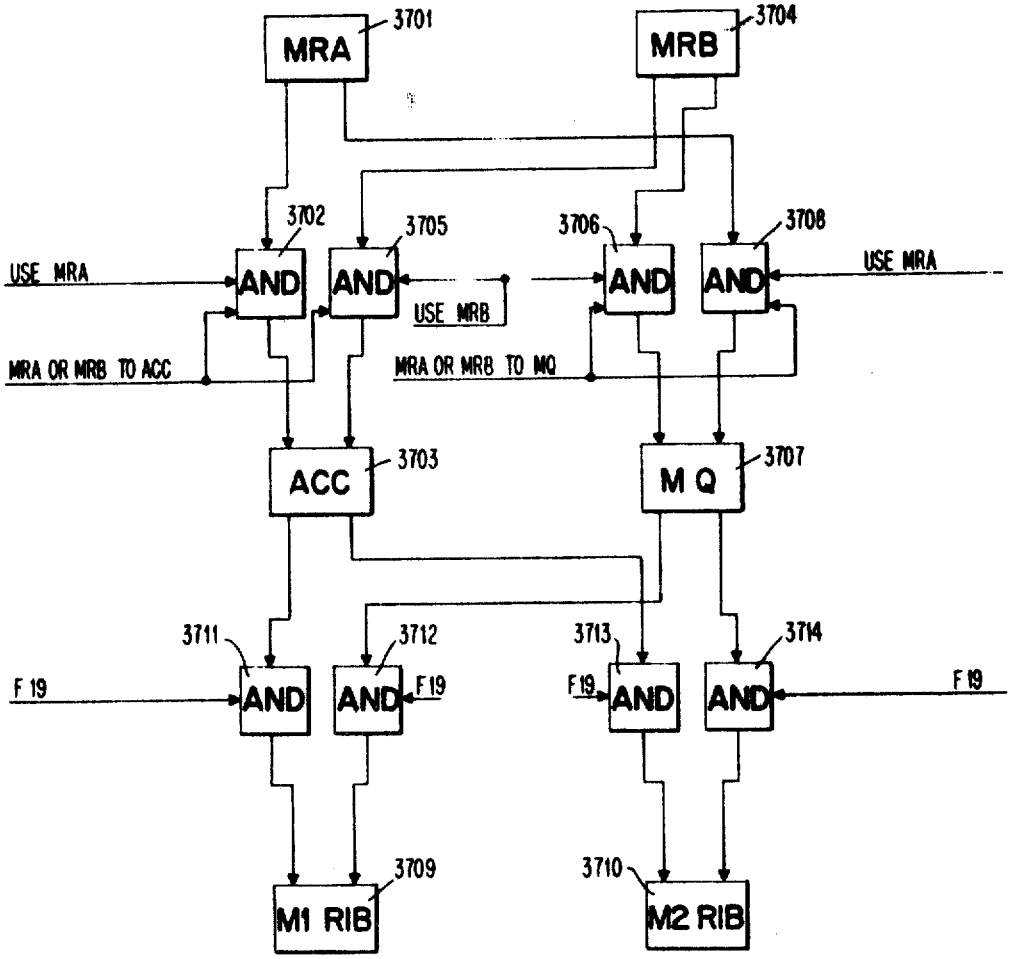
FIGURE 37 is a diagrammatic view of the gating between the memory registers and the accumulator and MQ register and also showing the gating between the accumulator and MQ register and the memory read-in buffers.

The next priority of control is the GO TO DATA REFERENCE CONTROL (X) (5) as shown in FIGURE 6. This is a data reference control for the main computer. If the decoder functioning in conjunction with XIR–2 indicates other than a store operation, then the output of OR gate 4102 in FIGURE 41 is up giving a NOT X STORE DEMAND signal. This is provided to one of the inputs to AND gate 602 in FIGURE 6. Another input to AND gate 602 is obtained from FIGURE 50 and identified as the END OF OPERATION (NORMAL) (X). Recalling that the data reference cycle involves taking data out of memory and storing it into one of the memory registers A or B, it is necessary to perform this data reference cycle that either of these registers be empty. Consequently, an up level signal is necessary on REGISTER XA or XB EMPTY LINE from FIGURE 16 to AND gate 601. The DATA DEMAND (X) line from FIGURE 38 is fed to the input to AND gate 601 and will be up if the decoder associated with XIR–1 indicates any one of the data operations shown in FIGURE 38. When the NOT CONTROL 1, 2, 3, 4 line is up AND gate 601 is unblocked to combine in AND gate 602 with the NOT X STORE DEMAND signal and the END OF OPERATION (NORMAL) (X) signal to provide an up level at the output of AND gate 602 to one of the input lines to AND gate 603. In AND gate 603 is combined the seventeenth bit position in XIR–1 as shown in FIGURE 37. If it is a 1 this line is up. If memory 1 is OFF, then the MEMORY 1 OFF line from FIGURE 9 is up to unblock AND gate 603 and provide a START MEMORY 1 signal. This also through OR gate 604 provides the GO TO DATA REFERENCE CYCLE (X) for the main computer. When the output of OR gate 604 is up inverter 606 feeds a down level to AND gate 607 to block this gate. However, if there is no GO TO DATA REFERENCE CYCLE (X) signal then the inverter 606 provides an up level output which combines with the NOT CONTROL 1, 2, 3 signal in AND gate 607 to provide the NOT CONTROL 1, 2, 3, 4, 5 signal. The output of AND gate 602 is combined in AND gate 609 with the MEMORY 2 OFF signal and the seventeenth position in XIR–1. If memory 2 is off and XIR–1 bit position 17 is a zero, then AND gate 609 is unblocked to provide the START MEMORY 2 signal and also the GO TO DATA REFERENCE CYCLE (X). Whenever the GO TO DATA REFERENCE CYCLE (X) signal is provided, then the address portion in XIR–1 is gated to the memory address buffer through the AND gate 605 which again are duplicated twelve times for each stage in the memory address buffer. If XIR–2 is empty, then the up level from AND gate 601 is combined with this signal in AND gate 608 to provide the output signals for this control. With XIR–2 empty and a data demand in XIR–1, then the contents of XIR–1 can be flushed to XIR–2 provided register XA or XB is empty and NOT CONTROL 1, 2, 3, 4 signal is present. It makes no difference at this time whether or not XIR–3 is full. Let us assume that it is full and still executing its contained instruction In that event XIR–1 being a data demand and XIR–2 being empty then XIR–1 can still flush to XIR–2. However, if XIR–2 is full the contents of XIR–1 can still be flushed to XIR–2 provided XIR–3 will be empty soon enough. This is indicated by the END OF OPERATION (NORMAL) (X) signal to AND gate 602 and the NOT X STORE DEMAND from XIR–2 to AND gate 602. Still a further condition for obtaining the GO TO DATA REFERENCE CYCLE (X) is obtained when XIR–3 is empty providing an up level to AND gate 610 together with a NOT X STORE DEMAND and an up level output from AND gate 601. This unblocks AND gate 610 which provides an up level to the associated inputs of AND gates 603 and 609. Again depending upon which memory is OFF and the character of the seventeenth bit position in XIR–1 either AND gate 603 or 609 will be unblocked.

The next priority control level is the GO TO DATA REFERENCE CONTROL (6) for the control computer. This is shown in FIGURE 7. The logic of this circuit is identical to that in connection with control (5) shown in FIGURE 6 except that the control computer is involved and the NOT CONTROL 1, 2, 3, 4, 5 signal is necessary. Provided AND gate 701 is unblocked either AND gate 702 or 703 will be unblocked by the appropriately designated signals. The unblocking of AND gate 705 provides the START MEMORY 1 signal and through OR gate 707 the GO TO DATA REFERENCE CYCLE. The unblocking of AND gate 706 provides the START MEMORY 2 signal together with the GO TO DATA REFERENCE CYCLE. When the GO TO DATA REFERENCE CYCLE is obtained at the output of OR gate 707, then the address portion of IR–1 is gated to the memory address buffer. Again here AND gate 708 is duplicated twelve times. If the output of OR gate 606 is down, then inverter 710 combines its up level output in AND gate 709 with the NOT CONTROL 1 THROUGH 5 signal to provide the NOT CONTROL 1 THROUGH 6 signal. AND gate 704 functions similarly to AND gate 610.

Figure 8:
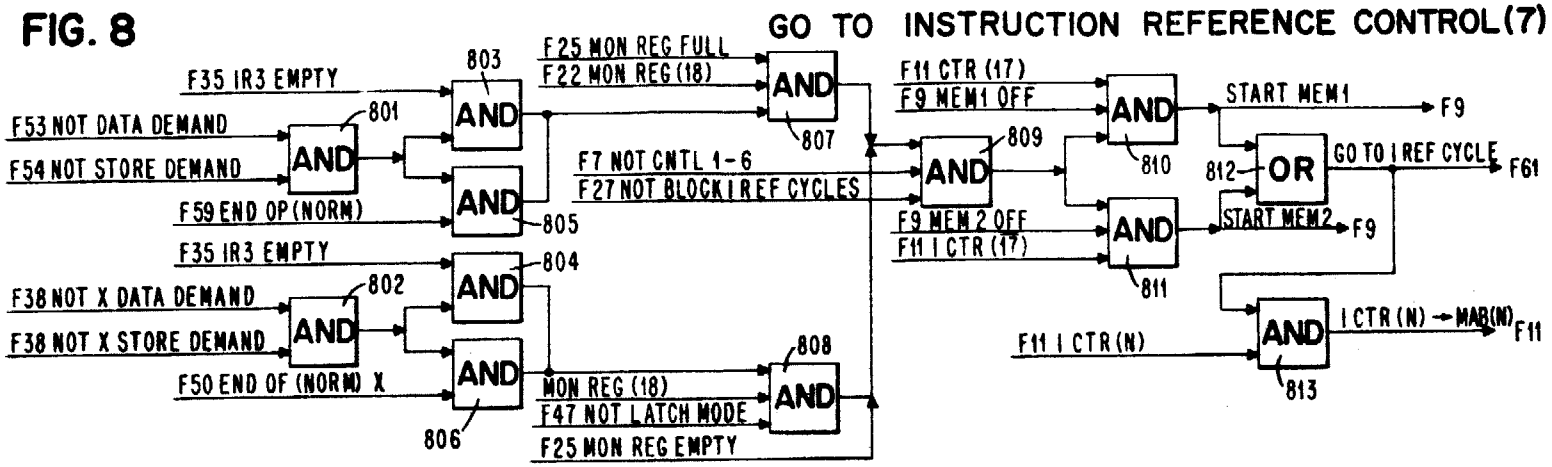

The last control is the GO TO INSTRUCTION REFERENCE CONTROL (7) shown in FIGURE 8. This is the special instruction reference cycle previously referred to. With NOT DATA DEMAND and NOT STORE DEMAND, then AND gate 801 is unblocked. This conditions AND gates 803 and 805. If IR–3 is empty AND gate 803 is unblocked to condition AND gate 807. If IR–3 happens to be full but there is an END OF OPERATION (NORMAL) signal, then AND gate 805 is unblocked to condition AND gate 807. If the monitor register is full and the eighteenth bit position, which is a computer bit, is a zero indicating an instruction for the control computer or an instantaneous instruction, then AND gate 807 is unblocked. Provided NOT CONTROL 1 through 6 signal is present and also NOT BLOCK I REFERENCE CYCLES from FIGURE 27 then AND gate 809 is unblocked. The unblocking of AND gate 809 conditions AND gates 810 to 811. If memory 1 is OFF and the instruction counter bit position 17 is a 1, AND gate 810 is unblocked to provide a START MEMORY 1 signal and through OR gate 812 a GO TO INSTRUCTION REFERENCE CYCLE signal. If memory 2 is OFF and the instruction counter has a zero in the 17-bit position, then AND gate 811 is unblocked to provide a START MEMORY 2 signal and through OR gate 812 the GO TO INSTRUCTION REFERENCE CYCLE signal. If the output of OR gate 812 is up, AND gate 813 duplicated twelve times gates the contents of the instruction counter to the memory address buffer.

If XIR–3 is empty this conditions AND gate 804. If there is a NOT DATA or a NOT STORE DEMAND this unblocks AND gate 802. With AND gate 804 unblocked, AND gate 808 is conditioned. If there is no latch mode of operation and bit 18 in the monitor register is a 1, then AND gate 808 is unblocked. This conditions AND gate 809. With AND gate 806 conditioned by the output from AND gate 802, the END OF OPERATION (NORMAL) X signal will unblock AND gate 806. If the monitor register is empty, this alone will condition AND gate 809 where it is combined with the other two signals previously identified.

The main and the control computers operate in conjunction with two high speed memories 101 and 102 in FIGURE 1, which may be indicated as memory 1 and Memory 2. As previously stated, these memories have a six-microsecond memory cycle and are multiplexed to give an effective read-write cycle of three microseconds. Each memory has its own clock as shown in FIGURE 9. Describing FIGURE 9 with reference to memory 1, the start trigger 901 is normally OFF. A START MEMORY 1 from priority control through OR gate 902, via condenser 906 and diode 907 turns trigger 901 ON. The ON output of this trigger to AND gate 903 goes up. Trigger 914 at this time is OFF. Its OFF output is connected also to the input to AND gate 903. A0 pulse from the three-microsecond clock of FIGURE 12 unblocks AND gate 903 at the beginning of the three-microsecond cycle, A0 time. The output of AND gate 903 through condenser 908 and diode 909 turns trigger 905 ON. Its ON output goes up to initiate the MEMORY 1 ON pulse. The unblocking of AND gate 903 also turns on trigger 904 through condenser 910 and diode 911. The next pulse, one microsecond after A0, from the master clock of FIGURE 12, turns 904 OFF which turns 901 OFF and turns trigger 912 ON. The next pulse turns trigger 912 OFF and trigger 913 goes ON. The next pulse turns trigger 913 OFF and this turns trigger 914 ON. When trigger 914 goes ON, AND gate 903 is again blocked. When trigger 913 goes OFF trigger 905 goes OFF. This ends the MEMORY 1 ON pulse and commences the MEMORY 1 OFF pulse. The next pulse turns OFF trigger 914 and this turns trigger 915 ON. The next pulse turns trigger 915 OFF and this turns trigger 916 ON. A pulse from the priority control at the next microsecond together with the A0 pulse from FIGURE 12 will initiate a repeat of this cycle. The coupling between trigger 914 and AND gate 903 prevents trigger 905 from going ON again at the second A0 pulse which will occur in the middle of the six-microsecond memory cycle, despite the fact that the programming may wish to use memory 1 at a different address at this time. It must be remembered that the memories have a six-microsecond memory cycle. When memory 1 is first turned ON it runs for six microseconds. If the programming were to demand memory 1 again in the middle of this six-microsecond period, unless means were provided, the priority control might permit this to happen. In other words, at the three-microsecond time in the middle of the six-microsecond memory cycle, priority control might send a START MEMORY 1 pulse to OR gate 902 which would turn ON trigger 901, and which would, of course, turn ON trigger 905 at A0 time and continue the memory 1 ON pulse. To prevent this, AND gate 903 and trigger 914 are coupled together in the manner shown.

FIGURE 9 also indicates how various signals to be used in controlling memory 1 are generated. Similar circuits are also provided for memory 2. AND gate 917 generates at A2.5 time two signals which are used to reset various circuits in the memory. The function of the CLEAR MEMORY 1 ADDRESS REGISTER signal corresponds to that of the CLEAR MEMORY ADDRESS REGISTER signal of the above-identified application to Ross et al., while the CLEAR MEMORY 1 READ-IN BUFFER from AND gate 917 corresponds to the CLEAR MEMORY BUFFER REGISTER signal in that application. These signals are generated at A2.5 time only when trigger 901 is in its ON position and trigger 914 is in its OFF position. Therefore, these two signals are generated .5 microsecond ahead of the signal generated from AND circuit 903. Furthermore, a signal START MEMORY 1 from AND circuit 903 is also sent to FIGURE 21 and corresponds to the START MEMORY signal in the above-identified application.

Figure 21:
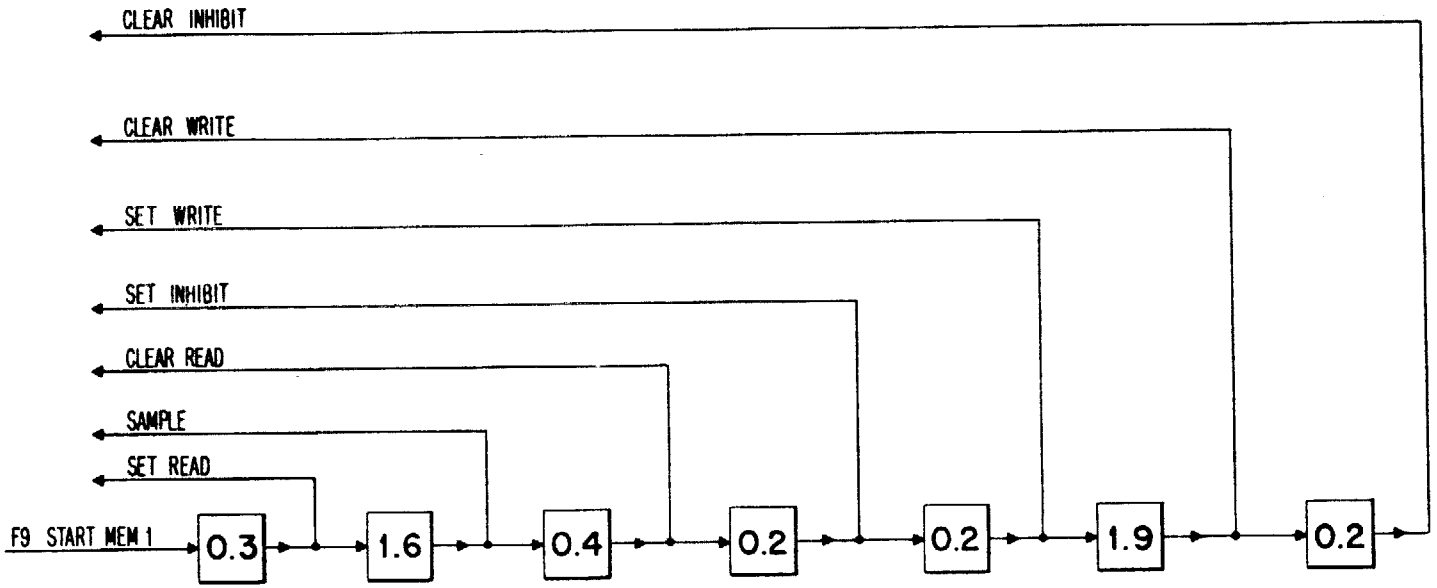
FIGURE 21 is a diagrammatic view showing the generation of signals necessary for memory operation.

Referring now to FIGURE 21, there is shown the memory pulse distributor which is to be used with the memory of the above-identified application to Ross et al. so as to provide a six-microsecond cycle such as is required by the present invention. FIGURE 21 shows a plurality of delay lines connected in series from which are tapped off various control signals. This circuit replaces the 7.5-microsecond delay line which is used as the memory pulse distributor in the reference application. To the input is fed the START MEMORY 1 pulse which is generated from AND circuit 903 in FIGURE 9 of the instant application. Seven control signals are derived from this delay line at the microsecond delays indicated, which are the following:

SET READ
SAMPLE
CLEAR READ
SET INHIBIT
SET WRITE
CLEAR WRITE
CLEAR INHIBIT

The function of these seven signals is the same as the function of seven signals found in the above-identified U.S. application which are denoted by the same identifying terms. No further explanation of their use is thought to be required in view of the description to be found in the above-identified application. The circuit of FIGURE 21 is duplicated for memory 2.

Figure 11:
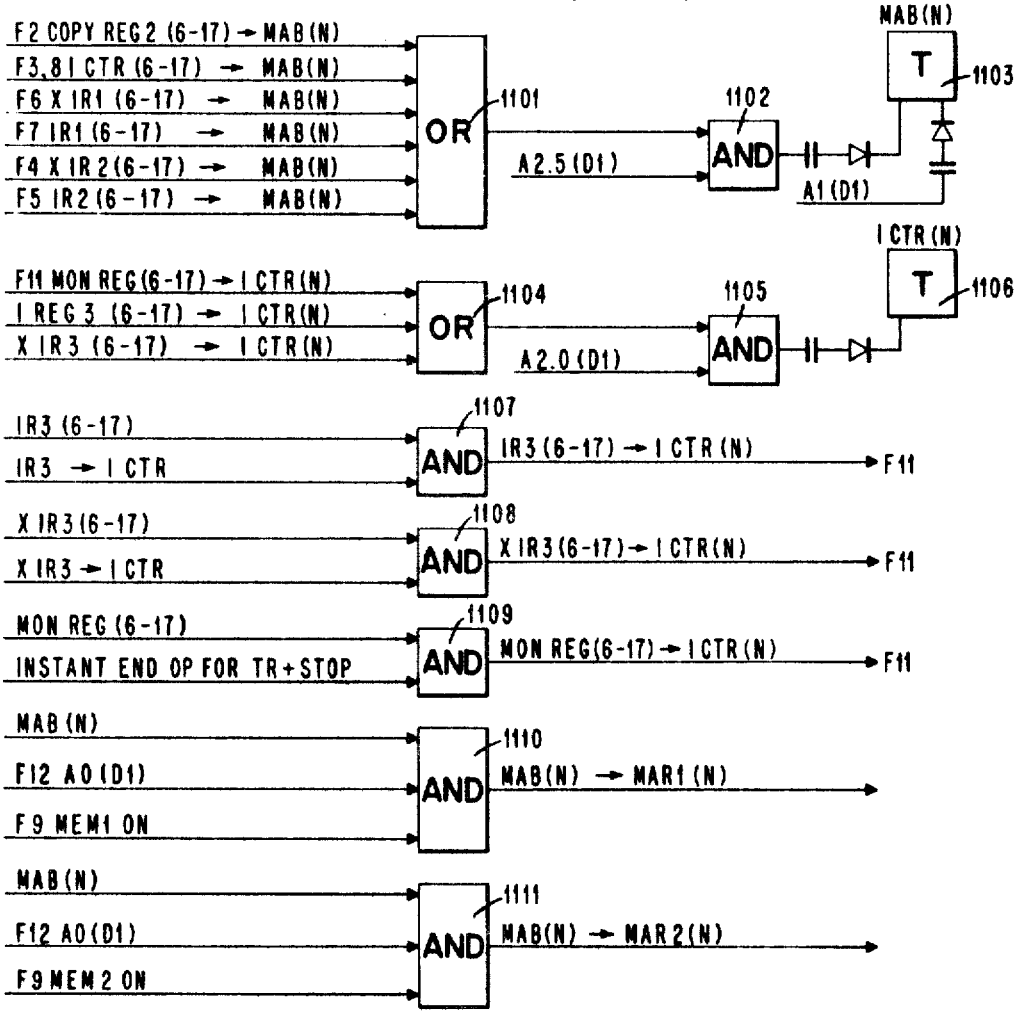
FIGURE 11 is a diagrammatic view of gating between some of the registers of the present invention.

Referring now to FIGURE 11, there is shown the gating to memory address buffer, instruction counter and memory address register. OR gate 1101 handles the gating of the twelve statges of the copy register 2 to the memory address buffer, the instruction counter to the memory address buffer, XIR–1 to memory address buffer, IR–1 to memory address buffer, XIR–2 to memory address buffer and IR–2 to memory address buffer. There is one of these OR gates 1101 associated with each of the stages of these registers. Referring back for a moment to FIGURE 2, it will be recalled that the AND gate 206 was duplicated twelve times for each stage of copy register 2 and functions in connection with OR gate 205 which provided an up level at the output thereof upon the receipt of GO TO COPY WRITE CYCLE or GO TO COPY READ CYCLE. The output from each of the twelve AND gates 206 are fed to an associated OR gate 1101. The output of OR gate 1101 is fed to AND gate 1102. A pulse at A2.5 time samples AND gate 1102. There is, of course, twelve AND gates 1102 associated with the transfer of the twelve bit positions from one of the identified registers to the twelve bit positions of the memory address buffer. If the particular bit position of the copy register stores a 1, at A2.5 time the associated AND gate 1102 turns trigger 1103 on to store a 1 at this bit position in the memory address buffer register. Again there are twelve of these triggers 1103 in the memory address buffer. Transfer, then, between any of these registers and the memory address buffer takes place at A2.5 time. A pulse at A1.0 time applied to the opposite side of trigger 1103 will reset this trigger to zero. OR gate 1104 functions similarly in connection with transfer from monitor register, IR–3, and XIR–3 to the instruction counter. Transfer from monitor register occurs during a transfer or stop operation and from IR–3 or XIR–3 on a conditional transfer. Transfer time is A2.0 when a pulse is applied to each of the twelve AND gates 1105. There are twelve triggers 1106, one for each of the twelve stages in the instruction counter.

The twelve AND gates 1107 gate IR–3 to instruction counter upon the receipt of an IR–3 TO INSTRUCTION COUNTER signal at A2.0 time from FIGURE 57. AND gate 1108, which is duplicated twelve times gates XIR–3 to instruction counter upon the receipt thereby of a signal XIR–3 TO INSTRUCTION COUNTER at A2.0 time from FIGURE 45. The output of AND gates 1107 is fed to OR gates 1104. The output of AND gates 1108 is also fed to OR gates 1104. The monitor register is gated to the instruction counter upon the receipt of an INSTANT END OPERATION FOR TRANSFER AND STOP signal at A2.0 time from FIGURE 33. Again there are twelve AND gates 1109 associated with this transfer. The output of gates 1109 are also fed to the inputs to OR gates 1104.

The memory address buffer is gated through AND gates 1110 to memory address register 1 provided MEMORY 1 ON signal is received from FIGURE 9 and the transfer takes place at A0 time. The memory address buffer is gated to memory address register 2 at A0 time provided MEMORY 2 ON signal is received through AND gates 1111.

Figure 12:
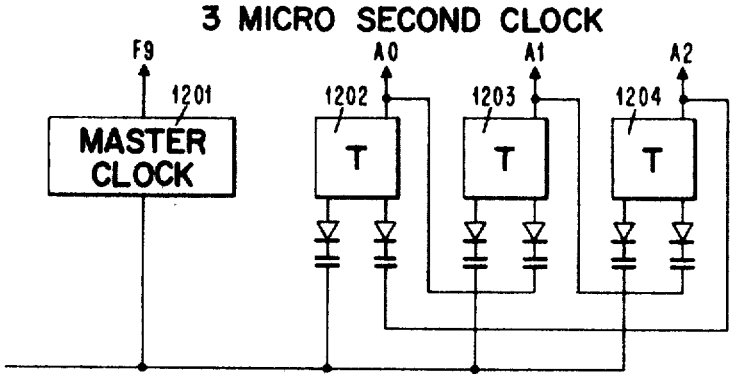
FIGURE 12 is a diagrammatic view of a three-microsecond clock employed in the present invention and of a .5-microsecond delay line also employed in the present invention.

FIGURE 12 shows the three-microsecond clock for the generation of the A0, A1 and A2 pulses. The triggers 1202, 1203, and 1204 are connected as a ring counter and this ring counter is stepped by the master clock 1201 which generates pulses each microsecond. To obtain the A1.5 pulse the A1 pulse is fed to the delay line 1206 at the output of which is obtained the A1.5 pulse. The A2 pulse is also fed to a similar delay line to obtain the A2.5 pulse.

Figure 13:
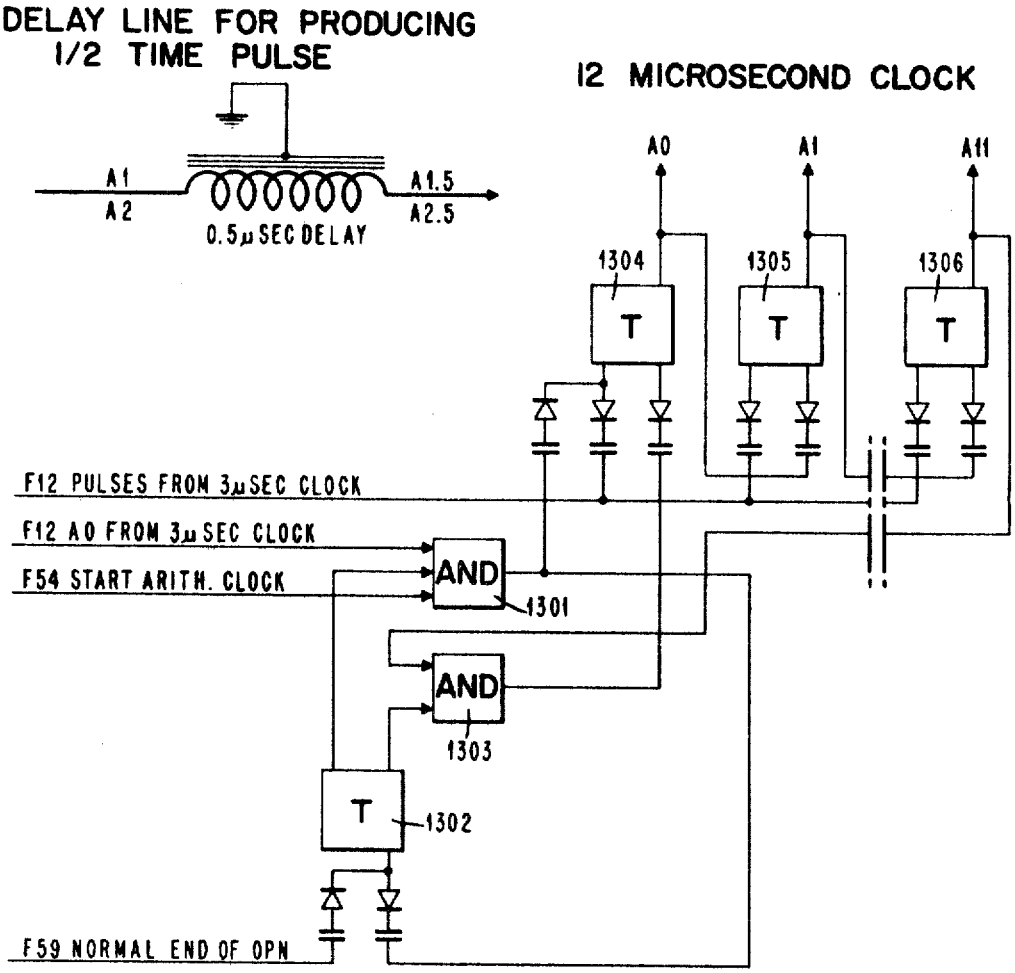
FIGURE 13 is a diagrammatic view of a 12-microsecond clock employed in the present invention.

Referring to FIGURE 13, there is shown the twelve-microsecond clock which is employed for certain arithmetic operations. There is one of these clocks for the control computer and one for the main computer. The signal start arithmetic clock from FIGURE 54 conditions AND gate 1301 when an instruction requiring this clock is decoded in IR–2 or XIR–2. It is assumed that at this time trigger 1302 is OFF. Its OFF output also conditions AND gate 1301. A zero pulse from the three-microsecond clock of FIGURE 12 is fed to AND gate 1301. It should be noted that the signal start arithmetic clock is achieved from the decoder of IR–2 or XIR–2. Although the instruction providing this signal is flushed to IR–2 or XIR–2 at A0 time, some finite time more than one microsecond passes before the line from the decoder providing the signal start arithmetic clock goes up. Consequently, it can be seen that the A0 pulse to AND gate 1301 coinciding with the flushing of the instruction into IR–2 or XIR–2 has expired by the time the line start arithmetic clock goes up. It is not until the next A0 pulse is applied to AND gate 1302 that this AND gate 1302 is unblocked. By this time the instruction has been flushed from IR–2 to IR–3 or from XIR–2 to XIR–3. Therefore, the twelve-microsecond clock does not actually start into operation until the instruction requiring it appears in IR–3 or XIR–3, despite the fact that this instruction is detected in IR–2 or XIR–2 as the case may be. The pulses from the three-microsecond clock of FIGURE 12 advance the ring including the triggers 1305 through 1306 to provide the twelve-microsecond clock pulses. As soon as the last trigger has been turned ON to provide the last pulse in the ring, AND gate 1303 is conditioned by the ON output of trigger 1306. It should be noted that the output of AND gate 1301 when it goes up has turned ON trigger 1302. Therefore, the output of trigger 1302 also conditions AND gate 1303 unless the normal end of operation signal from FIGURE 59 has again turned this trigger OFF. If this is the case then the arithmetic clock only operates for twelve microseconds. If, however, this signal is not achieved from FIGURE 59, then the clock goes through another cycle.

Figure 14:
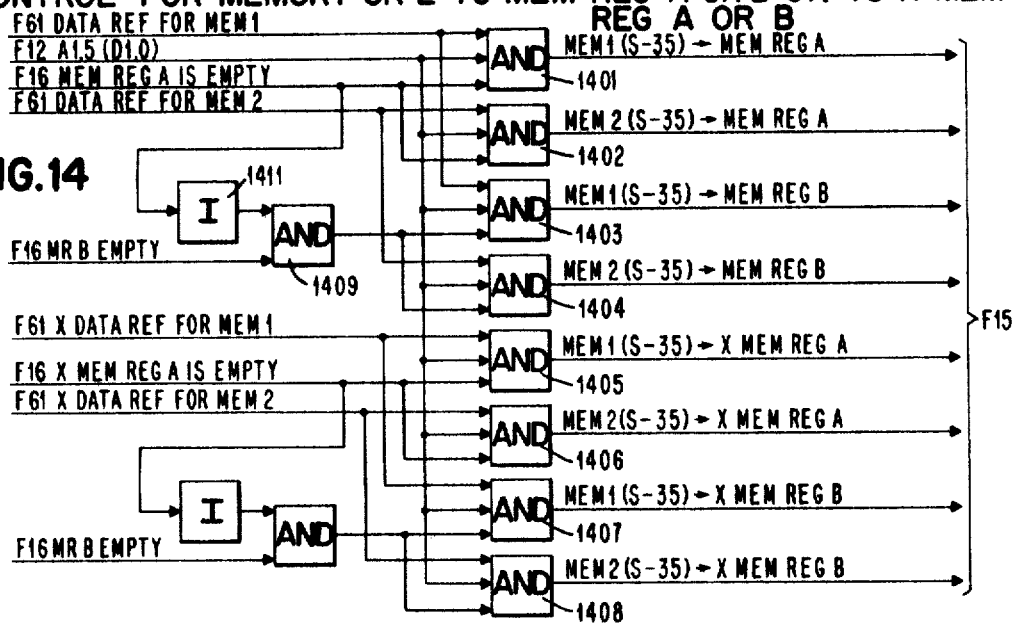
FIGURE 14 is a diagrammatic view of the controls for memory 1 or 2 to the memory registers in either the main or the control computer.

Turning to FIGURE 14 there is shown the control for memory 1 or memory 2 to memory register A or B or to X memory register A or B. It should be recalled that transfer from either of the memories to the memory registers in the main and control computers takes place during a data reference cycle. When priority control determines that a data reference cycle will be executed at the beginnning of the next three-microsecond period then the cycle time generators illustrated in FIGURE 61 will provide an up level on DATA REFERENCE FROM MEMORY 1 line to AND gate 1401. If memory register A is empty its associated line from FIGURE 16 will be up and at A1.5 time AND gate 1401 will be unblocked. This will provide at the output thereof an up level on the MEMORY 1 (S–35) to MEMORY REGISTER A line. If the cycle time generator of FIGURE 61 provides the DATA REFERENCE FOR MEMORY 2 signal then similarly AND gate 1402 is unblocked to provide its identified output signal. If memory register A happens to be full the line MEMORY REGISTER A EMPTY will be down to provide an up level at the output of inverter 1411. If memory register B is empty indicated by an up level on the MEMORY REGISTER EMPTY line from FIGURE 16 then AND gate 1409 is unblocked to provide an up level at its output to AND gates 1403 and 1404. In this event then the MEMORY 1 (S–35) TO MEMORY REGISTER B or MEMORY 2 (S–35) TO MEMORY REGISTER B line is up. It can be seen then that provided a data reference cycle is obtained and either memory register A or B is empty then the data word at the selected address of memory can be read out into the particular memory register which is empty. AND gates, 1405, 1406, 1407, 1408, 1410 and inverter 1412 function similarly for the main computer.

Figure 15:
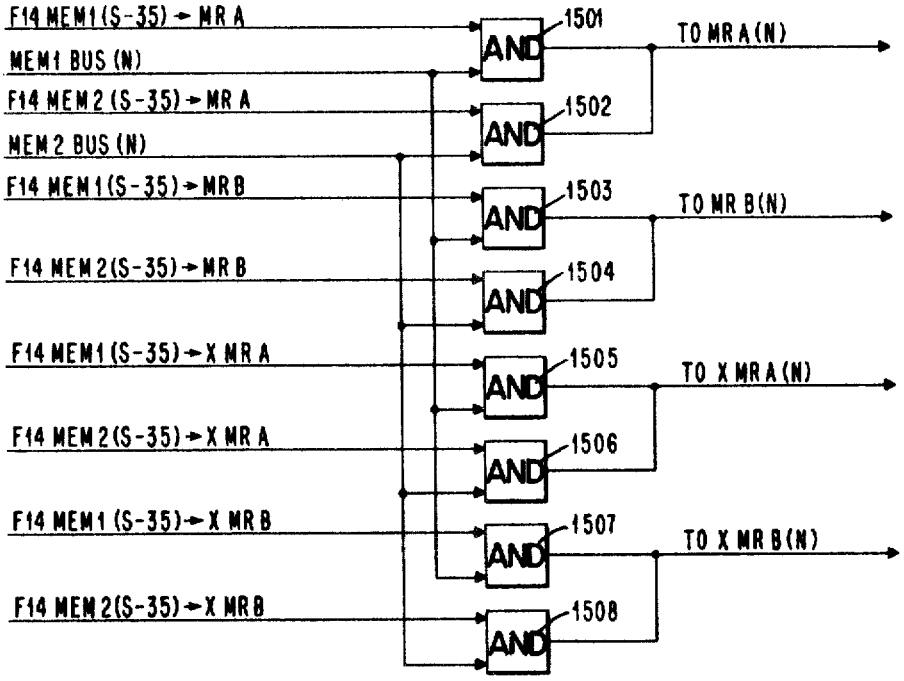
FIGURE 15 is a diagrammatic view of the sampling of memory buses to the memory registers in either the main or the control computer.

In FIGURE 15 there is shown the sampling of memory buses to memory register A or B or X memory register A or B. The twelve AND gates 1501 gate the data word from memory 1. AND gates 1502, 1503, 1504, 1505, 1506, 1507 and 1508 function similarly for gating a data word to memory register B, X memory register A and B. There are twelve each of these gates.

Figure 16:
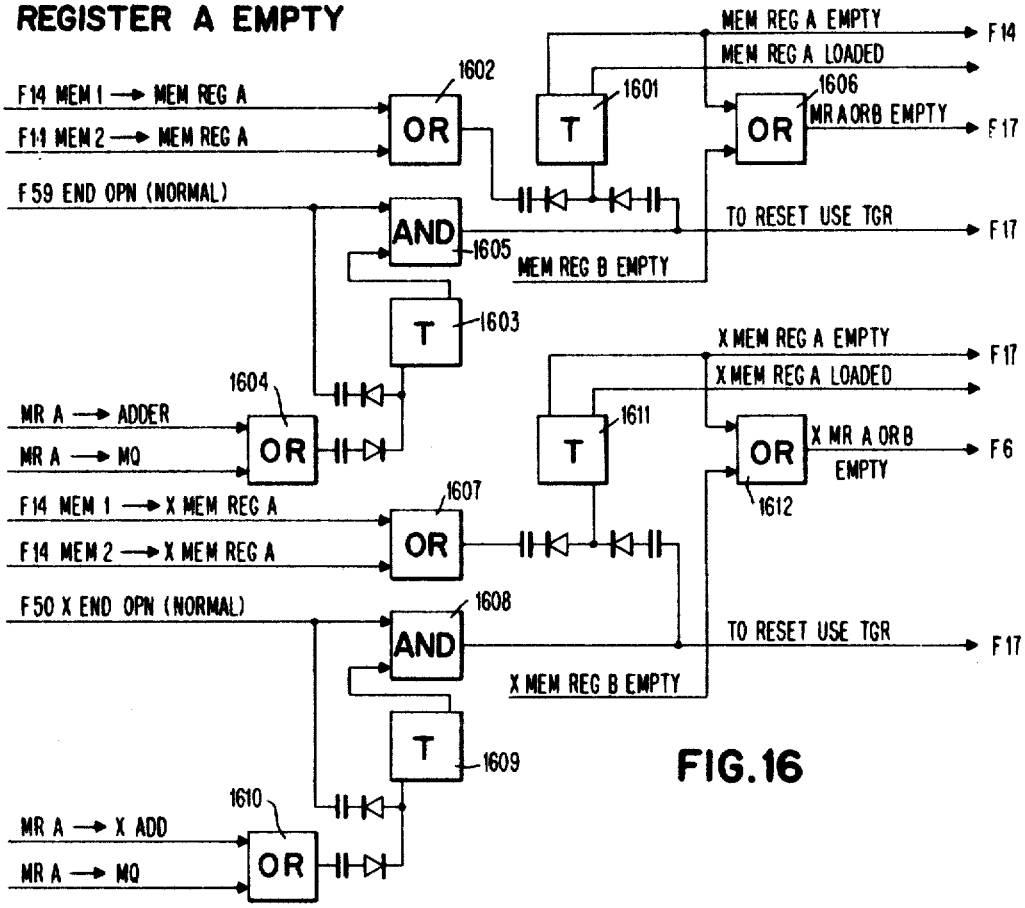
FIGURE 16 is a diagrammatic view of the control to indicate that particular ones of the memory registers in the computers are empty.

Turning now to FIGURE 16 there is shown the control to indicate memory register A or X memory register A empty. The trigger 1601 when it is OFF provides an up level on the line MEMORY REGISTER A EMPTY. When the trigger is ON it provides an up level on the MEMORY REGISTER A LOADED line. In order to turn trigger 1601 OFF, AND gate 1605 must be unblocked. This AND gate 1605 is unblocked provided trigger 1603 is ON and the END OF OPERATION (NORMAL) line is up from FIGURE 59. This latter line comes up at A2.0 time. Trigger 1603 is turned ON by the output from OR gate 1604. The inputs to OR gate 1604 MEMORY REGISTER A TO ADDER and MEMORY REGISTER A TO MQ are from FIGURE 44. Therefore, if from FIGURE 44, line MEMORY REGISTER A TO ADDER is up indicating transfer of data from memory register A to the adder, trigger 1603 is turned ON. This is at A2.0 time. For instruction operation accomplished in three microseconds, the END OF OPERATION (NORMAL) line will come up also at A2.0 time to unblock AND gate 1605 on its leading edge and turn trigger 1601 OFF on its trailing edge. It will, of course, be OFF at sampling time A2.0 time which will permit a data reference cycle. The MEMORY REGISTER A EMPTY line is fed to FIGURE 14 to AND gate 1401 and combines therein with the other signals to provide the MEMORY 1 TO MEMORY REGISTER A signal which is at A1.5 time fed to the OR gate 1602. The output of OR gate 1602 goes up and through the series connected condenser and diode turns trigger 1601 ON. MEMORY REGISTER A LOADED line goes up at A1.5 time. It will remain up until AND gate 1605 is again unblocked. A similar circuit (not shown) is provided to indicate the condition of memory register B. The MEMORY REGISTER A EMPTY and MEMORY REGISTER B EMPTY lines are fed to OR gate 1606. The output of OR gate 1606 entitled MEMORY REGISTER A OR B EMPTY is connected to FIGURE 7. The output of the AND gate 1605 also is used to reset the USE TRIGGER in FIGURE 17. The circuitry indicated by OR gate 1607, AND gate 1608, trigger 1609, OR gate 1610, trigger 1611 and OR gate 1612 function similarly to provide the necessary signals to indicate that X memory register A is empty or loaded and X register B is empty or loaded. The output of AND gate 1608 is also used to reset the USE TRIGGER in FIGURE 17.

Figure 17:
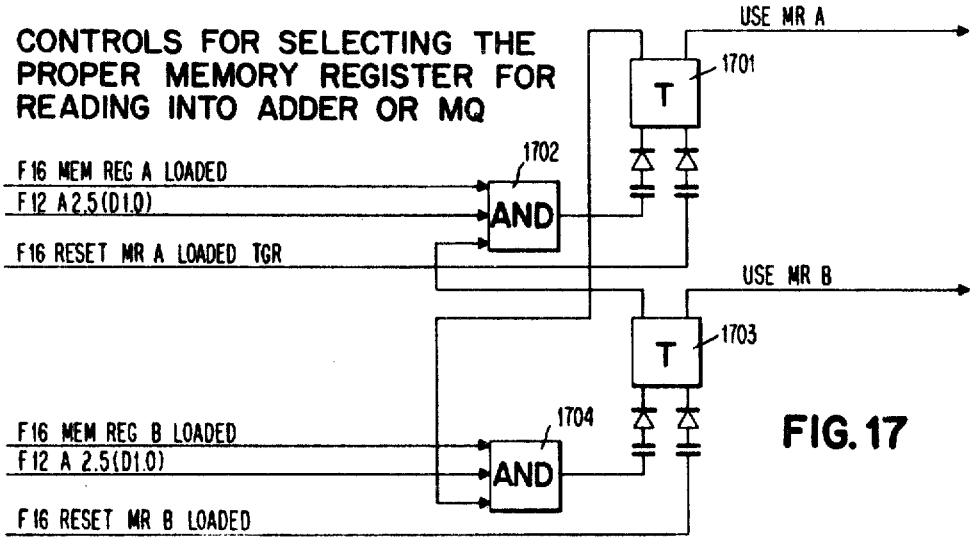
FIGURE 17 is a diagrammatic view of the controls for selecting the proper memory register for reading into the adder or MQ register in the control computer.

Turning to FIGURE 17 there is shown the controls for selecting the proper memory register for reading into the adder or MQ register. To AND gate 1702 is fed the MEMORY REGISTER A LOADED line from FIGURE 16. Also to this AND gate is fed the A2.5 pulse from FIGURE 12. Additionally the OFF output of trigger 1703 is fed to AND gate 1702. To AND gate 1704 is fed the MEMORY REGISTER B LOADED line from FIGURE 16. From FIGURE 12 comes the A2.5 pulse and the OFF output of trigger 1701 is fed to AND gate 1704. If we assume that MEMORY REGISTER A LOADED line is up and consequently that MEMORY REGISTER B LOADED line is down, trigger 1703 will be OFF to unblock AND gate 1702 and turn ON trigger 1701 to bring up the USE MEMORY REGISTER A line. This trigger will remain on until A2.0 time of the next cycle when it is reset by the RESET MEMORY REGISTER A USE TRIGGER signal from FIGURE 16.

Figures 18, 19:
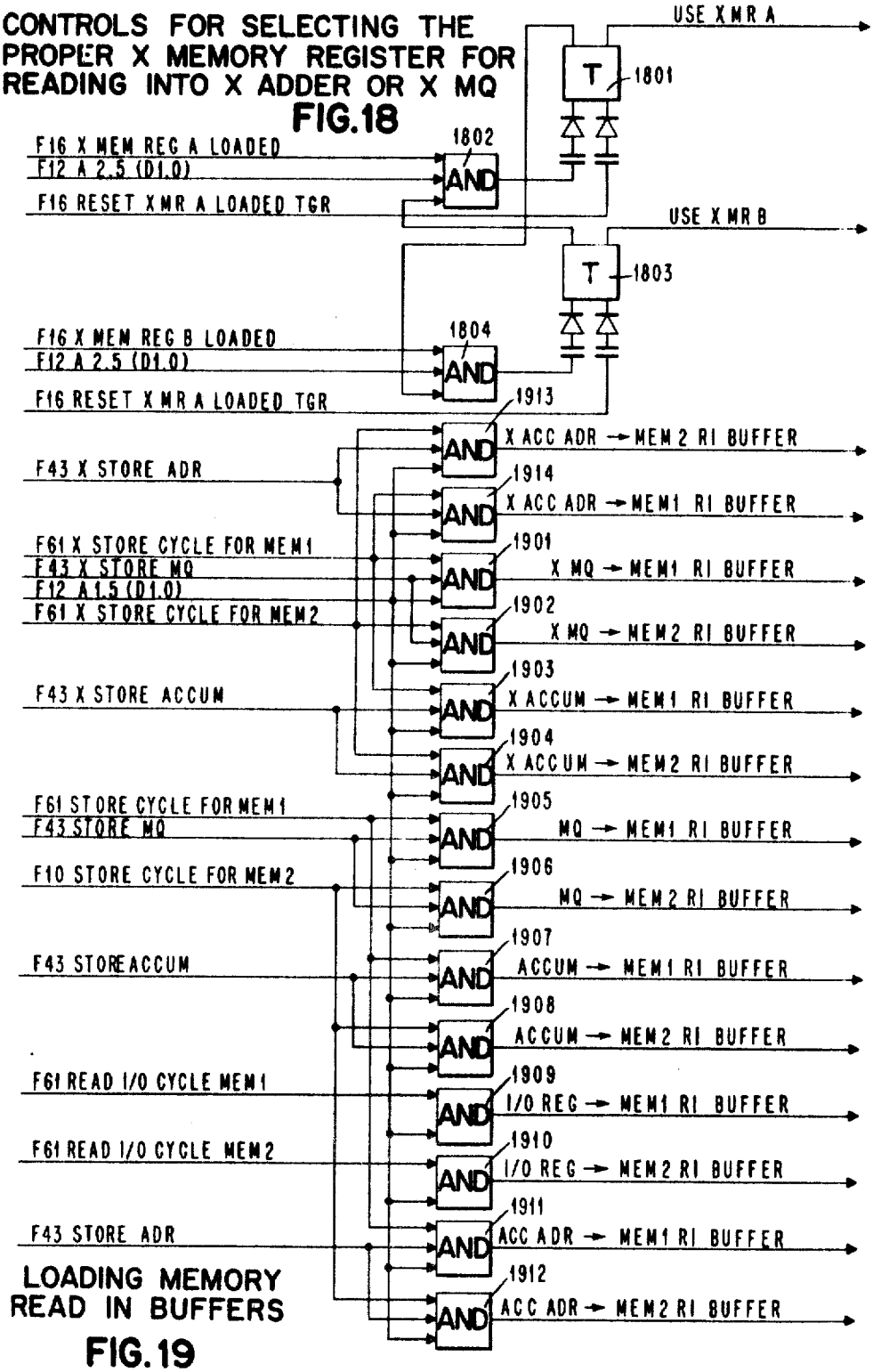
FIGURE 18 is similar to FIGURE 17 but relates to the main computer.
FIGURE 19 is a diagrammatic view showing the controls for store operations.

Turning to FIGURE 18 there is shown the controls for selecting the proper X memory register for loading X adder XMQ. This circuit is identical with appropriate changes made for proper signals involved as that shown in FIGURE 17.

Turning now to FIGURE 19 there are shown the controls for store operations. In such operations, the contents of XMQ or MQ or main or control accumulator are to be stored in either memory 1 or memory 2. To AND gate 1901 is fed the X STORE CYCLE FROM MEMORY 1 signal from FIGURE 61 to A0 time. Also to this AND gate is fed the X STORE MQ signal from FIGURE 43 and the A1.5 time pulse from FIGURE 12. AND gate 1901 provides an up level at its output at A1.5 time to provide the XMQ TO MEMORY 1 READ-IN BUFFER signal. AND gates 1902 through 1919 function similarly to provide their associated signals at the outputs thereof. Of course AND gates 1909 and 1910 are used to read from the I/Q register 111 in FIGURE 1 to memory read-in buffers 119 and 120, respectively. This is done by a copy instruction in copy register 2.

AND gates 1911 and 1912 in response to a store address instruction in XIR–3 gate the address portion in the X accumulator to either memory 1 read-in buffer or memory 2 read-in buffer as the case may be. Corresponding gates 1913 and 1914 function similarly in connection with the main computer. All gates 1901 through 1914 provide only control signals which function in connection with a plurality of AND gates (not shown) to provide the actual gating to the buffers.

Referring now to FIGURE 20, there is shown a control for MEMORY 1 OR 2 TO THE INPUT-OUTPUT REGISTER FOR WRITE COPY cycle. To AND gate 2001 is fed from FIGURE 61 the WRITE COPY CYCLE FOR MEMORY 1 signal. Also to this AND gate is fed the A1.5 signal. Therefore at time A1.5 in the presence of a WRITE COPY CYCLE FROM MEMORY 1, AND gate 2001 is unblocked to provide the MEMORY 1 (S–35) TO INPUT-OUTPUT REGISTER signal. The AND gate 2002 is unblocked by the A1.5 pulse and a WRITE COPY CYCLE FOR MEMORY 2 signal from FIGURE 61 to provide the MEMORY 2 (S–35) TO INPUT-OUTPUT REGISTER signal.

The control signals at the outputs of AND gates 2001 and 2002 are fed to 36 AND gates to provide the actual transfer between memory and the input-output register.

Referring now to FIGURE 22, there is shown a circuit diagram for the monitor register. It should be recalled that the montor register receives instruction words which are words having 19 bit positions. Consequently, the monitor register contains 19 triggers, some of which are shown in this figure and identified by numerals 2206, 2207, 2203, 2204, and 2205. As shown in this figure, trigger 2206 is the sign trigger 2207 is for the fifth bit position trigger, etc. To one side of each of the triggers is fed the corresponding sense line from memory. This will be further explained with reference to FIGURE 24. These triggers are reset at A1.0 time and read-out from memory to the triggers is at A1.5 time. The reset pulse for each stage of the monitor register is obtained at the output of AND gate 2201. To this AND gate is fed the A1.0 pulse to establish the reset time. Also to AND gate 2201 is fed the output of OR gate 2202. Reset is obtained from OR gate 2202 by one of four signals. These are identified as MONITOR REGISTER TO XIB–1 from FIGURE 23; MONITOR REGISTER TO IR–1 from FIGURE 52; LATCH EXIT from FIGURE 48; and the ON output of trigger 2208. Thus trigger 2208 is turned ON by the leading edge of INST. END OP. from OR gate 3305 in FIGURE 33. It is reset by the output from AND gate 2201. The output of monitor register, sign to the fifth bit position, is fed to the switches 114 in FIGURE 1 and to the monitor register Op decoder 115 in FIGURE 1. Stages 6 through 7 are fed to the switches 114 in FIGURE 1, to the copy register in FIGURE 1 and also on a transfer instruction to the instruction counter 142 in FIGURE 1. The output of trigger 2204 also provides the position 17=1 and position 17=not 1 outputs. The output of trigger 2205, the eighteenth bit position in monitor register, provides the monitor register 18 and monitor register $\overline{18}$. This bit is never flushed from monitor register but merely determines to which computer instruction is to be sent.

Turning now to FIGURE 23, there is shown the MONITOR REGISTER TO XIBR–1. AND gate 2301 is unblocked by the NOT-LATCH MODE signal from FIGURE 47, the MONITOR REGISTER POSITION 18=1 from FIGURE 22, and the XIBR–1 to XIBR–2 signal from FIGURE 36. AND gate 2302 is unblocked by the NOT-LATCH MODE signal, the MONITOR REGISTER POSITION 18=1, and the XIBR–1 EMPTY signal from FIGURE 23. OR gate 2303 provides at its output the MONITOR REGISTER TO XIBR–1 signal. It can be seen that monitor register flushes to XIBR–1 when either (1) XIBR-1 is empty or (2) XIBR-1 is full but will be flushed to XIBR-2 in time.

Turning now to FIGURE 24, there is shown the CONTROLS FOR MEMORY 1 OR 2 TO MONITOR REGISTER. It should be noted that AND gates 2401 and 2402 are duplicated 19 times, one for each bit position of the monitor register. AND gates 2401 provide the gating from memory 1 to the monitor register and AND gates 2402 provide the gating from memory 2 to monitor register. To AND gates 2401 are fed the INSTRUCTION REFERENCE CYCLE FOR MEMORY 1 signal from FIGURE 61; A1.5 pulse and the corresponding memory 1 buses. When AND gates 2401 are unblocked they gate the gate memory 1 through the memory buses to the monitor register. AND gates 2402 function similarly in connection with memory 2.

Also in FIGURE 24 there is shown the CONTROLS FOR MONITOR REGISTER TO INSTRUCTION REGISTER. AND gate 2403 is unblocked by the sign bit in the monitor register from FIGURE 22; MONITOR REGISTER TO XIB-1 from FIGURE 23, and the A0 pulse to provide the MONITOR REGISTER (S) TO XIB-1 (S). Similar circuitry is provided for bit positions 1 to 17 to gate the MONITOR REGISTER TO XIB-1. These AND gates for performing this function are identified as AND gates 2403 through 2404. AND gates 2405 through 2406 function similarly to gate the MONITOR REGISTER TO IR-1.

Now referring to FIGURE 25, there is shown the MONITOR REGISTER STATUS TRIGGER. When the status trigger 2501 is ON, this indicates that the monitor register is full. When it is OFF, this indicates that the monitor register is empty. It is reset to an OFF position by the MONITOR REGISTER RESET from FIGURE 22. It is put into the ON condition by the output from AND gate 2502. The output of OR gate 2503 is fed to one of the inputs of AND gate 2502 and the other input is the A1.5 pulse. To OR gate 2503 is fed the INSTRUCTION REFERENCE CYCLE FOR MEMORY 1 from FIGURE 61 or the INSTRUCTION REFERENCE CYCLE FOR MEMORY 2 from FIGURE 61.

Referring now to FIGURE 26, there is shown the CONTROL LINES FROM THE MONITOR REGISTER. The Op decoder for the monitor register identified in FIGURE 1 as 115 provides any one of ten Op codes. These are appropriately identified on the lines associated with the Op decoder 2601 which of course is the same Op decoder identified by numeral 115 in FIGURE 1. The outputs from the Op decoder are fed to OR gate 2602. The output from OR gate 2602 is the INSTANTANEOUS INSTRUCTION signal to FIGURE 27.

Referring now to FIGURE 27, there is shown the circuitry for the BLOCK INSTRUCTION REFERENCE CYCLES. In the event that the decoder functioning in connection with the monitor register detects an instantaneous instruction, then the INSTANTANEOUS INSTRUCTION IN MONITOR REGISTER line goes up to turn ON tripper 2701. Trigger 2701 is reset by the INSTANTANEOUS END OF OPERATION signal. The ON output of trigger 2702 is fed to OR gate 2705. If either one of the triggers 2701 or 2702 are ON, the output from 2705 is up providing the BLOCK I REFERENCE CYCLES signal. Of course if both of these triggers are ON, this signal would also be provided. OR gate 2706 has at its input three conditional transfer signals. These are appropriately identified as TRANSFER PLUS, TRANSFER ZERO, or TRANSFER ON OVERFLOW and are detected in monitor register. These instructions refer to the condition of the accumulator in either computer. If the Op decoder in the monitor register brings any one of these lines up, this will condition through OR gate 2706 the AND gate 2707. Provided the NOT LATCH MODE CONTROL TRIGGER line is up, then at A2.0 time AND gate 2707 is unblocked to turn ON trigger 2702 and provide through OR gate 2705 the BLOCK I REFERENCE CYCLES signal. It should be noted that the BLOCK I REFERENCE CYCLES signal is always the inverse of the NOT BLOCK I REFERENCE CYCLES signal. Of course such a conditional transfer instruction will have to flush from the monitor register down through the instruction registers either in the main or the control computer and will not be executed until these instructions are either in IR-3 or XIR-3 as the case may be. When said instructions reach these registers and the instruction has been executed, a NORMAL END OF OPERATION or a NORMAL END OF OPERATION X signal will unblock either AND gate 2710 or AND gate 2711 to provide an output from OR gate 2712 to turn OFF trigger 2702.

Inverter 2713 provides at its output the NOT BLOCK I REFERENCE CYCLES signal. Therefore, whenever the output of OR gate 2705 is up the NOT BLOCK I REFERENCE CYCLES line will be down. The reverse is also true, namely, when the output of OR gate 2705 is down the output of inverter 2713 is up to provide the signal NOT BLOCK I REFRENCE CYCLES.

It should be noted that with an instantaneous instruction in monitor register, trigger 2701 is turned ON to provide the BLOCK I REFERENCE CYCLES signal. The INSTANTANEOUS END OP. signal appears at 2.0 time to reset this trigger but this trigger is not reset until the trailing edge of the INSTANTANEOUS END OP. pulse. The trailing edge corresponds with A0 time of the next cycle. Consequently, the NOT BLOCK I REFERENCE CYCLES line does not go up until A0 time of the next cycle following an instantaneous instruction in monitor register. Therefore, in the event of an instantaneous instruction in monitor register, the following cycle cannot be an instruction reference cycle since as can be seen from FIGURES 3 and 8, and also FIGURE 61, the sampling time for generating the instruction reference cycle for memory 1 or memory 2 is A2.5 time. It can be seen, however, that this is not the case with a conditional transfer in monitor register. An instruction reference cycle can follow a conditional transfer in monitor register in the very next cycle.

In FIGURE 29 is shown the COPY 1 REGISTER STATUS TRIGGER. This trigger is turned ON by an up level on the MONITOR REGISTER TO COPY REGISTER 1 line from FIGURE 31 and turned OFF by the COPY REGISTER 1 TO COPY REGISTER 2 line from FIGURE 31. With the status trigger 2901 ON, the COPY REGISTER 1 EMPTY line is down and the COPY REGISTER 1 FULL line is up. The reverse is true when trigger 2901 is OFF. As can be seen in connection with FIGURE 31 which illustrates the COPY REGISTER DUMPS, AND gate 3101 is unblocked to provide the MONITOR REGISTER TO COPY REGISTER 2 signal provided there is a copy instruction in the monitor register and copy registers 1 and 2 are empty and AND gate 3101 is thereby unblocked at A2.0 time. AND gate 3102 is unblocked at A2.0 time provided copy register 1 is full and copy register 2 is empty. This provides the COPY REGISTER 1 to COPY REGISTER 2 signal. AND gate 3103 is unblocked at A2.0 time provided there is a copy instruction in the monitor register and copy register 1 is empty and copy register 2 is full. This provides the MONITOR REGISTER TO COPY REGISTER 1 signal.

Turning now to FIGURE 30, there is shown a COPY REGISTER 2 STATUS TRIGGER. The status trigger is identified at 3001. It is turned ON by a signal through OR gate 3002 on either the MONITOR REGISTER TO COPY REGISTER 2 line from FIGURE 31 or the COPY REGISTER 1 to COPY REGISTER 2 line from FIGURE 31. When this trigger is ON, then the COPY REGISTER 2 EMPTY line is down and the COPY REGISTER 2 FULL line is up. Trigger 3001 is turned OFF by the output of OR gate 3003. To this OR gate is fed the outputs of AND gates 3004 and 3005. AND gate 3004 is unblocked at A2.0 time by a READ INPUT-OUTPUT REFERENCE CYCLE signal from FIGURE 61. AND gate 3005 is unblocked at A2.0 time by a WRITE SIGNAL, together with a COPY PROCEED signal from IBM 701. At the same time that the output of OR gate 3303 turns trigger 3001 OFF, it provides the RESET COPY 2 REGISTER signal to FIGURE 2. With trigger 3001 OF, then COPY REGISTER 2 EMPTY line is up and COPY REGISTER 2 FULL line is down.

Figure 28:
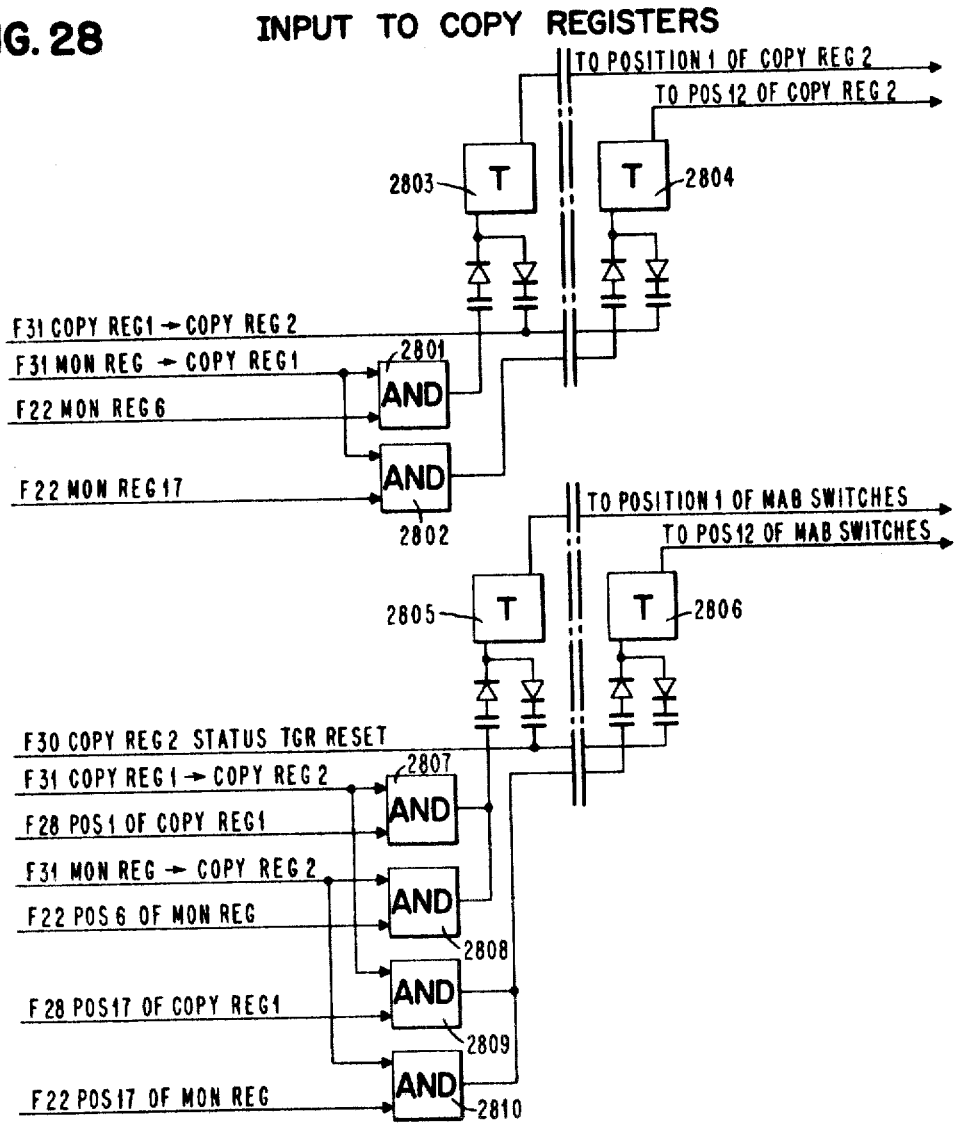
FIGURE 28 is a diagrammatic view of the input to the copy registers.
Figure 31:
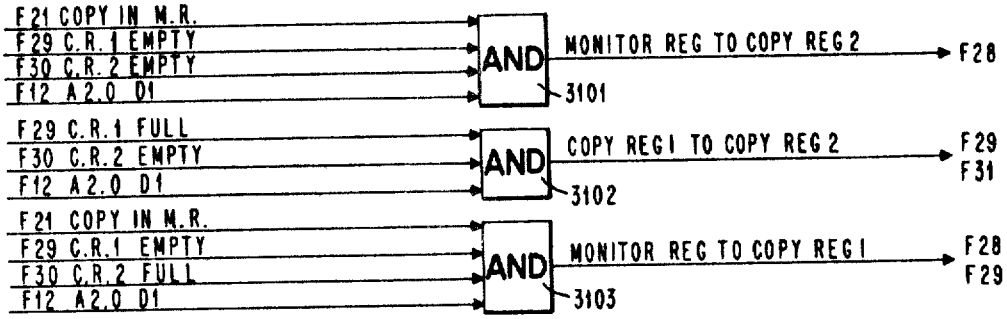
FIGURE 31 is a diagrammatic view of the means of generating the control signals for the copy registers.

Turning now to FIGURE 28, there is shown the INPUT TO THE COPY REGISTERS. Turning first to copy register 1, this copy register contains twelve triggers, one for each bit position. These triggers are shown at 2803 and 2804. In order to transfer from monitor register to copy register 1, the conditions as shown in FIGURE 31 must be met. In other words, there must be a copy in the monitor register, copy register 1 must be empty and copy register 2 full. The MONITOR REGISTER TO COPY REGISTER 1 line then comes up at A2.0 time. This conditions AND gate 2801. AND gate 2801 is shown as being associated with monitor register 6-bit position. There is of course a similar AND gate associated with bit position 17 in the monitor register. So it can be seen that at A2.0 time the monitor register bit positions 6 to 17, inclusive, are transferred through the AND gates 2801 and 2802 to the triggers of the copy register 1 for bit positions 1 to 12, inclusive. Those bit positions in the monitor register which are filled by 1's will turn the associated trigger in the copy register to the ON condition. If copy register 1 is full and copy register 2 is empty, then at A2.0 time the signal COPY REGISTER 1 to COPY REGISTER 2 is received by each of the 12 bit positions in copy register 1. This signal is fed to all of the 12 bit positions in copy register 1 and transfers the contents of copy register 1 to the 12 bit positions in copy register 2.

With now copy register 1 empty and copy register 2 full and a copy in the monitor register, AND gate 3103 is unblocked at A2.0 time to provide the signal monitor register to copy register 1. It should be noted that it is not until the fall time of the A2.0 pulse at the output of AND gate 3102 that copy register 1 is reset. Therefore, as a matter of fact, the copy register No. 1 empty line to AND gate 3103 does not go up until approximately A0 time of the cycle following the dumping from copy register 1 to copy register 2. Therefore, it can be seen that the copy instruction in monitor register does not flush to copy register 1 under these conditions until A2.0 time of the cycle following the cycle in which copy register 1 dumped into copy register 2.

FIGURE 28 also shows the COPY REGISTER 2. It also contains 12 bit positions and associated triggers 2805 through 2806. All of these triggers are reset by the COPY REGISTER 2 STATUS TRIGGER RESET line from FIGURE 30. Of course this register can be filled from either copy register 1 or the monitor register. The trigger 2805 is filled from either position 1 of copy register 1 or position 6 of the monitor register. If it is being filled from copy register 1, then this is done through AND gate 2807 when the COPY REGISTER 1 to COPY REGISTER 2 signal is received from FIGURE 31. If it is being filled from the monitor register, this is done through AND gate 2808 when the MONITOR REGISTER TO COPY REGISTER 2 signal is received from FIGURE 31. Similar gates to those identified as 2807 and 2808 are provided for each of the 12 bit positions in copy register 2. These gates are shown at 2809 and 2810.

Turning now to FIGURE 32, there is shown the STOP TRIGGER. When stop trigger 3201 is ON, then the STOP TRIGGER ON line is up and the STOP TRIGGER OFF line is down. This trigger is turned ON through AND gate 3202. At A1.5 time provided there is a STOP instruction in monitor register 1, AND gate 3202 is unblocked to turn trigger 3201 ON. Stop trigger 3201 is turned OFF to provide the STOP TRIGGER OFF signal at A2.0 time provided the START BUTTON 3203 is depressed to unblock AND gate 3204. When stop trigger 3201 is ON, the system comes to a halt and must be manually started by means of the start button. Monitor register then flushes its address portion to the instruction counter.

Turning to FIGURE 33, there is shown the INSTANTANEOUS END OF OPERATION signals with associated circuitry. This circuitry provides three signals (1) INSTANTANEOUS END OF OPERATION FOR TRANSFER OR STOP, (2) INSTANTANEOUS END OF OPERATION, and (3) INSTANTANEOUS END OF OPERATION FOR NOT TRANSFER OR STOP. The output of OR gate 3305 provides the INSTANTANEOUS END OF OPERATION signal. Into this OR gate is fed the output of AND gates 3303 and 3304. The output of AND gate 3303 provides the INSTANTANEOUS END OF OPERATION FOR TRANSFER OR STOP and the output of AND gate 3305 provides the INSTANTANEOUS END OF OPERATION FOR NOT TRANSFER OR STOP, in other words, for all instantaneous instructions except transfer or stop. AND gate 3303 is unblocked at A2.0 time provided the output of OR gate 3302 is up. This OR gate 3302 has an up level output if either the output of AND gate 3301 is up or a transfer instruction is in the monitor register. AND gate 3301 is unblocked by a stop in monitor register from FIGURE 21 whenever the stop trigger of FIGURE 32 is OFF. AND gate 3304 is unblocked by the output of OR gate 3306 at A2.0 time. The output of OR gate 3306 is up provided there is a NO OPERATION instruction in monitor register or any of the AND gates 3307 through 3313 are unblocked. AND gates 3307 are conditioned by the INPUT-OUTPUT INTERLOCK OFF line (from IBM 701) and are unblocked by the associated signal such as READ from the monitor register Op decoder to AND gate 3307. Copy in monitor register with COPY REGISTER 1 EMPTY unblocks AND gate 3313.

Figure 35:
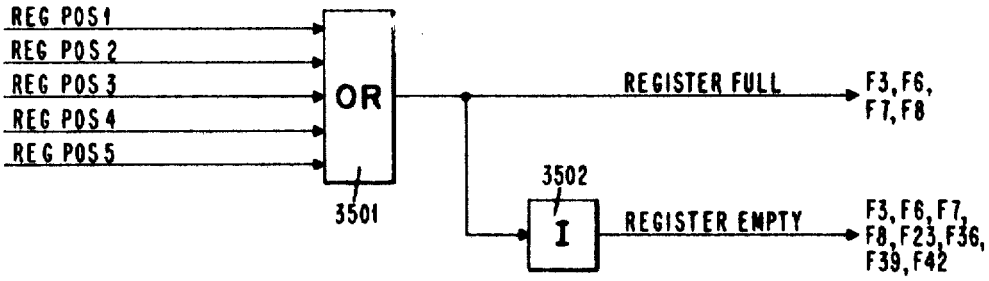
FIGURE 35 is a diagrammatic view of the status indicator.

Turning now to FIGURE 35, there is shown the STATUS INDICATOR. This indicator is associated with each one of the registers that may contain an Op code except monitor register. If any one of the register positions 1 to 5, inclusive, contain a 1, this of course means that this register is full. Consequently, if OR gate 3501 has an up output level indicating the particular register is full, then a REGISTER FULL signal is generated. The inverter 3502 provides at its output the REGISTER EMPTY signal.

Figure 36:
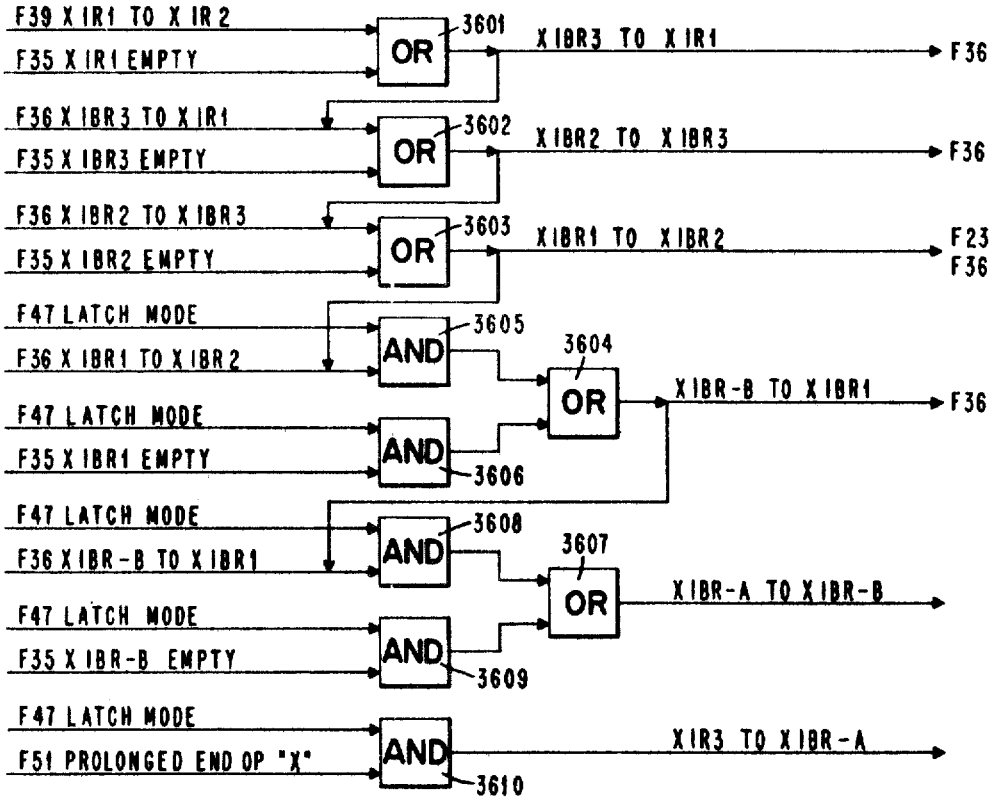
FIGURE 36 is a diagrammatic view of the gating for the buffer registers.

Now turning to FIGURE 36, there is shown the BUFFER REGISTER GATES. OR gate 3601 has an up level at its output providing the XIBR–3 TO XIR–1 signal. This signal is obtained provided there is either an XIR–1 TO XIR–2 signal received from FIGURE 39 or an XIR–1 EMPTY signal from FIGURE 35. Of course such a transfer from XIBR–3 to XIR–1 can only be made if XIR–1 is empty or if not empty the contents thereof will be flushed to XIR–2. The signal XIBR–2 to XIBR–3 from OR gate 3602 is provided if there is an up level output from OR gate 3601 or an XIBR–3 empty signal from FIGURE 35. OR gate 3603 provides at its output the XIBR–1 TO XIBR–2 signal. This signal is provided by the signal XIBR–2 EMPTY or an up level output from OR gate 3602. The output of OR gate 3604 provides the XIBR–B TO XIBR–1 signal. This signal is provided if either AND gate 3605 or AND gate 3606 is unblocked. AND gate 3605 is unblocked by the LATCH MODE signal from FIGURE 47 and the up level output from OR gate 3603. AND gate 3606 is unblocked by the LATCH MODE signal from FIGURE 47 and the signal from FIGURE 35 indicating XIBR–1 EMPTY. The output of OR gate 3607 provides the XIBR–A TO XIBR–B signal. This signal is provided if either AND gate 3608 or AND gate 3609 is unblocked. AND gate 3608 is unblocked by the LATCH MODE signal from FIGURE 37 and an up level output from OR gate 3604. AND gate 3609 is unblocked by the LATCH MODE signal from FIGURE 47 and the signal indicating XIBR–B EMPTY from FIGURE 35. The signal XIR–3 to XIBR–A is obtained when AND gate 3610 is unblocked. It is unblocked by a LATCH MODE signal from FIGURE 47 and the PROLONGED END OF OPERATION X signal from FIGURE 51. The control signals generated in FIGURE 36 operate in conjunction with a plurality of AND gates to provide the actual flushing between registers. These AND gates are sampled at A0 time.

Referring to FIGURE 37, there is shown the means by which data in memory register A or memory register B is gated to either the accumulator or the MQ register and also the gating from the accumulator or the MQ register to either memory register input buffer 1 or memory register input buffer 2. Similar circuitry is used in connection with the main computer. Memory register A identified at 3701 is gated through AND gates 3702 to accumulator 3703. Of course there are a plurality of these AND gates 3702 to accommodate the number of stages in the memory registers. Memory register B identified at 3704 is gated through AND gates 3705 to the accumulator 3703. Memory register B is gated through AND gates 3706 to the MQ register 3707 and memory register A is gated through AND gates 3708 to the MQ register. The signal USE MEMORY REGISTER A is fed to AND gate 3702 and 3708. This signal is generated in FIGURE 17. The signal USE MEMORY REGISTER B is fed to AND gates 3705 and 3706. This signal is also generated in FIGURE 17. To AND gates 3702 and 3705 is fed the signal memory register A or memory register B to accumulator. This signal is generated in FIGURE 44. It is assumed here for purposes of illustration that the true value in the memory registers is to be entered into the accumulator. A similar set of gates is employed with the complement values from the memory registers to load the accumulator with the complement of the data in the memory registers. The signal MEMORY REGISTER A or MEMORY REGISTER B to MQ register is fed to AND gates 3706 and 3708. This signal also is generated in FIGURE 44. The gating from the accumulator 3703 or the MQ register 3707 to the buffer registers 3709 and 3710 are obtained through the appropriate AND gates 3711 through 3714. The controls for this transfer are obtained from FIGURE 19. Again there are a plurality of these AND gates 3711 through 3714 to accommodate the transfer of data from the accumulator or the MQ register to the buffer registers.

In FIGURE 38 there is shown the X DATA DEMAND and NOT X DATA DEMAND circuits. OR gate 3801 provides at its output the X DATA DEMAND signal. This signal is provided in the event that any of the inputs identified thereto are up from FIGURE 37. OR gate 3802 provides at its output the NOT X DATA DEMAND signal as a result of any one of the signals at its inputs being present from FIGURE 37. These signals from FIGURE 37 come from the decoder associated with XIR–1.

Referring to FIGURE 39, there is shown the means of providing the XIR–1 to XIR–2 gating. This signal is provided at the output of OR gate 3901. This OR gate 3901 provides its output signal in response to the X DATA REFERENCE CYCLE signal from FIGURE 61. The output signal from OR gate 3901 is also provided in the event that either AND gate 3902 or AND gate 3903 is unblocked. AND gate 3902 is unblocked by the XIR–2 TO XIR–3 signal from FIGURE 42 together with the NOT DATA DEMAND X signal from FIGURE 38. AND gate 3903 is unblocked by the XIR–2 EMPTY signal from FIGURE 35 and the NOT DATA DEMAND X signal from FIGURE 38. XIR–1 is flushed to XIR–2 if XIR–1 has no data instruction therein and either XIR–2 is empty or will be empty in time. If there is a data demand, the generation of the data reference cycle will cause the flushing.

Referring now to FIGURE 41, there is shown X STORE DEMAND, NOT X STORE DEMAND and X ARITHMETIC CLOCK START. With a store instruction in XIR–2, OR gate 4101 will provide the X STORE DEMAND signal. With other than a store instruction in XIR–2, OR gate 4102 will provide the NOT X STORE DEMAND signal. For those data instructions in XIR–2 requiring the X arithmetic clock, OR gate 4103 provides the X ARITHMETIC CLOCK START signal to start this clock when these data instructions reach XIR–3.

In FIGURE 42, there is shown the XIR–2 TO XIR–3 gating. OR gate 4201 provides this signal as a result of the signal X STORE REFERENCE CYCLE from FIGURE 61. This signal is also provided in the event that either AND gate 4202 or AND gate 4203 is unblocked. AND gate 4202 is unblocked by the PROLONGED END OF OPERATION X signal from FIGURE 51 together with the NOT STORE DEMAND X signal from FIGURE 41. AND gate 4203 is unblocked by the XIR–3 EMPTY signal from FIGURE 35 and NOT STORE DEMAND X signal from FIGURE 41.

In FIGURE 44, there is shown the circuitry for the EXTERNAL CONTROLS FOR XIR–3 (THREE MICROSECONDS). All of these instructions are executed in three microseconds. AND gate 4401 is unblocked by the X LOAD MQ signal from the XIR–3 decoder at A2.0 time. All of the other AND gates are also unblocked at A2.0 time. AND gate 4401 provides a gating signal X MEMORY REGISTER A OR B TO XMQ signal. AND gate 4402 provides the X MEMORY REGISTER A OR B TO TRUE X ACCUMULATOR signal as a result of the XR ADD in XIR–3. AND gate 4403 provides the X MEMORY REGISTER A OR B TO COMPLEMENT X ACCUMULATOR signal as a result of the XR SUBTRACT in XIR–3.

Turning now to FIGURE 45, there is shown the EXECUTION CONTROLS FOR XIR–3 ON CONDITIONAL TRANSFER. The signal AFFIRMATIVE CONDITION TRANSFER IN XIR–3 is obtained at the output of OR gate 4501. This signal is obtained whenever one of the AND gates 4502, 4503 and 4504 are unblocked. AND gate 4502 is unblocked by a signal TRANSFER OVERFLOW in XIR–3 from FIGURE 43 with the X OVERFLOW TRIGGER ON. AND gate 4503 is unblocked by a signal TRANSFER + in XIR–3 with X ACCUMULATOR SIGN +. AND gate 4504 is unblocked on a signal TRANSFER 0 in XIR–3 with the X ACCUMULATOR=0 and the signal identified as X ARITHMETIC CLOCK 9D3. The unblocking of AND gate 4502 provides the reset for the overflow trigger. The output signal from OR gate 4501 also is fed to inverter 4505 which at its output provides the complement of the output of OR gate 4501, namely, NOT AFFIRMATIVE CONDITIONAL TRANSFER IN XIR–3. The output of OR gate 4501 is also fed to AND gate 4506. With an up level at the output of OR gate 4501, AND gate 4506 is unblocked at A2.0 time to provide the signal XIR–3 (BIT POSITIONS 6 to 17) TO THE INSTRUCTION COUNTER. This is the address portion of conditional transfer instruction which is gated to instruction counter.

The signal identified as X arithmetic clock 9D3 which is fed to AND gate 4505 is obtained from the IBM 701. In order to determine whether or not the accumulator actually has a content of zero, the 9's complement in the accumulator must be obtained and then to this is added a 1. As this 1 ripples through from bit position to bit position, it finally appears in the most significant position in the accumulator as a 1 to raise the line X accumulator equals zero. This ripple time coincides precisely with the pulse identified as Z arithmetic clock 9D3. Only if the accumulator has a true value of zero will this 1 appear in this most significant position to raise the line X accumulator equals zero and consequently the gate 4504 is unblocked only under these conditions.

Turning to FIGURE 46, there is shown the COUNTER PORTION OF XIR–3. First of all, it should be recalled that XIR–3 is an 18-bit position register. The six least significant positions in this register function as a count-down counter. This count-down counter is used in such operations as multiply, shift left or shift right. Once each period of time, depending on the arithmetic operation, the count of the count-down portion is decreased by 1 until this portion registers a zero. Secondly, it should be noted that the instruction registers in the main and control computers are of the dynamic flip-flop type. Each of these registers includes a plurality of stages and in each stage there is a one-microsecond delay unit. In XIR–3 as shown in this figure this delay unit is identified by numeral 4601. The other units which are also found in each of the other stages of the instruction registers are AND gates 4602 and 4603 and OR gate 4604. Let us assume for a moment that the particular stage of an instruction register contains a 1. This 1 appears at the output of delay unit 4601 and is circulated to the input of AND gate 4602. The HOLD line is normally up, being the complement of a gating signal between registers. Consequently, AND gate 4602 passes the 1 to OR gate 4604. The SYNC pulses each microsecond come from the master clock of FIGURE 12. Consequently the 1 at the output of OR gate 4604 is passed through AND gate 4603 back to the one-microsecond delay unit 4601 and the 1 condition of the stage is recirculated. During inter-register transfer, the output of a corresponding stage in one register is fed to the input line in the next register. The HOLD line goes down. This blocks whatever condition is recirculating. Let us assume here that the input is a zero. AND gate 4602 is blocked by the HOLD line and the zero passes through the OR gate 4604 to AND gate 4603 where at SYNC time the zero is passed to the delay unit 4601. Of course the output of delay unit 4601 feeds the input to the associated stage of the next register. It can be seen then that reading into a register and reading out of a register can be accomplished at the same size. However, this particular figure, namely, FIGURE 46, specifically relates to the counter portion of XIR–3. Consequently, it is modified from the stages of the other instruction registers and from stages zero to 11 in XIR–3. It is modified by the addition of AND gates 4605 and 4606 and inverter 4607. During countdown the HOLD line will remain up. Let us for the moment consider that in FIGURE 46 we are concerned with the units position, bit position 17, of XIR–3. Let us further assume that this position stores a 1. To start the countdown, the carry input (actually a borrow for subtraction) feeds a 1 on the CARRY INPUT line. The output of counter 4601 is also connected to the input of AND gate 4605. The carry input 1 will unblock this gate to provide a 1 to the inverter 4607 which provides a zero at its output to block AND gate 4606. Consequently, the carry to the next highest order (N–1) is a zero. The output of inverter 4607 also blocks AND gate 4602 to block the recirculating 1. Therefore the output of delay unit 4061 is also a zero. Let it now be assumed that there is a zero recirculating and a carry input of 1. AND gate 4602 is blocked and AND gate 4605 is blocked. The output of inverter 4607 is up unblocking AND gate 4606 to provide a 1 to the (N–1) stage. The output of AND gate 4606 is also connected to the input of OR gate 4604 and sets a 1 for recirculation.

The HOLD line associated with each of the stages in each of the instruction registers is normally up except when transferring from one register to the other. Consequently, these HOLD lines must be brought down when a control signal is generated transferring from one register to another, in other words, when the control signal XIR–2 to XIR–3 is generated this brings down the HOLD line in all of the stages of XIR–3. Since these registers are of the dynamic flip-flop, they need not be reset except for registers IR–3 and XIR–3. These registers are reset by the normal end Op signal or the normal end Op X signal as the case may be. These two signals also affect the HOLD lines in these two registers.

Turning now to FIGURE 43, there is shown a block diagram of the XIR–3, which is duplicated for IR–3. It will be recalled that this register is an 18-bit register having a sign bit, five Op code bits and 12 address bits. The Op code portion functions in connection with an Op decoder associated with this register. In general there are three types of signals from the decoder. The first is that type of signal which indicates an instruction requiring three microseconds for execution and operating in conjunction with the three-microsecond clock. These are shown in connection with the signal cycle outputs associated with the three-microsecond clock. The second type of instruction requires 12 microseconds or multiples thereof. The 12 microsecond instructions are associated with the single cycle outputs and the instructions requiring multiples of 12 microseconds are associated with the multiple cycles output. As shown here, some instructions may or may not require 12 microseconds or multiples thereof. Such an instruction is Acc. Lt.—a shift operation. The next type of instructions are control instructions. These instructions are shown as associated with the controls.

It will be recalled that in the main computer provisions are made for latch mode operation. Turning to FIGURE 47, there is shown the circuitry for the LATCH MODE CONTROL TRIGGERS. Trigger 4701 is turned ON by a signal LATCH INSTRUCTION IN MONITOR REGISTER from FIGURE 21. With trigger 4701 ON the LATCH MODE CONTROL TRIGGER line is up and the NOT LATCH MODE CONTROL TRIGGER line is down. Upon a LATCH EXIT signal from FIGURE 48, trigger 4701 is turned OFF and the outputs are reversed in polarity.

Trigger 4702 is identified as the SYNC LATCH MODE CONTROL TRIGGER. It is turned ON when AND gate 4703 is unblocked. AND gate 4703 is unblocked at A2.0 time by signals XIR–3 POSITION 17=1 and LATCH INSTRUCTION IN XIR–3, both signals from FIGURE 43. With trigger 4702 ON the signal SYNC LATCH MODE CONTROL is generated. This signal is applied from trigger 4704. This trigger is turned ON when AND gate 4705 is unblocked. It is unblocked at A0 time provided trigger 4702 is ON and a signal identified as —(S) IN XIBR–1 is supplied from FIGURE 22. It is turned OFF by the LATCH RESET signal from FIGURE 48. With the trigger 4704 ON, OR gate 4706 provides the LATCH MODE signal. The complement of the LATCH MODE signal, in other words, the NOT LATCH MODE signal, is supplied at the output of inverter 4707. Trigger 4708 is identified as the ASYNCHRONOUS LATCH MODE TRIGGER and when it is turned ON also provides the LATCH MODE signal at the output of OR gate 4706. It also provides the signal ASYNCHRONOUS LATCH MODE. It is turned ON by unblocking AND gate 4709 and turned OFF by the LATCH RESET signal. AND gate 4709 is unblocked at A0 time by the signal —(S) IN XIBR–1 from FIGURE 22 when trigger 4710 is turned ON. Trigger 4710 provides the ASYNCHRONOUS LATCH MODE CONTROL signal and is turned ON when AND gate 4711 is unblocked. This AND gate is unblocked at A2.0 time by the two signals from FIGURE 23, namely, LATCH INSTRUCTION IN XIR–3 and XIR–3 POSITION 17 is ($\bar{1}$).

Turning now to FIGURE 48, there is shown the LATCH EXIT TRIGGER. This trigger is identified at 4802. It is turned ON by the output of OR gate 4803.

OR gate 4803 has at its inputs AND gates 4804 and 4801. AND gate 4801 is unblocked by ASYNCHRONOUS LATCH MODE signal from FIGURE 47, −(S) IN XIR–3 from FIGURE 43 and AFFIRMATIVE CONDITIONAL TRANSFER IN XIR–3 from FIGURE 45. AND gate 4801 is unblocked by SYNC LATCH MODE signal from FIGURE 47, −(S) IN XIR–3 from FIGURE 43 and −(S) IN IR–3 together with the output of OR gate 4805. To OR gate 4805 are fed the AFFIRMATIVE CONDITIONAL TRANSFER IN XIR–3 from FIGURE 45, AFFIRMATIVE CONDITIONAL TRANSFER IN IR–3 from FIGURE 57. The LATCH EXIT trigger 4802 is turned OFF by the INSTRUCTION REFERENCE CYCLE signal from FIGURE 61. The LATCH EXIT signal from trigger 4802 is also fed to AND gate 4806. AND gate 4806 is unblocked at A2.0 time to provide the LATCH EXIT RESET signal which resets all instruction registers in both machines.

Turning now to FIGURE 49, there is shown the circuitry for NORMAL END OF OPERATION X SAMPLE. This circuit includes AND gates 4902, 4903, 4904, and 4901, together with OR gate 4905. AND gate 4902 is unblocked at A2.0 time by the LATCH MODE signal from FIGURE 47, a NOT −(S) IN XIR–3 from FIGURE 43 and a NOT AFFIRMATIVE CONDITIONAL TRANSFER IN XIR–3 from FIGURE 45. AND gate 4903 is unblocked at A2.0 time by a SYNC LATCH MODE CONTROL signal from FIGURE 47, a −(S) IN XIR–3 from FIGURE 43, and a −(S) in IR–3. AND gate 4904 is unblocked by ASYNCHRONOUS LATCH MODE signal from FIGURE 47, AFFIRMATIVE CONDITIONAL TRANSFER IN XIR–3 from FIGURE 45 and −(S) in IR–3. AND gate 4901 is unblocked at A2.0 time by the NOT LATCH MODE signal from FIGURE 47. At the output or OR gate 4905 appears the NORMAL END OF OPERATION X SAMPLE signal at A2.0 time.

Referring to FIGURE 50, OR gate 5004 provides the NORMAL END OF OPERATION X signal. To the input of this OR gate is fed the outputs of AND gates 5005 and 5003. AND gate 5005 is unblocked by an output from OR gate 5001, a NORMAL END OF OPERATION X SAMPLE signal from FIGURE 49 and trigger 5006 being ON. Trigger 5006 is turned ON by an END OF OPERATION SIGNAL from the IBM 701. It is turned OFF by the trailing edge of the NORMAL END OF OPERATION X SAMPLE signal from FIGURE 49. AND gate 5005 is unblocked only for the time of the NORMAL END OF OPERATION X SAMPLE signal from FIGURE 49 and the trailing edge of this signal resets trigger 5006. This signal is also fed to AND gate 5003 which is unblocked by this signal and the output from OR gate 5002. To the OR gate 5001 is fed the associated signals which require either 12 microseconds or multiples thereof for execution. To the OR gate 5002 is fed the associated signals which require three microseconds for execution.

Turning now to FIGURE 51, there is shown the circuitry for the PROLONGED END OF OPERATION X signal. Trigger 5101 is turned ON by the NORMAL END OF OPERATION X signal from FIGURE 50 and is turned OFF at A1.0 time. In the ON condition it provides the PROLONGED END OF OPERATION X signal. This signal is used to transfer XIR–2 to XIR–3 in FIGURE 42. Transfer takes place at A0 time and so the NORMAL END OF OPERATION X signal can not be used for this transfer.

Referring to FIGURE 52, there is shown INSTRUCTION REGISTER SWITCHING including AND gates 5201. There are 18 of these AND gates positioned between each of the instruction registers, one for each stage. When these AND gates are unblocked the contents of IR–2 are flushed to IR–3. This is done at A0 time with a control signal to AND gates 5201 identified as IR–2 TO IR–3. This control signal is achieved by a GO TO STORE CYCLE signal from FIGURE 5. It is also achieved by unblocking either AND gate 5202 or 5203. AND GATE 5202 is unblocked by a PROLONGED END OF OPERATION signal from FIGURE 60 together with a NOT STORE DEMAND signal from FIGURE 41. AND gate 5203 is unblocked by the NOT STORE DEMAND signal together with an IR–3 EMPTY signal from FIGURE 35. The IR–2 TO IR–3 control signal is also fed to the input to AND gate 5204. This AND gate is unblocked by this signal and a NOT DATA DEMAND signal from FIGURE 38. The NOT DATA DEMAND signal is also fed to AND gate 5205 where it functions in connection with IR–2 EMPTY signal from FIGURE 35.

The IR–2 TO IR–3 control signal is also fed to AND gate 5204. This signal together with a NOT DATA DEMAND signal from FIGURE 38 unblocks AND gate 5204 The NOT DATA DEMAND signal is also fed to AND gate 5205 where it functions in connection with the IR–2 EMPTY signal from FIGURE 35 to unblock this AND gate. The outputs of AND gate 5204 or 5205 provide the IR–1 TO IR–2 control signal. This signal functions in connection with 18 AND gates 5206 to gate at A0 time the contents of IR–1 into IR–2. This gating is also achieved by the GO TO DATA REFERENCE CYCLE signal from FIGURE 7. This IR–1 TO IR–2 signal is fed to one input to AND gate 5207. The other input to this AND gate is fed from AND gate 5208. When unblocked this AND gate 5207 provide the MONITOR REGISTER TO IR–1 control signal. AND gate 5208 is unblocked when monitor register bit position 18 is a zero, the monitor register is full and a NOT INSTANTANEOUS INSTRUCTION signal is received from FIGURE 26. The unblocking of AND gate 5208 provides a signal to AND gate 5209. The other input to this AND gate is an IR–1 EMPTY signal from FIGURE 35.

Referring now to FIGURE 53, there is shown the circuits for DATA DEMAND, and NOT DATA DEMAND signals. OR gate 5301 provides at its output the DATA DEMAND signal and OR gate 5302 provides at its output the NOT DATA DEMAND signal. The signals associated with each of these OR gates are identified. These signals appear as a result of the decoder associated with IR–1.

Turning now to FIGURE 54, there is shown the circuits for STORE DEMAND, NOT STORE DEMAND and ARITHMETIC CLOCK START signals. OR gate 5401 provides at its output the STORE DEMAND signal for FIGURE 5. To the input of OR gate 5401 is fed the three store instructions from the decoder associated with IR–2. These are identified appropriately. The output of OR gate 5402 provides the NOT STORE DEMAND signal for FIGURES 7 and 8. The inputs to this OR gate are also provided by the decoder associated with IR–2. OR gate 5403 provides at its output the ARITHMETIC CLOCK START signal for the circuitry of FIGURE 13. The signals fed to this OR gate also come from the decoder associated with IR–2.

Referring now to FIGURE 55, there is shown the counter portion for IR–3. This counter portion functions identically in the control computer as that counter portion of XIR–3 disclosed and described in connection with FIGURE 46.

Referring now to FIGURE 59, there is shown the circuitry for obtaining the NORMAL END OF OPERATION signal. Or gate 5901 provides an output from associated signals at its input thereto from FIGURE 43. The output of OR gate 5901 is fed to AND gate 5904. This AND gate is unblocked by an output from OR gate 5901 and a NORMAL END OF OPERATION SAMPLE signal from FIGURE 58 and an END OF OPERATION signal from the IBM 701. The unblocking of AND gate 5904 provides through OR gate 5903 the NORMAL END OF OPERATION signal at A2.0 time. AND gate 5902 also provides at its output to OR gate 5903 this same signal. Its input is connected to the output of OR gate 5905 to which are fed the associated signals from FIGURE 43. AND gate 5902 is unblocked by the output of OR gate 5905 and the NORMAL END OF OPERATION SAMPLE signal from FIGURE 58.

Referring now to FIGURE 60, there is shown the PROLONGED END OF OPERATION TRIGGER 6001. It is turned ON by the NORMAL END OF OPERATION signal from FIGURE 59 and turned OFF by the A1.0 pulse. When it is ON it provides the PROLONGED END OF OPERATION signal to FIGURE 52.

Turning now to FIGURE 56, there is shown the circuitry for the EXECUTION CONTROLS FOR IR-3 for the three-microsecond instructions, AND gates 5601, 5602 and 5603 are sampled at A2.0 time. The appropriate signals associated with each AND gate at A2.0 time provide the indicated signals at the outputs thereof.

Turning now to FIGURE 57, there is shown the EXECUTION CONTROLS FOR IR-3 CONDITIONAL TRANSFER. OR gate 5701 provides at its output the AFFIRMATIVE CONDITIONAL TRANSFER IN IR-3 signal to FIGURES 48 and 49. This signal is provided whenever one of the AND gates 5702, 5703, and 5704 are unblocked. They are unblocked by the signals associated therewith. The output of OR gate 5701 is fed to inverter 5705 to provide at its output the NOT AFFIRMATIVE CONDITIONAL TRANSFER IN IR-3 signal to FIGURE 58. The output of this OR gate 5701 is also fed to AND gate 5708. When this AND gate is unblocked it provides the IR-3 TO INSTRUCTION COUNTER control signal. It is unblocked by an up level at the output of OR gate 5701 together with an up level at the output of inverter 5709 at A2.0 time. The output of AND gate 5710 is fed to the input in inverter 5709. AND gate 5710 is unblocked by the signals identified as —(S) IN IR-3 and AFFIRMATIVE CONDITIONAL TRANSFER IN XIR-3.

Turning now to FIGURE 58, there is shown the NORMAL END OF OPERATION SAMPLE circuitry. OR gate 5801 provides at its output the NORMAL END OF OPERATION SAMPLE at A2.0 time. This signal is fed to FIGURE 59. The unblocking of any one of the AND gates 5802, 5803, 5804, or 5805 will provide this signal at the output of OR gate 5801. All of these AND gates are conditioned at A2.0 time and are unblocked by the signals associated with each.

FIGURE 61 shows the cycle time generator circuitry. There is a similar circuit for generating each memory cycle. At A2.5 AND gate 6101 is unblocked by GO TO COPY WRITE CYCLE. This turns trigger 6102 ON. This conditions AND gates 6103 and 6104 and an output from one or the other is provided at A0 by the MEM 1 ON or MEM 2 ON signals. Reset of trigger 6102 is obtained through OR gate 6105.

Figure 40:
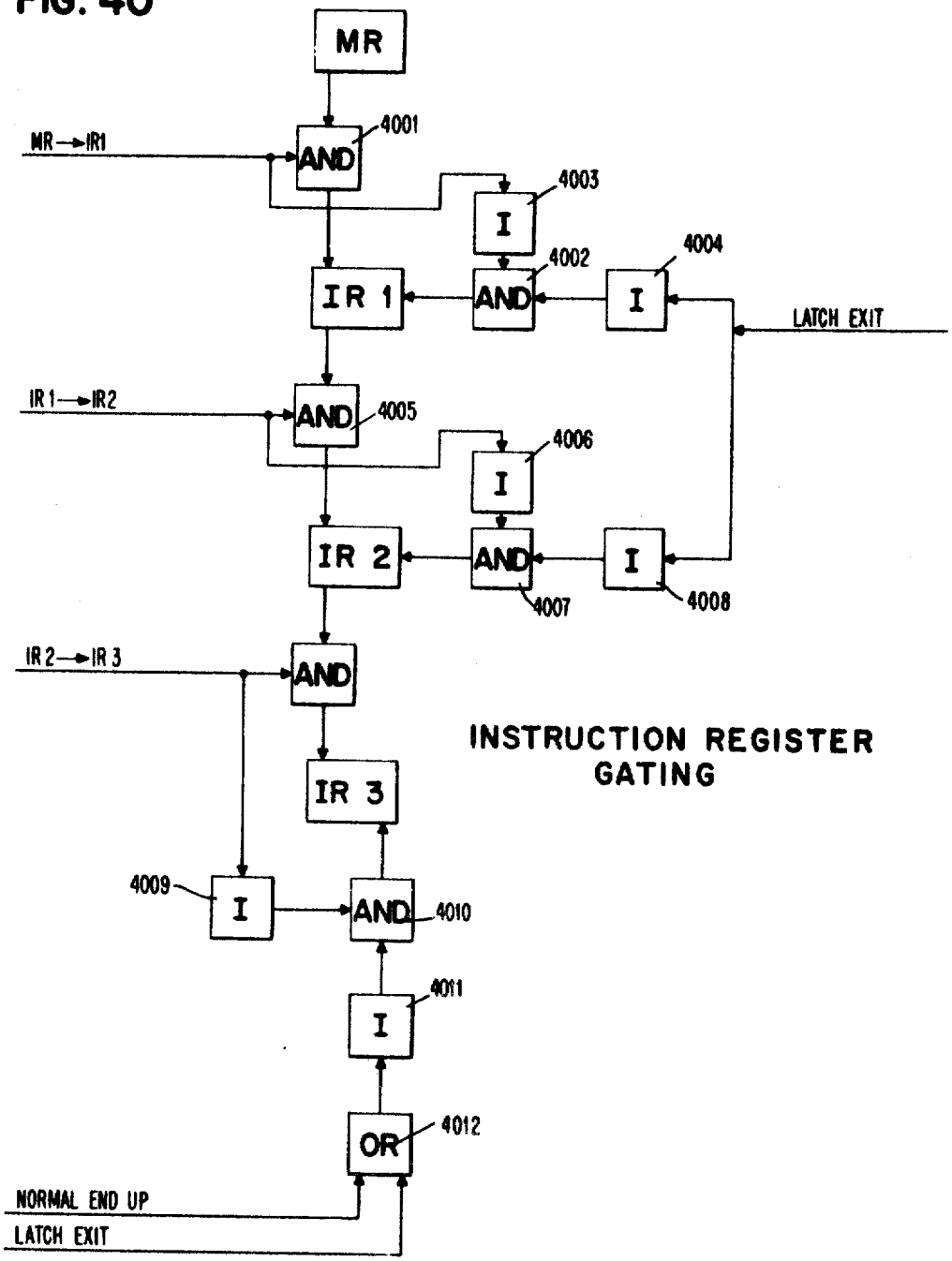
FIGURE 40 is a diagrammatic view of intra-register gating in the control computer.

FIGURE 40 illustrates the flushing between monitor register and the instruction counters in the control machine. Similar flushing is obtained in the main machine. The control signal MONITOR REGISTER to IR-1 at A0 time flushes the monitor register to IR-1 through AND gates 4001. The outputs of these AND gates feed the INPUT LINES in the dynamic flip-flops for each stage of the registers. The HOLD line for each stage is obtained at the output of AND gate 4002. In the absence of the control signal, this HOLD line is up providing recirculation in each stage of the register. The output of inverter 4003 is up as is the output of inverter 4004. When the control signal is fed to AND gates 4001, inverter 4003 blocks AND gate 4002 and the HOLD line goes down to permit entry of data from monitor register to IR-1. The signal LATCH EXIT will also block AND gate 4002 to bring the HOLD line down and clear registers IR-1 and IR-2. AND gates 4005 and 4007 and inverters 4006 and 4008 function similarly with IR-2.

In IR-3 inverter 4009 blocks AND gates 4010 upon a control signal IR-2 to IR-3. IR-3 is cleared by a NORMAL END OF OPERATION signal or LATCH EXIT to OR gate 4012 through inverter 4011.

Figure 34:
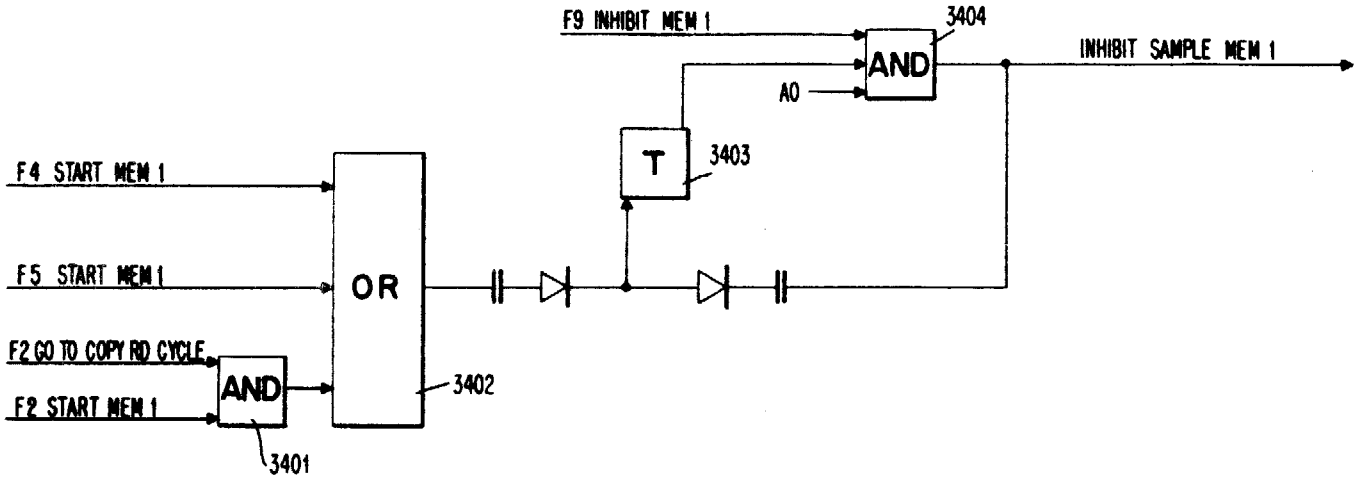
FIGURE 34 is a diagrammatic view of the generation of an INHIBIT SAMPLE signal for memory.

Referring now to FIGURE 34, there is shown circuitry for generating the INHIBIT SAMPLE pulse for memory 1 which has a function corresponding to the INHIBIT SAMPLE pulse of the above-identified application to Ross et al. This circuitry is also duplicated for memory 2. The INHIBIT SAMPLE pulse for memory 1 is generated only when a STORE cycle or a READ COPY cycle for memory 1 is performed, since the function of this signal is to prevent the generation of a sampling pulse which would gate information from the memory to its output lines. A START MEMORY 1 signal from either FIGURE 4 or FIGURE 5 is directed through OR gate 3402 to set trigger 3403 to its ON position. At A0 time, the condition of trigger 3403 is sampled and an INHIBIT SAMPLE MEMORY 1 signal produced at the output of AND gate 3404. However, the appearance of a signal at the output of AND circuit 3404 is also conditioned upon the fact that trigger 914 in FIGURE 9 is in its OFF condition. When the output signal from AND gate 3404 falls, the trailing edge will set trigger 3403 to its OFF condition. Also, trigger 3403 can be set to its ON condition by virtue of a pulse appearing at the output of AND gate 3401. AND circuit 3401 generates a pulse if it receives both a GO TO COPY READ cycle signal from FIGURE 2, and a START MEMORY 1 signal from FIGURE 2. The presence of these two signals indicates that information from the input-output register 111 in FIGURE 1 is to be sent to memory 1. The function of the input from trigger 914 is to prohibit an output from AND circuit 3404 more than once during a six-microsecond period.

SAMPLE OPERATION

It is now proposed to go through a sample operation illustrating the look-ahead feature and memory multiplexing. For a guide, FIGURES 62 through 66 should be used.

Let it be assumed that initially all of the registers are empty, both of the memories are OFF and that the instruction counter contains an address for memory 1. It will be recalled that the instruction counter is a 12-bit register and that the twelfth bit therein functions as the seventeenth bit in an instruction word. The instruction counter is incremented at A0 time under the conditions whereby a control signal instruction counter to memory address buffer is achieved. This control signal is fed to an AND gate which is unblocked at A0 time, the output of which increments the counter. Turning to FIGURE 3, it is seen that the SIGNAL INSTRUCTION COUNTER (17) is up. We have assumed that both memories including memory 1 are OFF and consequently the signal MEMORY 1 OFF is up. We have also assumed that all of the registers including the copy registers are empty and that no SIGNAL READ COPY PROCEED or SIGNAL WRITE COPY PROCEED is involved at this time. Consequently from FIGURE 2 it is seen that the output of inverter 209, namely, the SIGNAL NOT CONTROL 1, is up. As can be seen from FIGURE 27, both triggers 2701 and 2702 are OFF to provide from AND gate 2704 the SIGNAL NOT BLOCK I REFERENCE CYCLES. The monitor register is empty and consequently the eighteenth bit position is a zero to provide the SIGNAL MONITOR REGISTER ($\overline{18}$) from FIGURE 22. The SIGNAL IR-1 EMPTY is received from FIGURE 35 to unblock AND gate 314. The output of AND gate 314 feeds the input to AND gate 310 which together with the SIGNALS NOT CONTROL 1 and NOT BLOCK I REFERENCE CYCLES unblocks this AND gate to provide an up level to AND gate 311. This up level is combined with the SIGNAL INSTRUCTION COUNTER (17) and MEMORY 1 OFF to unblock AND gate 311. This provides the SIGNAL GO TO INSTRUCTION REFERENCE CYCLE at the output of OR gate 304. It also provides through the AND gates 304 the gating of the instruction counter to the memory address buffer. Turning to FIGURE 11, it can be seen that this gating takes place via AND gates 1102 at A2.5 time. Consequently, just prior to the commencement of the first cycle, the address portion in the instruction counter is gated to the memory address buffer.

In FIGURE 3, the output of AND gate 311 also provides the SIGNAL START MEMORY 1 to FIGURE 9. This signal is fed to OR gate 902 therein to start the memory 1 clock and controls. In the FIRST CYCLE, at A0 time in this clock the trigger 905 is turned ON to provide the MEMORY 1 ON signal. This turns memory 1 ON at A0 time. It should be recalled that this memory will stay ON for at least six microseconds. The SIGNAL MEMORY 1 ON, however, will be provided only from A0 to A3 time. As shown in FIGURE 11, the memory address buffer is gated to memory address register 1 at A0 time. SIGNAL GO TO INSTRUCTION REFERENCE CYCLE obtained in FIGURE 3 is fed to the cycle time generator shown in FIGURE 61. This is the generator for all of the memory cycles. This signal is fed to AND gate 6101. It can be seen that prior to the first A0 time, namely, at A2.5 time, AND gate 6101 is unblocked to turn ON trigger 6102. This provides an up level to one of the inputs to AND gates 6103 and 6104. The SIGNAL MEMORY 1 ON unblocks AND gate 6103 to provide the SIGNAL INSTRUCTION REFERENCE CYCLE MEMORY 1.

Referring to FIGURE 24, to AND gates 2401 are fed the signals INSTRUCTION REFERENCE CYCLE FOR MEMORY 1, the A1.5 pulse and the memory 1 buses —(s–18)+0 gate memory 1 to the monitor register. Let it be assumed that the instruction pulled out of memory and stored in the monitor register is a STORE MQ for memory 2 instruction.

At A2.5 time the instruction counter has an address for memory 2. Memory 2 will be OFF at the next A0 time, at the beginning of cycle 2. Turning again to FIGURE 3, it can be seen that the conditions are such that OR gate 304 provides the signal GO TO INSTRUCTION REFERENCE CYCLE and at the output of AND gate 305 the gating of the instruction counter to the memory address buffer. It should be recalled that the instruction read out of memory on the previous cycle to the monitor register was an instruction for the control machine and consequently the eighteenth bit therein is a zero. In FIGURE 3 the signal monitor register $\overline{(18)}$ is provided to AND gate 314. Since IR–1 is empty, AND gate 314 is unblocked. Memory 2 is OFF, the signal INSTRUCTION COUNTER (17) is fed to AND gate 312 to unblock this AND gate together with the output of AND gate 310. The output of AND gate 312 also provides the START MEMORY 2 signal for AND gate 902 in FIGURE 9. It should be recalled at this time that a duplicate circuit as shown in FIGURE 9 is provided for the MEMORY 2 OFF and MEMORY 2 ON signals.

The A2.5 pulse will gate the instruction counter into memory address buffer.

At A0 time, the SECOND CYCLE, the memory address buffer is gated to memory address register 2. This gating is achieved in FIGURE 11 by AND gates 1111 at A0 time. The MEMORY 2 ON signal is received from FIGURE 9 at A0 time when trigger 905 for the memory 2 circuitry goes ON. Also at A0 time the monitor register is gated to IR–1. For this gating reference is made to FIGURE 52. AND gate 5208 is unblocked by the signals MONITOR REGISTER $(\overline{18})$, MONITOR REGISTER FULL and NOT INSTANTANEOUS INSTRUCTION. The output of AND gate 5208 is fed to AND gate 5209 together with the signal IR–1 EMPTY. The output of AND gate 5209 provides the signal MONITOR REGISTER TO IR–1. As can be seen from FIGURE 24, the AND gates 2405 through 2406 are conditioned at A0 time to gate the monitor register to IR–1. Turning to FIGURE 22, the signal MONITOR REGISTER TO IR–1 is fed to OR gate 2202 and the output thereof to AND gate 2201. At A1.0 time this AND gate is unblocked to reset the monitor register. The output of AND gate 2201 is also fed to FIGURE 25 to provide the MONITOR REGISTER RESET TO STATUS TRIGGER signal. Turning to FIGURE 25, this status trigger is identified as 2501. It should be noted in connection with FIGURE 25 that the signal INSTRUCTION REFERENCE CYCLE MEMORY 1 or INSTRUCTION REFERENCE CYCLE MEMORY 2 at A1.5 time unblocks AND gate 2502 to turn the status trigger 2501 ON to provide the MONITOR REGISTER FULL signal.

Turning to FIGURE 24, the AND gates 2402 are conditioned at A1.5 time to gate the memory 2 buses to the monitor register. Let it be assumed that the instruction pulled out of memory 2 to the mintor register is an instruction for copy into memory 2, READ COPY INTO MEMORY 2. This is an instantaneous instruction. The decoder associated with monitor register recognizes this instantaneous instruction. Turning to FIGURE 31, it is seen that AND gate 3101 is unblocked at A2.0 time. To this gate are fed the signals COPY IN MONITOR REGISTER from the monitor register decoder, COPY REGISTER 1 EMPTY from FIGURE 29, COPY REGISTER 2 EMPTY from FIGURE 30, and the A2.0 pulse. Turning to FIGURE 29, the status trigger 2901 is assumed to be OFF to provide the signal COPY REGISTER 1 EMPTY. Turning to FIGURE 30, the status trigger 3001 is also assumed to be OFF. This provides the COPY REGISTER 2 EMPTY signal. The signal MONITOR REGISTER TO COPY REGISTER 2 from FIGURE 31 is fed to FIGURE 28. This signal feeds the AND gates 2808 and 2810 to which are also fed the positions 6 through 17 of the monitor register. This gates the monitor register to copy register 2. At the same time the signal MONITOR REGISTER TO COPY REGISTER 2 from FIGURE 31 is fed to the copy register 2 status trigger 3001 through OR gate 3002 to turn this trigger ON to provide the COPY REGISTER 2 FULL signal.

At A2.4 time the instruction counter has an address for memory 1. Memory 1 will be OFF at the next A0 time, beginning the third cycle. It will be assumed that some time will elapse before the receipt of the signal READ COPY PROCEED. Turning first to FIGURE 33, it is seen that the signal from FIGURE 21 identified as COPY IN MONITOR REGISTER is fed to AND gate 3313. This AND gate is unblocked by this signal together with the COPY REGISTER 1 EMPTY signal from FIGURE 29. This provides an output from OR gate 3306 to AND gate 3304 which is unblocked at A2.0 time to provide the signal INSTANTANEOUS END OF OPERATION FOR NOT TRANSFER OR STOP. This signal as shown in FIGURE 3 is fed to AND gate 310. This AND gate is unblocked since there is also provided thereto the signals NOT CONTROL 1 from FIGURE 2 since there is no copy but NOT BLOCK I REFERENCE CYCLES from FIGURE 27 is not obtained until A0 time of the next cycle. As soon as copy is detected in monitor register, the trigger 2701 is turned ON to provide the Block I REFERENCE CYCLES signal at A1.5 time in the second cycle. At A2.0 time the signal INSTANTANEOUS END OF OPERATION is applied to trigger 2701 but resets trigger 2701 at A0 time corresponding to the trailing edge of this signal. So it can be seen that no instruction reference is possible for the next cycle. Furthermore, no data or store cycles can be initiated, since the registers do not contain these instructions.

During the third cycle, therefore, no reference is made to either memory. At A0 time of this cycle, the contents of IR–1 are transferred to IR–2 so that IR–2 now contains the store MQ into memory 1 instruction, therefore leaving IR–1 empty. This gating is achieved in FIGURE 52. There is no data demand in IR–1 so the signal not data demand for FIGURE 38 is provided to AND gate 5205. Turning to FIGURE 53, we see that in IR–1 we have a store MQ instruction which through OR gate 5302 provides the signal not data demand. This not data demand from IR–1 is fed to the AND gate 5205. From FIGURE 35 it is seen that IR–2 is empty. The signal IR–2 empty is fed also to AND gate 5205 to provide the gating of IR–1 to IR–2 at A0 time through AND gates 5206. FIGURE 35 shows the status indicator of the registers and the five Op code positions are fed to OR gate 3501 to provide either the signal register full or at the output of inverter 3502 the signal register empty. Since all of these five positions are zero, then the output of inverter 3502 provides the register empty signal. At A1.0 time of the third cycle, the monitor register is reset so as to erase the copy instruction which was placed therein during the previous cycle. Since this is not a memory cycle, the monitor register is not refilled at A1.5 time of the third cycle, but remains empty. At A2.5 time of the third cycle, it is seen that the instruction counter still calls for an instruction to be withdrawn from memory 1 and that these conditions are met. Furthermore, IR–1 is empty so that a go to instruction reference signal may be generated at this time. Therefore, at A2.5 time, the contents of the instruction counter are transferred to the memory address buffer and the fourth cycle will therefore be an instruction reference cycle.

At A0 time, fourth cycle, the contents of the memory address buffer are gated to memory address register 1.

Also we have in IR–2 the STORE MQ instruction for memory 2. By some means (not shown) the monitor register was reset after the copy instruction has been flushed therefrom to copy register 2 so that monitor register is empty at beginning of fourth cycle. This occurred at A1.0 time of the third cycle.

At A1.5 time the memory buses are gated to the monitor register as seen in FIGURE 24. We will assume that in accordance with this instruction data will be withdrawn from memory 1 and placed into XMQ register in the main machine. This instruction is called LOAD XMQ.

At A2.5 time the instruction counter has an address from memory 2. Memory 2 will be OFF at the next A0 time. Consequently, at A2.5 time, the instruction counter is flushed to the memory address buffer. The instruction LOAD XMQ which now appears in the monitor register has a 1 in the eighteenth bit position. Consequently, it can be seen in connection with FIGURE 3 that AND gate 307 is unblocked by the signals XIR–1 EMPTY, MONITOR REGISTER (18) and NOT LATCH MODE signal. This provides an output from AND gate 310 which unblocks AND gate 311 to provide the START MEMORY 2 signal and of course the GO TO INSTRUCTION REFERENCE CYCLE signal. It also provides the control gating of the instruction counter to the memory address buffer. This gating is accomplished at A2.5 time as shown in connection with FIGURE 11.

At A0 time in the next cycle, the fifth cycle, the memory address buffer is gated to memory address register 2. The monitor register is flushed to XIB–1. IR–2 still contains the STORE MQ instruction. The gating of monitor register to XIB–1 is shown in FIGURE 23. AND gate 2302 receives inputs NOT LATCH MODE from FIGURE 47, plus MONITOR REGISTER (18) from FIGURE 22, and XIB–1 EMPTY from FIGURE 35. This generates MONITOR REGISTER TO XIB–1 through OR gate 2303. This signal goes up to FIGURE 24, transfers monitor register contents XIB–1 by AND gates 2403 and 2404. In FIGURE 52 it is seen that there is a store demand in IR–2 so that AND gates 5202 are not conditioned. Further, there is no store cycle so gating signal IR–2 TO IR–3 is not generated.

At A1.0 time the monitor register is reset. This resetting of monitor register is achieved in FIGURE 22 because of the signal MONITOR REGISTER TO XIB–1. At A1.0 time AND gate 2201 is unblocked to reset the monitor register. This also provides the MONITOR REGISTER RESET TO STATUS TRIGGER FOR FIGURE 25. This turns the status trigger 2501 OFF.

At A1.5 time the memory buses of memory 2 gate the instruction to the monitor register. Let it be assumed that the instruction thus gated is a transfer instruction for transferring a memory 2 address to the instruction counter and identified as TRANSFER. This is an instantaneous instruction. It is recognized by the decoder associated with monitor register. Immediately upon recognizing the fact that an unconditional transfer instruction has been placed into monitor register, the bit positions 6 through 17 contained in this instruction are transferred to the instruction counter so as to begin the sequence of instruction programming at a different point. It is understood at this point that normally the instruction counter is stepped after its contents have been transferred to the memory address buffer. However, in the instant case, upon transferring the address of the unconditional transfer instruction from the monitor register to the instruction counter, the instruction counter will require the next succeeding instruction to again be retrieved from memory 2, instead of from memory 1 which would have been the case if the instruction counter were stepped as normal.

Turning now to FIGURE 11, it is seen that the bit positions 6 through 17 in the monitor register, which comprise the address portion of an instruction, are transferred to their corresponding stages in the instruction counter by means of AND gates 1109. The gating signal to AND gate 1109 is received on the lead marked INSTANT END OP FOR TRANSFER AND STOP. This gating signal is generated in FIGURE 33 as follows: The decoder of the monitor register recognizes the presence of the unconditional transfer and so lifts the output of OR gate 3302. At A2.0 time of this cycle AND gate 3303 is thereby conditioned to pass a signal indicating INSTANT END OP FOR THE TRANSFER AND STOP instructions. Therefore, in FIGURE 11 the receipt of this signal from FIGURE 33 causes the monitor register bits 6 through 17 to be transferred to the instruction counter. Furthermore, it is desired at this point to begin an instruction reference cycle if the new address now placed in the instruction counter refers to a memory which would be available at the beginning of the next cycle. In FIGURE 3, it is noted that the control signal INSTANT END OP FOR TRANSFER AND STOP is received by AND gate 301, together with the NOT CONTROL SIGNAL 1 from the copy priority level. The output of AND gate 301 samples the condition of AND gates 302 and 303. It is seen that the inputs to AND gate 302 come from the seventeenth bit of the monitor register as well as the MEMORY 1 OFF signal from FIGURE 9, while the inputs to AND gate 303 are derived from the MONITOR REGISTER ($\overline{17}$) and the MEMORY 2 OFF signal from FIGURE 9. As stated before, the seventeenth bit in the monitor register has been transferred to the instruction counter at A2.0 time. Normally, it is the seventeenth bit in the instruction counter which determines from which memory the next instruction is to be withdrawn. However, a transfer is executed from monitor register at A2.0 time. Therefore, the seventeenth bit of the monitor register is examined at this time in order to determine from which memory the next instruction is to be withdrawn. Since, under our assumptions, the address of the transfer instruction will refer to an address in memory 2 for the next instruction cycle, only AND gate 303 in FIGURE 3 is examined, since it receives MONITOR REGISTER ($\overline{17}$). However, since the transfer instruction itself was withdrawn from memory 2 in this cycle, it is seen that memory 2 will not be available at the beginning of the next succeeding cycle in order to be addressed anew so as to bring forth the next succeeding instruction. Therefore no output is derived from AND gate 303. Also, no output is derived from AND gate 302 since the absence of a signal from the seventeenth bit of the monitor register disables this particular gate. Therefore, an instruction reference cycle cannot be initiated from the second level of the priority control as shown in FIGURE 3.

In the absence of a copy reference cycle and an instruction reference cycle from the first two levels of priority control, it is now desired to examine the lower levels of priority control to ascertain whether a data or a store cycle may be initiated. The highest level of priority following that of the instruction control is that of a store reference cycle in the main computer. Upon examination of the XIR–2 of the main computer, it is seen that no store instruction is contained therein. However, there is a store instruction contained in the IR–2 of the control computer which calls for the use of memory 2. It should be appreciated from an examination of FIGURE 52 that the store instruction previously placed therein during cycle 3 was not shifted from IR–2 to IR–3 during the beginning of cycle 4, in which we now find ourselves.

However, upon examination of the store instruction found in IR–2, it is seen that it too calls for use of memory 2 which of course is impossible at the beginning of the next succeeding cycle 6. Therefore, neither of the store priority levels found in FIGURE 4 or in FIGURE 5 may be energized. In FIGURE 4, there will be no output possible from AND gate 405 since there is no store instruction in IR–2 and therefore no signal on the line X STORE DEMAND. Furthermore, in FIGURE 5 it is seen that all three inputs to AND gate 501 are raised. This is due to the fact that there is a store instruction found in IR–2, and that no signal is being generated from the priority levels found in FIGURES 2, 3, and 4. These priority controls are best observed in FIGURE 10.

As previously described, the lack of inputs to inverter gates 1004, 1009, and 1016 provide an output at AND gate 1018 which is the NOT CONTROL 1, 2, 3, signal in FIGURE 5. However, since the seventeenth bit in IR–2 calls for the use of memory 2, it is seen that there can be no output at AND gate 503 since memory 2 will not be available at the beginning of the next cycle, due to the fact that trigger 905 will not have been reset at this time as before described. No output is derived at AND gate 502 since the status of the seventeenth stage in IR–2 will prevent this gate from being raised. Therefore, a store reference cycle for the control machine will not be generated from the level found in FIGURE 5.

The next level of priority after that of store is a data reference cycle, first for the main machine, and then for the control machine. These levels are shown in FIGURES 6 and 7. As noted in FIGURE 6, an output must be derived from AND gate 601 before a GO TO DATA REFERENCE CYCLE can possibly be initiated. However, an output from AND gate 601 requires the presence of a signal on lead X DATA DEMAND which would indicate that a data instruction is stored in XIR–1. This structure is shown in FIGURE 38 wherein OR gate 3801 receives various signals from the decoder associated with XIR–1. In the absence of a data instruction in this register, no output will be generated on the X DATA DEMAND lead and therefore no output can be derived from AND gate 601 in FIGURE 6. Therefore, there will be no signal GO TO X DATA REFERENCE CYCLE generated from OR gate 604. Consequently, the NOT CONTROL 1, 2, 3, 4, and 5 signal will be generated from AND gate 607, as described above in connection with the previous priority cycles. So the priority control now reverts to FIGURE 7 which shows a control level for the control machine. However, similar to the structure shown in FIGURE 6, a signal from AND gate 701 is required before a data reference cycle for the control machine can be initiated. Therefore, the DATA DEMAND lead, which is one of the inputs to AND gate 701, must be up, which would thus indicate the presence of a data instruction in IR–1. It is noted that there is no such instruction to be found in IR–1 at this time, so therefore there will be no data reference cycle initiated for the control machine.

The next and last priority level to be considered is that found in FIGURE 8. This is termed a SPECIAL GO TO INSTRUCTION REFERENCE CONTROL which should be distinguished from that GO TO REFERENCE CONTROL found in FIGURE 3 before described. In order to initiate a GO TO INSTRUCTION REFERENCE CYCLE from this priority level in FIGURE 8, it is necessary at least that there be an output from AND gate 809 which is thereafter sampled by the contents of the instruction counter and the states of the memory in order to determine whether a memory would be available to withdraw an instruction denoted by the address in the instruction counter. However, as in FIGURE 3, the instruction counter calls for the use of memory 2 and this memory is not available. Therefore, no GO TO INSTRUCTION REFERENCE CYCLE is obtained from FIGURE 8.

It has now been determined by the priority control that no conditions are present which will cause any of the priority levels to initiate a memory reference cycle. Therefore, only a transfer of information between the instruction registers in each computer may be affected during the next succeeding cycle, which will be subsequently described. It should be noted, however, that if an arithmetic instruction were contained in either XIR–3 or in IR–3 of the two machines, that the computation being carried out in accordance with this instruction would continue to be performed during the next succeeding cycle even though there was no memory reference cycle being performed.

At A0 time of the next succeeding cycle, which is the sixth cycle, the LOAD MQ instruction found in XIB–1 will be transferred to XIB–2. This operation is accomplished by the structure shown in FIGURE 36. OR gate 3603 will receive a signal on one of its inputs indicating XIB–2 EMPTY, this generating the gating signal XIB–1 TO XIB–2. Further gates are supplied so as to cause the actual transfer between the two registers to occur at A0 time of the cycle in which we are in. These gates are similar to the AND gates 5201, 5206 found in FIGURE 52. However, in the control computer the store instruction which is contained in IR–2 is again held therein since its operation and execution has not been initiated. At A1.0 time of this sixth cycle, OR gate 2202 in FIGURE 22 receives an input from a source indicating that the instantaneous instruction contained therein should be erased, which thus allows AND gate 2201 to generate a MONITOR REGISTER RESET signal at the A1.0 time. This reset signal thereby erases the unconditional transfer instruction which was placed into the monitor register in the preceding cycle. Furthermore, the reset signal from AND gate 2201 also resets the monitor register status trigger 2501 in FIGURE 25 to its state indicating that the monitor register is now empty.

At A2.5 time of the sixth cycle, the priority control level will again attempt to initiate a memory reference cycle. It is still assumed that no COPY PROCEED signals have been received from the input-output units which would initiate a COPY REFERENCE CYCLE in FIGURE 2. Therefore, the second priority level, that of instruction reference control, is conditioned to initiate an instruction reference cycle if proper criteria are found. It should be noted that the instruction counter still contains the address which was transferred into it from the monitor register in accordance with the unconditional transfer instruction previously described. Furthermore, since an instruction reference cycle was not performed in the sixth cycle, no count has been added to the instruction counter which therefore still calls for the next instruction to be taken from memory 2. Since the IR–1 register is empty, and the monitor register generates a ($\overline{18}$) signal, AND gate 314 in FIGURE 3 will generate an output signal. Furthermore, AND gate 310 will generate an output signal due to the presence of all three of its inputs and this output signal will raise the output of AND gate 312 since the instruction counter generates a ($\overline{17}$) signal and the trigger 905 in FIGURE 9 will generate a MEMORY 2 OFF signal at this time, which thus indicates that memory 2 will be available for a new address as the beginning of the next succeeding cycle. Therefore, the priority level of FIGURE 3 will generate a GO TO INSTRUCTION REFERENCE CYCLE in the output of OR gate 304. This GO TO INSTRUCTION REFERENCE CYCLE will inhibit of course all of the following priority levels as has been previously described. At A2.5 time then, the address contained in the instruction counter is transferred to the memory address buffer and from thence will be transferred to the memory address register 2 at the A0 time of the seventh cycle, as has been previously described. Furthermore, at A0 time of the seventh cycle, the LOAD MQ instruction found in XIB–2 will be automatically transferred to XIB–3 due to a generation of the XIB–2 TO XIB–3 signal in FIGURE 36. This signal is generated at the output of OR gate 3602 since a signal is detected at one of its inputs which indicates XIB–3 EMPTY and thus can receive this LOAD MQ instruction.

Since the monitor register had already previously been reset at the A1.0 time of the sixth cycle, it will remain empty in order to receive the new instruction during the seventh cycle. Therefore, at A1.5 time of the seventh cycle, the next instruction is taken from memory 2 at the address indicated by the instruction counter and is transferred to the monitor register as has been previously described. For purposes of the present description, it is assumed that this instruction is a data instruction and requires that data be loaded from memory 1 into the MQ register of the control computer. This instruction is abbreviated as LOAD MQ.

At A2.5 time of the seventh cycle, the priority control again will determine as to what memory reference cycle, if any, is to be initiated for the next following cycle. Since the instruction counter has been stepped by one count at the end of the sixth cycle, because an instruction reference cycle was called for, it now requires that the next instruction be withdrawn from memory 1. The instruction contained in the monitor register at this time is to go to the control computer, and the priority control in FIGURE 3 determines IR–1 EMPTY so as to be able to receive this instruction from the monitor register. Therefore, AND gate 314 in FIGURE 3 will provide an output which will also provide an output from AND circuit 311, since the instruction counter calls for an instruction reference cycle utilizing memory 1 which will be available at the beginning of the eighth cycle. Therefore, as before described, a GO TO INSTRUCTION REFERENCE CYCLE signal is generated from FIGURE 3 which will automatically transfer the contents of the instruction counter to memory address buffer and from there to memory address register 1. During the A0 time of the eighth cycle, the contents of XIB–3 are also automatically transferred to XIR–1 by the circuitry of FIGURE 36, which detected the fact that XIR–1 was empty. Therefore, during A0 time of the eighth cycle, it is seen that the instruction LOAD XMQ has been transferred from the XIB–3 to XIR–1. Furthermore, at the same A0 time of the eighth cycle, the LOAD MQ instruction for the monitor register is transferred to IR–1 by the circuitry of FIGURE 24. This latter operation is accomplished by means of AND gates 2405 and 2406 which transfer the contents of the monitor register to IR–1 upon receipt of a signal MONITOR REGISTER TO IR–1 and a timing signal A0. The conditioning signal MONITOR REGISTER TO IR–1 is generated in FIGURE 52 as follows: Since the monitor register stage 18 is zero, and since the decoder detects the presence of an Op code therein, thus indicating that the monitor register is full, two inputs of AND circuit 5208 are raised. Furthermore, the instruction held in monitor register at this time is a LOAD MQ instruction which is not an instantaneous instruction. Therefore, the third input to AND circuit 5208, which is a NOT INSTANTANEOUS INSTRUCTION input, is present so as to enable AND gate 5208 to generate a signal therefrom. AND gate 5209 will thereby generate an output signal since IR–1 still remains empty and since it receives a signal from AND gate 5208. Therefore, a signal MONITOR REGISTER TO IR–1 is generated which will cause the transfer of the LOAD MQ instruction from monitor register to IR–1 to occur.

At A1.0 time in the eighth cycle, the monitor register is reset by circuitry shown in FIGURE 22, since OR gate 2202 has an output on it due to the presence of the input signal MONITOR REGISTER TO IR–1. Thereafter, at A1.5 time in the eighth cycle the new instruction from memory 1 will be stored in the monitor register. It is assumed for the purpose of this discussion that this is a store instruction which requires that data be stored from the XMQ register in the main machine into memory 1. This will be abbreviated as STORE XMQ.

It is now assumed that a COPY PROCEED signal is received at A2.0 time during the eighth cycle. Consequently, the READ COPY PROCEED line in FIGURE 2 goes up at A2.0 time.

The copy register 2 of course still contains the address in memory 2 wherein the copy is to take place. Consequently, the twelfth stage position in copy register 2 is a zero. From FIGURE 9 the signal MEMORY 2 OFF is received which unblocks AND gate 211. The output of AND gate 211 together with the READ COPY PROCEED signal unblocks AND gate 212. The output of AND gate 212 is fed to OR gates 210 and 213. At the output of OR gate 213 there is generated the START MEMORY 2 signal. At the output of OR gate 210 there is generated the GO TO COPY READ CYCLE. The output of OR gate 210 is also fed to the input of OR gate 205 and the output thereof to AND gates 206 which gate copy register 2 to the memory address buffer. Referring to FIGURE 11 then, the COPY REGISTER 2 TO MEMORY ADDRESS BUFFER signal is fed to OR gates 1101. The output of OR gates 1101 are fed to the AND gates 1102 which are unblocked at A2.5 time to provide the actual flushing of the address from copy register 2 to the memory address buffer.

Now in the ninth cycle at A0 time, the memory address buffer is gated to memory address register 1. The monitor register is flushed to XIB–1 and is reset at A1.0 time. FIGURE 61 generates the READ I/O CYCLE FOR MEMORY 2. At A1.5 time the input-output register 111 of FIGURE 1 is gated through the switches 118 to memory 2 RI buffer 120 as shown in FIGURE 19. XIR–1 does not flush to XIR–2 at A0 time since XIR–1 has a data demand as shown in FIGURE 39. At A2.5 time in this cycle, we find that the instruction counter still has an address for memory 2. However, memory 2 will not be available at the beginning of the tenth cycle. Consequently, it can be seen from FIGURE 3 that the next memory cycle cannot be an instruction reference cycle. It can also be seen in accordance with FIGURE 4 that there cannot be a GO TO X STORE CYCLE for the main computer. Additionally, there cannot be a GO TO STORE CYCLE for the control machine nor a DATA REFERENCE CYCLE for the main or control machines. Consequently, the next cycle cannot be a memory cycle.

At A0 time in the tenth cycle, the contents of XIB–1 are flushed to XIB–2. At A1.5 time the contents of memory 2 RI buffer are read into memory 2 and the copy instruction has been executed. It should be recalled that when the READ COPY PROCEED signal is received and there is provided the READ I/O CYCLE FOR MEMORY 2, this occurs at A0 time. This signal was initiated at A0 time in the ninth cycle. With reference to FIGURE 30 it can be seen that the READ signal from trigger 6102 in FIGURE 61 at A2.0 time unblocks AND gate 3004 to provide a signal which will reset the status trigger 3001 to an OFF condition to provide the signal COPY REGISTER 2 EMPTY. It also provides the RESET COPY REGISTER 2 signal which is fed to FIGURE 28 to reset copy register 2.

It will be recalled that during the eighth cycle the LOAD XMQ instruction was flushed from XIB–3 to XIB–1. During the ninth cycle this instruction remained there. At A0 time of the tenth cycle LOAD XMQ still remains in XIR–1. This is because as seen in FIGURE 39, AND gates 3902 and 3903 remain blocked. Although XIR–2 is empty, there is no signal NOT DATA DEMAND X. This of course will block both of the AND gates 3902 and 3903 so that no control signal to flush XIR–1 to XIR–2 is generated. Furthermore, there was no generation of the GO TO X DATA REFERENCE CYCLE.

Referring again to the tenth cycle as we have previously stated, at A0 time XIB–1 is flushed to XIB–2. This is the STORE XMQ instruction. At A1.5 time by circuitry not shown, the contents of memory to RI buffer is read into memory 2.

At A2.5 time the instruction counter contains an address from memory 2. The memory 2 will be OFF at the A0 time for the next cycle. Turning to FIGURE 3, it can be seen that while the monitor register has a zero in the eighteenth bit position, IR–1 is not empty. Therefore, AND gate 314 is blocked. Furthermore, IR–2 is not empty and consequently AND gate 314 is not unblocked by the output of AND gate 313. Therefore AND gate 310 is blocked because of the output of AND gate 314 and the fact that there is no INSTANTANEOUS END OF OPERATION (NOT TRANSFER OR STOP) signal or a LATCH EXIT signal. It can be seen then that AND gate 310 is blocked and cannot generate an instruction reference cycle. The next level of priority is the store cycle for the main computer. For this we refer to FIGURE 4. There is no store demand because of course there is no store instruction in XIR–2. Consequently, this level of priority cannot be obtained. The next level is the store cycle for the control machine. For this we refer to FIGURE 5. There is a store demand in IR–2 (STORE MQ in Memory 2) and this STORE DEMAND signal is fed to AND gate 508. The NOT CONTROL 1, 2, 3 line is up, and so is IR–3 EMPTY from IR–3 decoder. AND gate 508 is unblocked to provide an up level to one of the inputs to AND gates 502 and 503. MEMORY 2 OFF signal is fed to AND gate 503. Since the store instruction in IR–2 is for memory 2, the seventeenth bit position is a zero and consequently the signal indicative of this condition to AND gate 503 is up. The output of AND gate 503 provides the START MEMORY 2 signal and through OR gate 504 the GO TO STORE CYCLE signal. This GO TO STORE CYCLE signal is also provided to the plurality of AND gates 507 to gate the address portion of IR–2 into the memory address buffer.

Referring again to FIGURE 61, the GO TO STORE CYCLE signal at 2.5 time together with the MEMORY 2 ON signal at A0 time of the next cycle provides the STORE CYCLE FOR MEMORY 2 signal.

Now referring to the eleventh cycle, at A0 time at which is commenced the GO TO STORE CYCLE FOR MEMORY 2, the contents of IR–2 are gated to IR–3. This gating is achieved as seen in FIGURE 52 by the GO TO STORE CYCLE signal which at A0 time will gate the contents of IR–2 to IR–3 through AND gates 5201. Also, the contents of XIB–2 are gated to XIB–3. This is a STORE XMQ instruction. The circuitry to achieve this control signal for the gating is seen in FIGURE 36. Again it should be noted that timing signals will have to be combined with this controlling signal to gate all of the stages of XIB–2 to XIB–3. Also at A0 time the memory address buffer is gated to memory address register 2.

Referring to FIGURE 19, the gating of MQ to memory 2 RI buffer is achieved at A1.5 time.

At A2.5 time we find that memory 1 will be OFF at A0 time in the twelfth cycle. The priority control determines that the next memory cycle can be a data reference cycle for the control machine. Consequently the address portion in IR–1 flushes to memory address buffer.

In the twelfth cycle at A0 time contents of memory 2 RI buffer are read into memory 2. IR–1 flushes to IR–2 and the memory address buffer flushes to memory address register 1. At A1.5 time the addressed data in memory 1 is read out into memory register A. This is accomplished by the circuitry of FIGURE 14.

At A1.5 time in the presence of the DATA REFERENCE CYCLE FOR MEMORY 1, AND gate 1401 is unblocked because memory register A is empty. The output of AND gate 1401 provides the control signal for reading out of memory 1 to memory register A. The MEMORY REGISTER A EMPTY signal is obtained from FIGURE 16. Turning to FIGURE 16, the trigger 1601 is normally OFF to provide this MEMORY REGISTER A EMPTY signal. The control signal from FIGURE 14 is fed to the circuitry of FIGURE 15 to perform the actual gating.

At A2.5 time in the twelfth cycle it is determined that memory 2 will be OFF at A0 time in the next cycle. The instruction counter contains an address from memory 2. Turning to FIGURE 3, it can be seen that AND gate 314 is unblocked by the IR–1 EMPTY signal and the MONITOR REGISTER ($\overline{18}$) signal. This being the case, with other criteria present, a GO TO INSTRUCTION REFERENCE CYCLE is generated in addition to the START MEMORY 2 signal. The instruction counter is gated to memory address buffer. Referring to FIGURE 17, it should be noted that the MEMORY REGISTER A LOADED signal from FIGURE 16 feeds AND gate 1702. It is assumed at this time that trigger 1703 is OFF. Therefore AND gate 1702 is unblocked at A2.5 time to set trigger 1701 and provide the USE MEMORY REGISTER A signal.

In the thirteenth cycle at A0 time the memory address buffer is gated to memory address register 2. Also the contents of IR–2 are flushed to IR–3. At A1.5 time memory 2 reads into the monitor register. It is assumed that this instruction is an X STORE ACCUMULATOR instruction for memory 1. At A2.0 time the MQ register is loaded. It is loaded from memory register A by use of the signal USE MEMORY A from trigger 1701 in FIGURE 17 together with the signal REGISTER A OR B TO MQ which is generated by the unblocking of AND gate 5601 in FIGURE 56 at A2.0 time by the LOAD MQ instruction in IR–3. The exact gating circuitry is not shown. This circuitry is similar to that shown in IBM 701 except that in the instant case two memory registers, namely, memory registers A and B, are employed rather than a single such register.

At A2.5 time the instruction counter has an address for memory 1. Memory 1 will be OFF at A0 time of the next cycle. However, in examining the priority level shown in FIGURE 3, it is noted that XIR–1 is not empty, but instead contains the data instruction LOAD XMQ. Furthermore, one input to AND circuit 308 is not present since there is no signal on the NOT X DATA DEMAND lead to that AND circuit due to the presence of this data instruction in XIR–1. Therefore, not all inputs to AND circuit 307 are present so that no output is derived from this particular AND circuit. Furthermore, since the monitor register at this time contains a store instruction which is to be routed to the main computer, the monitor register stage 18 is filled so that there is no signal on the MONITOR REGISTER ($\overline{18}$) lead to AND circuit 314. Therefore, not all inputs to AND circuit 310 are present and therefore no INSTRUCTION REFERENCE CONTROL CYCLE may be initiated from the priority level of FIGURE 3. There are no store demands or data demands for the control machine. There is a data demand in the main machine but the wrong memory is involved. There cannot be generated a special instruction reference cycle. Consequently, at A0 time in the next cycle, that is, the fourteenth cycle, the contents of the monitor register are flushed to XIB–1.

It can be seen from the foregoing precisely how the circuitry of the instant invention functions. It is not deemed necessary to complete the execution of the instructions still in the computer in order to demonstrate the feasibility of the instant system.

It is noted that in the sample operation instructions involving three microseconds were employed for illustration purposes. However, as previously noted, some instructions involve 12 microseconds and other multiples of 12 microseconds. For instance, an ADD instruction involves 12 microseconds. It should be noted that the adders employed in accordance with this invention are the same as those shown and described in the IBM 701 case.

Referring now to FIGURE 38, it is noted that ten instructions are considered to require data from the memory section during the operation thereof. These ten instructions are decodes from the XIR–1 decoder and are as follows:

(1) R ADD
(2) ADD
(3) ADD ABSOLUTE
(4) R SUBTRACT
(5) SUBTRACT
(6) SUBTRACT ABSOLUTE
(7) MULTIPLY
(8) MULTIPLY and ROUND
(9) DIVIDE
(10) LOAD MQ As before described, upon detection in XIR–1, at the earliest opportunity the data from the addresses associated with these instructions are withdrawn from memory and placed into an appropriate memory register A or memory register B of the main computer. At the same time that the data is being withdrawn from memory and placed into one of these registers, the instruction is transferred from XIR–1 to XIR–2. Thereafter the instruction is transferred from XIR–2 to XIR–3 and immediately upon arriving at XIR–3, the data instruction is performed utilizing the Operand which is now contained in one of the two memory registers of the main computer. As noted in FIGURE 43, the length of time required for execution of the data instructions varies. For example, such data instructions are RESET-ADD, RESET-SUBTRACT, LOAD MQ require but three microseconds to perform. This means that as soon as the instruction arrives at XIR–3, it is decoded and three microseconds later the instruction has been completely performed. However, other data instructions such as ADD, ADD ABSOLUTE, SUBTRACT and SUBTRACT ABSOLUTE require a 12-microsecond period in order to be performed. This is due to the fact that the arithmetic circuits in the present invention are similar to those used in the IBM 701 case. Thus, in addition, a 12-microsecond period is here required for propagation of carries and so forth which in like fashion was required in the IBM 701. Furthermore, such data instructions as MULTIPLY, MULTIPLY and ROUND, and DIVIDE require many multiples of 12-microsecond cycles in order to fully perform the operation. This again is similar to the time required in the IBM 701, since the arithmetic unit is the same. In order to clock the 12-microsecond cycles, an arithmetic clock of 12 stages is provided as in the IBM 701 machine. This clock is shown in FIGURE 13 and its operation is initiated by virtue of an output derived from AND gate 1301. AND gate 1301 is enabled due to a pulse at A0 time from the three-microsecond clock before described, together with an indication that trigger 1302 is in its reset position. Also required to enable AND gate 1301 is an input from a START ARITHMETIC CLOCK circuit which is found in FIGURE 54. It is seen from this latter figure that such a signal is generated from OR gate 5403. Although FIGURE 54 shows a decoding circuit for IR–2, this FIGURE 54 is also duplicated for the main machine. Thus, at the time that the data instruction arrives in XIR–3 from XIR–2, the 12-microsecond clock, if required, is started. This 12-microsecond clock continues its operation which is not stopped until trigger 1302, which has been set by virtue of the signal appearing at the output of AND gate 1301, is reset by virtue of detection of a NORMAL END OF OPERATION signal generated in FIGURE 50. The NORMAL END OF OPERATION signal is generated from OR gate 5004 by means of two alternative paths. If the data instruction contained in XIR–3 required a 12-microsecond cycle or multiples thereof, then OR gate 5001 will be energized from the decoder of XIR–3. Upon receipt of the END OF OPERATION signal generated by the IBM 701 circuits, which indicates the end of these 12-microsecond operations, trigger 5006 will be set so as to enable the middle input of AND gate 5005. Thereafter, upon receipt of a NORMAL END OF OPERATIONS X SAMPLE from FIGURE 49, all three inputs of AND gate 5005 will be energized so as to generate a normal END OF OPERATION X signal which thereupon resets trigger 1302 in FIGURE 13 and so stop the operation of the 12-microsecond clock there shown. The NORMAL END OF OPERATION X SAMPLE from FIGURE 49 is always attained at A2.0 time of each three-microsecond cycle whenever the machine is not in the LATCH MODE. This signal is obtained from AND gate 4901.

If an instruction is placed into XIR–3 which requires only three microseconds in which to be performed, then of course the clock in FIGURE 13 is not started. In FIGURE 50, these three-microsecond instructions are detected by OR gate 5002 which thereby raises one input of AND gate 5003. Upon detection of the NORMAL END OF X SAMPLE at A2.0 time of each three-microsecond cycle, then OR gate 5004 again generates a NORMAL END OF OPERATION X signal. Operation of the control circuits in the control computer are similar to those in the main computer, and equivalent structure may be found in FIGURES 59, 60, 58, and 54.

If a conditional transfer instruction is withdrawn from memory and placed in the monitor register, certain conditions in the machine prevail. First of all, referring now to FIGURE 27, the detection of a conditional transfer instruction in the monitor register, whether it be TRANSFER +, TRANSFER 0, or TRANSFER OVERFLOW, will energize OR gate 2706 so as to provide one input to AND circuit 2707. If the machine is not in its LATCH MODE, then AND gate 2707 is sampled at A2.0 time of the cycle in which the conditional transfer instruction had been placed into the monitor register, so as to set trigger circuit 2702. The setting of trigger circuit 2702 will lower output of inverter 2703 and raise the output of OR gate 2705. This action will therefore lower the signal on the NOT BLOCK I REFERENCE CYCLE lead and raise signal on the BLOCK I REFERENCE CYCLE lead. Trigger 2702 remains in its set condition until reset by an output from OR circuit 2712. The output from this latter OR circuit is achieved when the conditional transfer has been performed while in either the XIR–3 or the IR–3 registers of the machines in which it was placed. Thus, referring now to FIGURE 45, this shows the effect that a conditional transfer instruction has upon the main computer. For example, upon detection of the conditional transfer instruction TRANSFER OVERFLOW in XIR–3, coupled with a detection that overflow trigger (found in IBM 701) in the arithmetic unit is ON, then there is an output from AND circuit 4502 which resets the overflow trigger and also generates a signal from OR circuit 4501 entitled AFFIRM CONDITION TRANSFER IN XIR–3. Such a signal from OR circuit 4501 will condition AND circuit 4506 which is sampled at A2.0 time in each three-microsecond cycle. This transfers the address portion of XIR–3, which is associated with the transfer instruction therein, to the instruction counter which will change the sequence in the same manner as was before described in connection with the unconditional transfer instruction. If, however, the overflow trigger of the arithmetic unit is not ON, then no signal will be generated by OR circuit 4501 which will prevent the number in the instruction counter from being replaced by the address portion of the conditional transfer instruction in XIR–3. In like manner, a conditional instruction of TRANSFER + which is contained in XIR–3 will cause the X accumulator sign trigger to be sampled in order to search for a positive value within the accumulator. If a plus value is detected, then the AFFIRM CONDITION TRANSFER IN XIR–3 signal will be generated and the address associated with this conditional instruction will be placed in the instruction counter. As noted from FIGURE 43, the TRANSFER OVERFLOW and TRANSFER + instructions merely required a three-microsecond cycle when once contained in XIR–3, since the condition of a trigger is sampled. However, on the conditional transfer instruction TRANSFER 0 which implies that a transfer to the instruction counter is going to occur upon detection of a zero value in the accumulator, a different procedure is required. The detection of a zero in the accumulator of the present invention is accomplished in the same fashion as in the IBM 701, as previously described. Therefore, 12 microseconds are required in order to detect a zero value in the accumulator. As noted in FIGURE 54, the detection of the TRANSFER 0 instruction in XIR–2 will initiate the 12-microsecond arithmetic clock found in FIGURE 13. The output from the ninth stage of this clock is directed to one of the inputs of AND circuit 4505 in FIGURE 45, together with the output from the last stage of the accumulator. If a 1 is detected from this accumulator stage at the same time that a pulse is derived from the ninth stage of the arithmetic clock, then AND circuit 4505 will be enabled if it also detects the presence of the instruction TRANSFER 0 in the XIR–3. Under such conditions, an AFFIRMATIVE CONDITION TRANSFER IN XIR–3 signal will be generated by OR circuit 4501 and the address in XIR–3 will be transferred to the instruction counter.

It is noted that the NORMAL END OF OPERATION X for these three conditional transfer instructions are each generated in FIGURE 50 in a manner similar to the generation of other end of operation signals for the other data instructions. In FIGURE 27, the detection by the OR gates 2708 and 2709 of conditional transfer instructions in either of the two machines will, upon detection of the end of operation signals, energize either AND gate 2710 or 2711 so as to reset trigger 2702 and thus provide an output at OR gate 2705 if trigger 2701 is also in its reset condition. It is interesting to note that whenever AND gate 2704 is de-conditioned so that it does not provide a NOT BLOCK I REFERENCE CYCLE, then it is impossible to obtain an output signal from AND circuit 310 in FIGURE 3. This means that upon detection of a conditional transfer instruction in the monitor register, it is desirable to flush the conditional transfer instruction down to its XTR–3 or IR–3 register as soon as possible. Therefore, the circuity in FIGURE 3 provides that no instruction cycle will be initiated from the circuitry in that figure so that the store and data cycles may be performed and thus allow the conditional transfer instruction to flow into the last instruction register of its associated machine.

In FIGURE 57, the execution controls for the IR–3 condition transfer are shown. These are similar to the execution controls in FIGURE 45. However, upon generation of an affirmative condition transfer in IR–3 at the output of 5701, the address associated with the condition transfer instruction in IR–3 is not automatically placed into the instruction counter. This is due to the fact that AND gate 5708 requires the presence of three inputs. Two of these inputs, that from OR gate 5701 and the A2.0 sample signal are equivalent to the two inputs to AND gate 4506 in FIGURE 45. However, the third input to AND gate 5708 is derived from inverter circuit 5709 whose input is derived from 5710; therefore, in the presence of an output from AND gate 5710 there will be no signal from inverter gate 5709 so as to disable AND gate 5708. The AND gate 5710 requires the presence of a minus sign in IR–3 coupled with an affirmative condition transfer in XIR–3.

LATCH MODE OPERATION

As previously stated, the system of this invention includes a mode of operation which is identified as LATCH MODE. In this type of operation as many as six instructions are pulled out of memory for the main computer. These instructions are looped to function as an iterative program. The LATCH MODE operation is initiated by withdrawing from memory into the monitor register a latch instruction. With the latch instruction in the monitor register, the latch mode controlled trigger in FIGURE 47 identified as 4701 is turned ON to provide the signal LATCH MODE CONTROL TRIGGER. With trigger 4701 ON, it can be seen in connection with FIGURE 27, that AND gate 2707 is blocked. Consequently, trigger 2702 under these conditions cannot be turned ON. This is despite the fact that subsequently conditional transfers may appear in the monitor register. Therefore it can be seen that during the formation of the latch program it is not possible to obtain the BLOCK I REFERENCE CYCLE signal at the output of OR gate 2705 in the absence of an instantaneous instruction. If it were not for the blocking of AND gate 2707, a conditional transfer in monitor register would provide the BLOCK I REFERENCE CYCLES signal and might prevent the withdrawing from memory of the further instructions in the iterative program and might further prevent withdrawing of instructions for the control machine. The system continues to function as previously described until the latch instruction is flushed to XIR–3 with the exception introduced by the disabling of AND gate 2707. With the latch instruction in XIR–3 it is important to note the condition of the seventeenth bit position therein. If this bit position is a 1, then at A2.0 time trigger 4702 in FIGURE 47 is turned ON to indicate a SYNCHRONOUS LATCH MODE type of operation and to generate the signal identified as SYNC LATCH MODE CONTROL. If the latch instruction in XIR–3 has a zero in the seventeenth bit position at A2.0 time, through AND gate 4711 the trigger 4710 is turned ON to generate the signal ASYNCHRONOUS LATCH MODE CONTROL. The last instruction in the iterative program is detected by a minus sign in the sign position of the instruction when this last instruction is flushed from monitor register to XIB–1. When this occurs either trigger 4704 or 4708 will be turned ON, depending upon whether or not the program is a SYNCHRONOUS LATCH MODE type or an ASYNCHRONOUS LATCH MODE type. As can be seen in FIGURE 47, with trigger 4702 ON a minus sign in XIB–1 will unblock AND gate 4705 at A0 time to turn ON trigger 4704 to generate the signal SYNCHRONOUS LATCH MODE. If, however, the trigger 4710 is ON indicating ASYNCHRONOUS LATCH MODE operation, then at A0 time with a minus sign in XIB–1, AND gate 4709 will be unblocked to turn ON trigger 4708 to generate the signal ASYNCHRONOUS LATCH MODE. The outputs of the triggers 4704 and 4708 are fed to OR gate 4706 to provide the signal LATCH MODE. The output of OR gate 4706 is fed to inverter 4707 which provides at its output the complement thereof, namely, the signal NOT LATCH MODE. It should be noted at this time that at the time when the latch instruction is in XIR–3, the last instruction of the iterative program is in monitor register. In the case where there may be less than six instructions in the iterative program, it would be necessary to provide sufficient number of gaps to achieve this. At the time when the last instruction in the iterative program is in XIB–1, then the latch instruction has been removed from XIR–3. As can be seen from FIGURE 50, with the latch instruction in XIR–3 providing the signal LATCH MODE to OR gate 5002 in FIGURE 50, the output of OR gate 5002 is fed to AND gate 5003. At the time of the occurrence of the signal NORMAL END OF OPERATION X SAMPLE, AND gate 5003 is unblocked to provide at the output of OR gate 5004 the NORMAL END OF OPERATION X signal. To obtain the NORMAL END OF OPERATION X SAMPLE signal, reference is made to FIGURE 49. Recalling that at the time the latch instruction is in XIR–3, the last instruction in the program is still in monitor register, both of the triggers 4704 and 4708 in FIGURE 47 are OFF to provide from the output of inverter 4707 the signal NOT LATCH MODE. Now referring to FIGURE 49, it can be seen that at A2.0 time AND gate 4901 is unblock to provide at the output of OR gate 4905 the NORMAL END OF OPERATION X SAMPLE for AND GATE 5003 in FIGURE 50. The generation of the signal NORMAL END OF OPERATION X will reset XIR–3, thus erasing the latch instruction. After the latch instruction has been erased from XIR–3, the flushing of the iterative program down through the various registers in the main machine is accomplished in accordance with the usual priority control. In this connection it should be noted as previously described that with the last instruction of the program in XIB–1, then either trigger 4704 or 4708 is turned ON to provide either SYNC LATCH MODE signal or ASYNCHRONOUS LATCH MODE signal. In either case of course the signal LATCH MODE is generated. The generation of the signal LATCH MODE, as can be seen in FIGURE 36, conditions AND gates 3605, 3606, 3608, 3609, and 3610 to permit the loop operation to be effected. Of course this also means the blocking of AND gate 4901 in FIGURE 49. Consequently, the NORMAL END OF OPERATION X SAMPLE signal must now come from any of the AND gates 4902, 4903, or 4904. Also, with the LATCH MODE signal generated and consequently the line NOT LATCH MODE down, then in FIGURE 23 AND gates 2301 and 2302 are blocked to prevent flushing from monitor register to XIB–1. The generation of the signal LATCH MODE affects the instruction reference control as shown in FIGURE 3. The line NOT LATCH MODE is down which blocks AND gate 307 and prevents an instruction in monitor register for the main machine getting down into the registers thereof. This instruction will remain in monitor register until the main machine goes out of latch mode operation.

The operation of the machine when the main computer is in LATCH MODE will now be described. Referring now to FIGURE 49, it is noted as before described that the generation of the NORMAL END OF OPERATION X SAMPLE is no longer under control of AND circuit 4901, due to the fact that the signal NOT LATCH MODE is not present at this time. Assuming first that the machine is in the SYNCHRONOUS LATCH MODE, it is seen that AND circuits 4902 and 4903 will be conditioned by the signals LATCH MODE and SYNC LATCH MODE CONTROL, respectively. These signals are generated from the circuit of FIGURE 47 by OR circuits 4706 and the trigger 4704, respectively. In performing the iterative operations contained in the latch group found recirculating within the instruction registers of the main machine, it is necessary that a NORMAL END OF OPERATION X SAMPLE be generated as was done during normal operation of the machine. Normally, if the last instruction of the group is not found within the XIR–3, a signal from AND circuit 4902 will be generated at A2.0 time of each three-microsecond cycle. However, the generation of this signal from AND circuit 4902 is further conditioned by the presence of the signal NOT AFFIRMATIVE CONDITION TRANSFER IN XIR–3. Therefore, even in the absence of the last instruction of the latch group from XIR–3, if a conditional transfer instruction is to be found in XIR–3 and an AFFIRMATIVE CONDITION TRANSFER signal is generated from the OR circuit 4501 in FIGURE 45, then no signal will be generated from AND circuit 4902 in FIGURE 49. When the last instruction in the latch group is being executed in XIR–3, there will be no signal on the NOT MINUS SIGN IN XIR–3 lead to AND circuit 4902, so that this AND circuit will not control generation of the sample signal from OR circuit 4905. However, in such a case, the MINUS SIGN IN XIR–3 signal will provide an input to AND circuit 4903 so that this AND circuit will govern the time at which the sample signal is generated from OR circuit 4905. Furthermore, AND circuit 4903 must also require inputs from IR–3 and a sampling time of A2.0. The purpose of this control is to effectively synchronize the operation between the instructions in the main computer and the instructions in the control computer. For example, it is desired to halt the execution of instructions in the main computer at the end of the execution of the last instruction in the latch group until an instruction with a minus sign is detected in the IR–3 register of the control computer. This effectively synchronizes the execution of instructions in both computers. Thus, when the last instruction is detected in the main computer, no END OF OPERATION SAMPLE will be generated by OR circuit 4905 until the execution of instructions in the control computer has reached a certain state, which is indicated by the placing of an instruction with a minus sign into IR–3. At this time then, a NORMAL END OF OPERATION SAMPLE will be initiated at every A2.0 time in a cycle so that eventually a NORMAL END OF OPERATION signal will be generated from OR circuit 5004 in FIGURE 50. A generation of the NORMAL END OF OPERATION signal at this time will again initiate the execution of the instructions contained in the latch group, which are recirculated in the main computer. However, when the last instruction in the latch group is placed within XIR–3, it may be necessary to discontinue the LATCH MODE operation of the main computer. This operation is controlled by the circuitry shown in FIGURE 48. Assuming SYNCHRONOUS LATCH MODE is still being performed, it is noted that AND circuit 4801 may have signals on all four of its inputs. For example, the SYNC LATCH MODE signal will be present, coupled with the MINUS SIGN IN XIR–3 signal. When an instruction with a minus sign is detected in IR–3, three of the inputs to AND circuit 4801 will be raised. If either of the instructions in IR–3 or in XIR–3 at this time are conditional transfer instructions, and if either one or both generates an AFFIRMATIVE CONDITIONAL TRANSFER signal, then AND circuit 4801 will be enabled so as to set latch exit trigger 4802 through OR circuit 4803. If this occurs, then the signal generated at the output of trigger 4802 accomplishes a variety of functions. First and foremost, in FIGURE 47 this signal will reset triggers 4702 and 4704 as well as trigger 4701. This effectively takes the main machine out of its LATCH MODE operation. Furthermore, the signal from the latch trigger 4802 is directed to the instruction reference priority control in FIGURE 3 so as to initiate a new instruction reference cycle if the instruction counter refers to an available memory at this time. At A2.0 time of the same cycle, the output from trigger 4802 is sampled at AND gate 4806 so as to provide a reset signal. This reset signal is used to reset all of the instruction registers in the main machine so as to effectively erase all of the instructions in the latch mode group.

If the main machine is in the ASYNCHRONOUS LATCH MODE operation, then AND circuits 4902 and 4904 in FIGURE 49 are conditioned by the LATCH MODE signal and the ASYNCHRONOUS LATCH MODE signal, respectively. The ASYNCHRONOUS LATCH MODE signal is generated in FIGURE 47 from the trigger 4708. As described above, AND circuit 4902 operates in the same manner as was explained in connection with the SYNCHRONOUS LATCH MODE. However, it is noted here that if AND circuit 4902 cannot operate due to the presence of an AFFIRMATIVE CONDITION TRANSFER IN XIR–3, then AND circuit 4904 may be enabled at this time if there is present an instruction with a minus sign in IR–3. Furthermore, referring now to FIGURE 48, it can be seen that if AND circuit 4904 in FIGURE 49 will be enabled, then AND circuit 4804 in FIGURE 48 will also be enabled by the same set of conditions found in FIGURE 49 with exception of the sampling pulse A2.0. Therefore, any time the AND circuit 4904 generates a NORMAL END OF OPERATION X SAMPLE, then AND circuit 4804 will set latch exit trigger 4802 so as to take the main computer out from its ASYNCHRONOUS LATCH MODE operation.

What has been described are various embodiments of the present invention. Other embodiments obvious to those skilled in the art from the teachings herein are contemplated to be within the spirit and scope of the following claims.

What is claimed is:

1. A calculator including a memory for storing instruction words for use by said calculator, a plurality of instruction registers for storing instruction words withdrawn from said memory, means to withdraw said instruction words from said memory and for storing said instruction words in said instruction registers, means to decode said instruction words in said registers and means responsive to said decoding means to select in accordance with a predetermined priority one of said instruction words for execution.

2. A calculator including a memory for storing instruction words for use by said calculator, a plurality of serially connected instruction registers for storing said instruction words withdrawn from said memory, means to withdraw said instruction words from said memory and for storing said instruction words in said instruction registers, decoding means associated with each of said registers to decode the operation code portion of said instruction words, means responsive to said decoding means to select in accordance with a predetermined priority one of said instruction words for execution, means to execute the instructions represented by said instruction words and means to gate said instruction words through said registers.

3. A calculator comprising a memory for storing data and instruction words for use by said calculator, an arithmetic unit for receiving data words withdrawn from said memory and performing arithmetic operations thereon, a plurality of instruction registers for storing instruction words withdrawn from said memory, means connecting said registers in series, means for withdrawing said instruction words from said memory and storing said instruction words in said registers, means to decode said instruction words, means responsive to said decoding means to select in accordance with a predetermined priority one of said instruction words in said registers for execution, means responsive to said execution for gating said selected instruction word through said registers.

4. A calculator comprising a memory for storing data and instruction words for use by said calculator in selectively performing a plurality of memory cycle operations in which access to memory is involved, a plurality of instruction registers for storing instruction words withdrawn from said memory, means to address said memory for withdrawing said instruction words and data words therefrom, an arithmetic unit for performing arithmetic operations upon data words withdrawn from said memory and to provide a resultant responsive to said arithmetic operations, means to address said memory to store said resultant in said memory, means to survey the status of said calculator periodically and to select in accordance with a predetermined priority one of said memory cycle operations for execution, means responsive to said selection to execute said selected operation whereby an instruction word is withdrawn from memory and stored in one of said instruction registers or a data word is withdrawn from said memory and stored in said arithmetic unit and an arithmetic operation performed thereon or a resultant from an arithmetic operation is withdrawn from said arithmetic unit and stored as a data word in said memory.

5. A calculator as claimed in claim 4 further including a copy register for storing copy instruction words for writing information into said memory from an input-output device or for reading information out of said memory into an input-output device, a monitor register, means to direct said withdrawn instruction words to said monitor register, a decoder associated with said monitor register for decoding said instruction words and means responsive to detection of a copy instruction word to store said copy instruction word in said copy register.

6. A calculator as claimed in claim 5 further including a memory address buffer register for storing an address for said memory, means to normally increment said memory address buffer register once each memory cycle, means to address said memory responsive to the address in said memory address buffer, means determined by the detection in said monitor register of an unconditional transfer instruction word for ceasing said normal incrementation of said memory address buffer and to store an address therein as determined by said unconditional transfer instruction word.

7. A calculator comprising first and second memories for storing data and instruction words for use by said calculator, first and second computers, a monitor register, a first plurality of instruction registers associated with said first computer, a second plurality of instruction registers associated with said second computer, a first arithmetic unit associated with said first computer, a second arithmetic unit associated with said second computer, means to address said memories to withdraw instruction words from said memories and to store said instruction words in said monitor register, means to gate said instruction words from said monitor register to one of said plurality of instruction registers as a function of a computer bit associated with said instruction words whereby said instruction registers store a plurality of said instruction words, said addressing including a read and write time to comprise a memory cycle for each memory, means to multiplex the addressing of said memories whereby each of said memories achieves overlapping memory cycles equivalent to a calculator cycle wherein said calculator cycle equals approximately one half said memory cycle, means to survey the status of said calculator once each calculator cycle and to select in accordance with a predetermined priority system a calculator operation for the next succeeding calculator cycle as determined by said calculator status, means to flush said instruction words from said computers upon execution thereof, means to store data words withdrawn from said memories in said arithmetic units and to perform arithmetic operations thereon as determined by said instruction words and means to withdraw data words stored in said arithmetic units and to store said withdrawn data words into said memories as determined by said instruction words.

8. A calculator as claimed in claim 7 further including a copy register for storing copy instruction words, said copy instruction words controlling the reading into and writing out of memory to input-output devices, means to transfer said copy instruction word from said monitor register to said copy register upon recognition of said copy instruction word by said monitor register.

9. A calculator comprising two computers, each computer having a memory for storing instruction words for use by said calculator, a plurality of instruction registers, means to load said instruction registers with said instruction words, means to select one of said instruction words in said instruction registers for execution in accordance with a predetermined priority and means responsive to said selection to execute said selected instruction and to flush said executed instruction from said registers.

10. A calculator as claimed in claim 9 further including a monitor register, means to withdraw instruction words from said memories and to store said instruction words in said monitor register and means associated with said monitor register to direct said instruction word therein to one of said plurality of instruction registers.

11. A calculator as claimed in claim 10 further including means to generate address for said instruction words, addressing means associated with each of said memories to address said memories as determined by said address generating means whereby said instruction words are withdrawn from said memories and stored in said monitor register.

12. A calculator as claimed in claim 11 wherein said address generating means includes an instruction counter, means to sequentially advance the count of said counter each time an instruction word is withdrawn from said memories, said addresses for said memories being interlaced whereby alternate memory addresses are generated by said instruction counter.

13. A calculator comprising a memory for storing instructions for use by said calculator, a plurality of serially connected instruction registers, means sequentially to store instructions withdrawn from said memory in said registers, means responsive to a latch instruction withdrawn from said memory to connect said registers in a closed ring, means to step said instructions around said ring, an arithmetic unit associated with said registers, means to execute one of said instructions per step whereby the condition existing in said arithmetic unit is sequentially changed and means to open said ring and clear said registers responsive to a predetermined condition existing in said arithmetic unit.

14. A system including a first calculator of the type claimed in claim 13, a second calculator comprising a second plurality of serially connected instruction registers, a second arithmetic unit and a second memory for storing data and instruction words for use by said second calculator, means to recognize a predetermined condition of said second arithmetic unit and means responsive to recognition of said predetermined condition of either of said first and second arithmetic units to open said loop and flush said instruction words from said registers.

15. A system as defined by claim 14 further including means to at least temporarily cease said circulation of instructions in said closed ring pending the arrival in a predetermined one of said second plurality of instruction registers of a predetermined instruction word.

16. A calculator comprising a memory for storing data and instruction words for use by said calculator, an arithmetic unit for performing arithmetic operations on data words withdrawn from said memory, said operations being determined by said instruction words withdrawn from said memory, a plurality of instruction registers serially connected, means to withdraw said instruction word from said memory and to store said instruction words in said registers, means responsive to a latch instruction withdrawn from said memory to connect said registers in a ring, means to periodically sample the status of said calculator to determine the type of calculator operation next to be performed by said calculator, means to execute said instructions, means responsive to said execution to shift each instruction serially in said loop, means to continue said loop operation until said arithmetic unit achieves a predetermined condition, means to recognize said predetermined condition, means responsive to said recognition to open said loop and flush said instruction from said registers.

17. A calculator comprising a memory for storing instructions for use by said calculator, a plurality of serially connected instruction registers for storing instructions withdrawn from said memory, means to withdraw said instruction and to store said instruction in said registers, said plurality of registers including a group of registers and a terminal register, means associated with each of said group for identifying the type of instruction stored therein, said identifying means providing a demand signal responsive to the storage in its associated register of a type of instruction adapted to be executed therefrom, means to periodically survey the status of said calculator, means responsive to said status and to the provision of a demand signal from one of said identifying means for executing the instruction responsible for said demand signal and means responsive to said execution for flushing said responsible instruction through said registers including said terminal register.

18. A calculator comprising two or more independent multi-word memories, each for storing a plurality of words for use by said calculator, each of said memories including an address register and having a memory cycle including a read time and write time, a write means associated with each of said memories to write data into a word address addressed by its address register, a read means associated with each of said memories to read data from said word address and means within said calculator and operative during a single memory cycle to supply a plurality of successive addresses to successive ones of said address registers and to successively activate said read and write means whereby said read time of each one of said memories corresponds in time with a different portion of the read-write memory cycle of each of the other memories.

*19. A data word storage arrangement for an electronic digital computer machine, said data word storage arrangement comprising first and second separate multiple-word storage devices, both of said devices including a plurality of separate data word storage locations, common signal input/output connections for each of said storage devices, signal-controlled address selection means for rendering any chosen one of said word storage locations accessible through said input/output connections, address selection control means having an address signal input for receiving a digital form address number signal defining any chosen one of said data word storage locations in said storage arrangement and control signal outputs selectively energizable in accordance with the address number defined by the address signal applied to said address signal input, and circuit means interconnecting said control signal outputs of said address selection control means with said address selection means of said word storage devices to render a word storage location in said first multiple word stor-*

*age device accessible through said input/output connections in response to a first address number signal to render a word location in said second multiple word storage device accessible through said input/output connection in response to a second address signal having an address number consecutive to the address number of said first address signal and to render a word storage location in said first multiple word storage device accessible through said input/output connection in response to a third address signal having an address number consecutive to the address number of said second address signal, said circuit means operative to render a multiple word storage device accessible before the completion of an access operation at a previously addressed multiple word storage device.*

*20. A data word storage arrangement for an electronic digital computing machine, said data word storage arrangement comprising first and second magnetic core storage matrices, both of said matrices including a plurality of separate data word storage locations, common signal input/output connections, signal-controlled address selection means for rendering any chosen one of said word storage locations accessible through said input/output connections, address selection control means having an address signal input for receiving a digital form address number signal defining any chosen one of said data word storage locations in said storage arrangement and control signal outputs selectively energizable in accordance with the address number defined by the address signal applied to said address signal input, and circuit means interconnecting said control signal outputs of said address selection control means with said address selection means of said matrices to render a word storage location in said first matrix accessible through said input/output connections in response to a first address number signal, to render a word storage location in said second matrix accessible through said input/output connections in response to a second address number signal having an address number consecutive to the address number of said first address number signal and to render a data word storage location in said first matrix accessible through said input/output connections in response to a third address number signal having an address number consecutive to the address number of said second address number signal, said circuit means operating to render a subsequently addressed matrix accessible prior to the completion of an access operation at a previously addressed matrix.*

*21. A data word storage arrangement for an electronic digital computing machine, said data word storage arrangement comprising first and second multiple-word storage devices, each of said devices including a plurality of separate word storage locations, signal input/output connections and signal controlled address selection means including a separate address control input for each of said word storage locations for rendering any chosen one of said word storage locations accessible through said input/output connections, address selection control means having an address signal input for receiving a digital form address number signal defining any chosen one of the word storage locations in the word storage arrangement and a plurality of separate control signal outputs, said control signal outputs being selectively and uniquely energizable in accordance with the particular address number defined by the address selection signal applied to said address signal input and circuit means interconnecting said control signal outputs to said address control inputs to render word storage locations in said first multiple-word storage device accessible to said input/output connections in response to address number signals defining odd address numbers and to render word storage locations in said second multiple-word storage device accessible to said input/output connections in respect to address number signals defining even adress numbers, said circuit means operative to render a word storage location in a subsequently addressed multiple word storage device accessible prior to the completion of an access operation at a previously addressed multiple word storage device.*

*22. A data storage arrangement according to claim 21 which includes 'busy' signal generator means coupled to each of said word storage devices, said generator means generating a 'busy' signal for a predetermined interval of time following each selection of a word storage location in either one of said word storage devices.*

*23. A data storage arrangement according to claim 22 which includes use-inhibit signal generator means connected to said busy signal generator means and generating a signal usable to inhibit continued operation of the machine in the event that a second selection of a word storage location in either one of said word storage devices occurs during said predetermined interval of time when said busy signal is being generated.*

*24. In a device of the character described, a plurality of data storage means having addressable data storage areas, address selection means controlled by signals of different values, each value representative of an address of a storage area, said selection means adapted to generate address selection signals, control means coupling said data storage means with said address selection means and responsive to consecutive values of said address selection signals to select data storage areas in different ones of said data storage means respectively, said control means operating to select a data storage area in one of said data storage means before a previous selection operation in another data storage means has been completed.*

*25. In a device of the character described, first and second data storage means having addressable data storage areas, each said data storage means having a finite read-write time in response to a selection signal; address selection means controlled by signals of different values, each value representative of an address of a storage area, said selection means adapted to generate address selection signals; control means coupling said data storage means with said address selection means and responsive to first and second consecutive values of said address selection signals for selecting data storage areas in said first and second data storage means respectively, said selection in said second data storage means occurring after said selection in said first data storage means but during said finite read-write time of said first data storage means.*

*26. A data storage arrangement according to claim 19 which includes busy signal generator means coupled to each of said word storage devices, said generator means generating a busy signal for a predetermined interval of time following each selection of a word storage location in one of said word storage devices.*

*27. A data storage arrangement according to claim 26 which includes use-inhibit signal generator means connected to said busy signal generator means and generating a signal usable to inhibit continued operation of the machine in the event that a second selection of a word storage location in one of said word storage devices occurs during said predetermined interval of time when said busy signal is being generated.*

*28. A data storage arrangement according to claim 21 which includes busy signal generator means coupled to each of said word storage devices, said generator means generating a busy signal for a predetermined interval of time following each selection of a word storage location in one of said word storage devices.*

*29. A data storage arrangement according to claim 28 which includes use-inhibit signal generator means connected to said busy signal generator means and generating a signal usable to inhibit continued operation of the machine in the event that a second selection of a word storage location in one of said word storage devices occurs during said predetermined interval of time when said busy signal is being generated.*

(References on following page)

References Cited by the Examiner

The following references, cited by the Examiner, are of record in the patented file of this patent or the original patent.

UNITED STATES PATENTS

| | | | |
|---|---|---|---|
| 2,914,248 | 11/1959 | Ross | 235—157 |
| 2,925,588 | 2/1960 | Sublette et al. | 340—172 |
| 3,020,525 | 2/1962 | Garrison et al. | 340—172.5 |
| 3,058,658 | 10/1962 | Schmierer et al. | 235—157 |

| | | | |
|---|---|---|---|
| 3,061,192 | 10/1962 | Terzian | 235—157 |
| 3,070,304 | 12/1962 | Amdahl et al. | 235—157 |

OTHER REFERENCES

The system Organization of Mobidic B, Proceedings of the Eastern Joint Computer Conference, Boston, Massachusetts, S. K. Chao, pages 101–107, December 1959.

ROBERT C. BAILEY, *Primary Examiner.*

P. J. HENON, *Assistant Examiner.*